US008430737B2

(12) United States Patent
Saunders

(10) Patent No.: US 8,430,737 B2
(45) Date of Patent: Apr. 30, 2013

(54) GAMING SYSTEM AND METHOD PROVIDING MULTI-DIMENSIONAL SYMBOL WAGERING GAME

(75) Inventor: Brian F. Saunders, Sunnyvale, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/187,653

(22) Filed: Jul. 21, 2011

(65) Prior Publication Data

US 2013/0023328 A1 Jan. 24, 2013

(51) Int. Cl.
*A63F 13/00* (2006.01)

(52) U.S. Cl.
USPC .................. 463/17; 463/16; 463/18; 463/19; 463/20; 463/22

(58) Field of Classification Search .............. 463/16–20, 463/22
See application file for complete search history.

(56) References Cited

U.S. PATENT DOCUMENTS

| | | | | |
|---|---|---|---|---|
| 1,978,395 | A | 10/1934 | Groetchen | |
| 2,743,108 | A | 4/1956 | Sanders | |
| 3,420,525 | A | 1/1969 | Waders | |
| 3,618,952 | A | 11/1971 | Tallarida | |
| 3,642,287 | A | 2/1972 | Lally et al. | |
| 3,735,987 | A | 5/1973 | Ohki | |
| 4,033,588 | A | 7/1977 | Watts | |
| 4,099,722 | A | 7/1978 | Rodesch et al. | |
| 4,157,829 | A | 6/1979 | Goldman et al. | |
| 4,198,052 | A | 4/1980 | Gauselmann | |
| 4,200,291 | A | 4/1980 | Hooker | |
| 4,206,920 | A * | 6/1980 | Weatherford et al. | 463/18 |
| 4,291,882 | A | 9/1981 | Del Monte | |
| 4,326,351 | A | 4/1982 | Heywood et al. | |
| 4,335,809 | A | 6/1982 | Wain | |
| 4,339,798 | A | 7/1982 | Hedges et al. | |
| 4,357,567 | A | 11/1982 | Rock | |
| 4,364,567 | A | 12/1982 | Goott | |
| 4,467,424 | A | 8/1984 | Hedges et al. | |
| 4,494,197 | A | 1/1985 | Troy et al. | |
| 4,582,324 | A | 4/1986 | Koza et al. | |
| 4,624,459 | A | 11/1986 | Kaufman | |
| 4,636,951 | A | 1/1987 | Harlick | |

(Continued)

FOREIGN PATENT DOCUMENTS

| | | |
|---|---|---|
| AU | 198774936 | 6/1987 |
| AU | 1997710015 | 9/1997 |

(Continued)

*Primary Examiner* — Dmitry Suhol
*Assistant Examiner* — David Duffy
(74) *Attorney, Agent, or Firm* — Neal, Gerber & Eisenberg LLP

(57) ABSTRACT

A gaming system and method providing a multi-dimensional symbol wagering game is provided. A player selects a payline, places a wager on the selected payline, and selects a plurality of a plurality of different symbols in a selection order. Symbols are generated and displayed at each of a plurality of symbol display positions. If at least a designated quantity of the symbol display positions associated with the selected payline displays any one of the selected symbols, the gaming system determines a display order of the generated and displayed symbols associated with the selected payline, and determines any awards associated with the selected payline based on a quantity of the symbol display positions associated with the selected payline that display the player selected symbols and a comparison of the selection order with the display order. Any awards are provided to the player. Cascading and rotating symbol features are provided.

32 Claims, 35 Drawing Sheets

U.S. PATENT DOCUMENTS 4,648,600 A * 3/1987 Olliges ............................ 463/20
4,669,731 A 6/1987 Clarke
4,689,742 A 8/1987 Troy et al.
4,695,053 A 9/1987 Vazquez, Jr. et al.
4,711,451 A 12/1987 Pajak et al.
4,722,527 A 2/1988 Gauselmann
4,756,531 A 7/1988 DiRe et al.
4,760,527 A 7/1988 Sidley
4,775,155 A 10/1988 Lees
4,790,537 A 12/1988 Smyth et al.
4,805,907 A 2/1989 Hagiwara
4,811,953 A 3/1989 Jeng
4,815,741 A 3/1989 Small
4,817,951 A 4/1989 Crouch et al.
4,826,169 A 5/1989 Bessho et al.
4,836,546 A 6/1989 DiRe et al.
4,836,548 A 6/1989 Chittenden
4,837,728 A 6/1989 Barrie et al.
4,842,278 A 6/1989 Markowicz
4,856,787 A 8/1989 Itkis
4,874,173 A 10/1989 Kishishita
4,875,686 A 10/1989 Timms
4,978,129 A 12/1990 Komeda et al.
4,991,848 A 2/1991 Greenwood et al.
4,995,610 A 2/1991 Paoletti
4,999,001 A 3/1991 Johnson, Jr.
5,042,809 A 8/1991 Richardson
5,046,737 A 9/1991 Fienberg
5,083,800 A 1/1992 Lockton
5,092,598 A 3/1992 Kamille
5,100,139 A 3/1992 Di Bella
5,116,049 A 5/1992 Sludikoff et al.
5,116,055 A 5/1992 Tracy
5,152,529 A 10/1992 Okada
5,157,602 A 10/1992 Fields et al.
5,158,293 A 10/1992 Mullins
5,186,463 A 2/1993 Marin et al.
5,192,076 A 3/1993 Komori
5,205,555 A 4/1993 Hamano
RE34,244 E 5/1993 Hagiwara
5,224,706 A 7/1993 Bridgeman et al.
5,242,163 A 9/1993 Fulton
5,265,874 A 11/1993 Dickinson et al.
5,265,877 A 11/1993 Boylan et al.
5,273,281 A 12/1993 Lovell
5,276,312 A 1/1994 McCarthy
5,282,620 A 2/1994 Keesee
5,308,062 A 5/1994 Hogan
5,308,065 A 5/1994 Bridgeman et al.
5,324,035 A 6/1994 Morris et al.
5,332,219 A 7/1994 Marnell, II et al.
5,332,228 A 7/1994 Schultz
5,333,868 A 8/1994 Goldfarb
5,342,047 A 8/1994 Heidel et al.
5,344,144 A 9/1994 Canon
5,364,100 A 11/1994 Ludlow et al.
5,377,973 A 1/1995 Jones et al.
5,380,007 A * 1/1995 Travis et al. .................... 463/18
5,393,057 A 2/1995 Marnell, II
5,395,111 A 3/1995 Inoue
5,397,125 A 3/1995 Adams
5,398,932 A 3/1995 Eberhardt et al.
5,401,024 A 3/1995 Simunek
5,407,199 A 4/1995 Gumina
5,423,539 A 6/1995 Nagao
5,431,408 A 7/1995 Adams
5,449,173 A 9/1995 Thomas et al.
5,456,465 A 10/1995 Durham
5,511,781 A 4/1996 Wood et al.
5,531,440 A 7/1996 Dabrowski et al.
5,564,700 A 10/1996 Celona
5,577,971 A 11/1996 File
5,580,309 A 12/1996 Piechowiak et al.
5,584,764 A 12/1996 Inoue
5,586,937 A 12/1996 Menashe
5,609,524 A 3/1997 Inoue
5,611,535 A 3/1997 Tiberio
5,611,729 A 3/1997 Schumacher et al.
5,611,730 A 3/1997 Weiss
5,624,119 A 4/1997 Leake
5,628,684 A 5/1997 Bouedec
5,639,089 A 6/1997 Matsumoto et al.
5,645,485 A 7/1997 Clapper, Jr.
5,647,798 A 7/1997 Falciglia
5,651,735 A 7/1997 Baba
5,657,991 A 8/1997 Camarato
5,664,998 A 9/1997 Seelig et al.
5,674,128 A 10/1997 Holch et al.
5,683,295 A 11/1997 Frain
5,700,009 A 12/1997 Meoni
5,704,835 A 1/1998 Dietz
5,718,631 A 2/1998 Invencion
5,720,662 A 2/1998 Holmes et al.
5,722,891 A 3/1998 Inoue
5,743,526 A 4/1998 Inoue
5,752,881 A 5/1998 Inoue
5,755,619 A 5/1998 Matsumoto et al.
5,762,552 A 6/1998 Vuong et al.
5,769,714 A 6/1998 Wiener et al.
5,769,716 A 6/1998 Saffari et al.
5,772,506 A 6/1998 Marks et al.
RE35,864 E 7/1998 Weingardt
5,779,545 A 7/1998 Berg et al.
5,788,573 A 8/1998 Baerlocher et al.
5,797,794 A 8/1998 Angell
5,800,269 A 9/1998 Holch et al.
5,807,172 A 9/1998 Piechowiak
5,813,911 A 9/1998 Margolin
5,816,918 A 10/1998 Kelly et al.
5,817,172 A 10/1998 Yamada et al.
5,823,873 A 10/1998 Moody
5,823,874 A 10/1998 Adams
5,823,879 A 10/1998 Goldberg et al.
5,833,536 A 11/1998 Davids et al.
5,833,537 A 11/1998 Barrie
5,833,538 A 11/1998 Weiss
5,848,932 A 12/1998 Adams
5,851,147 A 12/1998 Stupak et al.
5,855,514 A 1/1999 Kamille
5,863,249 A 1/1999 Inoue
5,871,398 A 2/1999 Schneier et al.
5,882,260 A 3/1999 Marks et al.
5,882,261 A 3/1999 Adams
5,909,875 A 6/1999 Weingardt
5,910,048 A 6/1999 Feinberg
5,931,467 A 8/1999 Kamille
5,935,001 A 8/1999 Baba
5,935,002 A 8/1999 Falciglia
5,944,606 A 8/1999 Gerow
5,947,820 A 9/1999 Morro et al.
5,949,042 A 9/1999 Dietz, II et al.
5,951,397 A 9/1999 Dickinson
5,954,582 A 9/1999 Zach
5,967,893 A 10/1999 Lawrence et al.
5,970,143 A 10/1999 Schneier et al.
5,971,849 A 10/1999 Falciglia
5,980,384 A 11/1999 Barrie
5,984,782 A 11/1999 Inoue
5,993,316 A 11/1999 Coyle et al.
5,996,997 A 12/1999 Kamille
5,997,400 A 12/1999 Seelig et al.
5,997,401 A 12/1999 Crawford
6,004,207 A 12/1999 Wilson, Jr. et al.
6,012,982 A 1/2000 Peichowiak et al.
6,012,983 A 1/2000 Walker et al.
6,015,346 A 1/2000 Bennett
6,017,032 A 1/2000 Grippo et al.
6,024,640 A 2/2000 Walker et al.
6,033,306 A 3/2000 De Souza
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,077,162 A 6/2000 Weiss
6,079,711 A 6/2000 Wei et al.
6,086,066 A 7/2000 Takeuchi et al.

6,089,976 A 7/2000 Schneider et al.
6,089,977 A 7/2000 Bennett
6,089,982 A 7/2000 Holch et al.
6,093,102 A 7/2000 Bennett
6,095,921 A 8/2000 Walker et al.
6,099,408 A 8/2000 Schneier et al.
6,102,400 A 8/2000 Scott et al.
6,102,798 A 8/2000 Bennett
6,109,610 A 8/2000 Cherry et al.
6,110,041 A 8/2000 Walker et al.
6,113,098 A 9/2000 Adams
6,117,009 A 9/2000 Yoseloff
6,117,013 A 9/2000 Eiba
6,120,031 A 9/2000 Adams
6,120,376 A 9/2000 Cherry
6,120,377 A 9/2000 McGinnis et al.
6,126,542 A 10/2000 Fier
6,129,632 A 10/2000 Luciano
6,142,872 A 11/2000 Walker et al.
6,142,873 A 11/2000 Weiss et al.
6,142,875 A 11/2000 Kodachi et al.
6,146,272 A 11/2000 Walker et al.
6,146,273 A 11/2000 Olsen
6,149,521 A 11/2000 Sanduski
6,155,925 A 12/2000 Giobbi et al.
6,158,741 A 12/2000 Koelling
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,521 B1 1/2001 Luciano et al.
6,168,522 B1 1/2001 Walker et al.
6,168,523 B1 1/2001 Piechowiak et al.
6,173,235 B1 1/2001 Maeda
6,173,955 B1 1/2001 Perrie et al.
6,174,233 B1 1/2001 Sunaga et al.
6,174,234 B1 1/2001 Seibert, Jr. et al.
6,174,235 B1 1/2001 Walker et al.
6,183,361 B1 2/2001 Cummings et al.
6,186,894 B1 2/2001 Mayeroff
6,190,254 B1 2/2001 Bennett
6,190,255 B1 2/2001 Thomas et al.
6,203,009 B1 3/2001 Sines et al.
6,203,428 B1 3/2001 Giobbi et al.
6,203,429 B1 3/2001 Demar et al.
6,210,275 B1 4/2001 Olsen
6,210,276 B1 4/2001 Mullins
6,210,277 B1 4/2001 Stefan
6,210,279 B1 4/2001 Dickinson
6,217,022 B1 4/2001 Astaneha
6,217,448 B1 4/2001 Olsen
6,220,959 B1 4/2001 Holmes, Jr. et al.
6,220,961 B1 4/2001 Keane et al.
6,224,482 B1 5/2001 Bennett
6,224,483 B1 5/2001 Mayeroff
6,224,484 B1 5/2001 Okuda et al.
6,227,969 B1 5/2001 Yoseloff
6,227,971 B1 5/2001 Weiss
6,231,442 B1 5/2001 Mayeroff
6,231,445 B1 5/2001 Acres
6,234,897 B1 5/2001 Frohm et al.
6,238,287 B1 5/2001 Komori et al.
6,241,606 B1 6/2001 Riendeau et al.
6,241,607 B1 6/2001 Payne et al.
6,244,957 B1 6/2001 Walker et al.
6,250,685 B1 6/2001 Walker et al.
6,251,013 B1 6/2001 Bennett
6,254,480 B1 7/2001 Zach
6,254,481 B1 7/2001 Jaffe
6,254,482 B1 7/2001 Walker et al.
6,261,177 B1 7/2001 Bennett
6,270,407 B1 8/2001 Dodge
6,270,409 B1 8/2001 Shuster
6,270,411 B1 8/2001 Gura et al.
6,270,412 B1 8/2001 Crawford et al.
6,273,820 B1 8/2001 Haste, III
6,280,328 B1 8/2001 Holch et al.
6,283,855 B1 9/2001 Bingham
6,290,600 B1 9/2001 Glasson
6,299,165 B1 10/2001 Nagano
6,299,170 B1 10/2001 Yoseloff
6,302,398 B1 10/2001 Vecchio
6,302,429 B1 10/2001 Friedrich
6,302,791 B1 10/2001 Frohm et al.
6,305,686 B1 10/2001 Perrie et al.
6,309,299 B1 10/2001 Weiss
6,309,300 B1 10/2001 Glavich
6,311,976 B1 11/2001 Yoseloff et al.
6,312,331 B1 11/2001 Tamaki
6,312,334 B1 11/2001 Yoseloff
6,315,291 B1 11/2001 Moody
6,315,660 B1 11/2001 DeMar et al.
6,315,662 B1 11/2001 Jorasch et al.
6,315,663 B1 11/2001 Sakamoto
6,318,721 B1 11/2001 Randall et al.
6,319,124 B1 11/2001 Baerlocher et al.
6,322,078 B1 11/2001 Adams
6,322,309 B1 11/2001 Thomas et al.
6,325,716 B1 12/2001 Walker et al.
6,328,649 B1 12/2001 Randall et al.
6,334,814 B1 1/2002 Adams
6,335,815 B1 1/2002 Kobayashi
6,336,860 B1 1/2002 Webb
6,336,862 B1 1/2002 Byrne
6,345,824 B1 2/2002 Selitzky
6,346,043 B1 2/2002 Colin et al.
6,347,996 B1 2/2002 Gilmore et al.
6,358,144 B1 3/2002 Kaddlic et al.
6,358,146 B1 3/2002 Adams
6,358,147 B1 3/2002 Jaffe et al.
6,358,151 B1 3/2002 Enzminger et al.
6,364,313 B1 4/2002 Moody
6,364,767 B1 4/2002 Brossard et al.
6,368,213 B1 4/2002 McNabola
6,368,214 B1 4/2002 Luciano
6,368,218 B2 4/2002 Angell, Jr.
6,394,902 B1 5/2002 Glavich et al.
6,398,201 B1 6/2002 Solomond et al.
6,398,218 B1 6/2002 Vancura
6,398,644 B1 6/2002 Perrie et al.
6,398,645 B1 6/2002 Yoseloff
6,402,614 B1 6/2002 Schneier et al.
6,409,602 B1 6/2002 Wilshire et al.
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,419,583 B1 7/2002 Crumby et al.
6,425,823 B1 7/2002 Byrne
6,428,412 B1 8/2002 Anderson et al.
6,439,993 B1 8/2002 O'Halloran
6,439,995 B1 8/2002 Hughs-Baird et al.
6,443,837 B1 9/2002 Jaffe et al.
6,450,885 B2 9/2002 Schneier et al.
6,454,266 B1 9/2002 Breeding et al.
6,454,648 B1 9/2002 Kelly et al.
RE37,885 E 10/2002 Acres et al.
6,464,581 B1 10/2002 Yoseloff et al.
6,464,582 B1 10/2002 Baerlocher et al.
6,475,086 B2 11/2002 Zach
6,478,677 B1 11/2002 Moody
6,481,713 B2 11/2002 Perrie et al.
6,494,454 B2 12/2002 Adams
6,508,711 B1 1/2003 Ono
6,511,375 B1 1/2003 Kaminkow
6,514,141 B1 2/2003 Kamkinow et al.
6,514,144 B2 2/2003 Riendeau et al.
6,517,432 B1 2/2003 Jaffe
6,517,433 B2 2/2003 Loose et al.
6,524,184 B1 2/2003 Lind et al.
6,527,638 B1 3/2003 Walker et al.
6,533,660 B2 3/2003 Seelig et al.
6,533,664 B1 3/2003 Crumby
6,537,150 B1 3/2003 Luciano et al.
6,554,703 B1 4/2003 Bussick et al.
6,554,704 B2 4/2003 Nicastro et al.

| | | | |
|---|---|---|---|
| 6,561,904 | B2 | 5/2003 | Locke et al. |
| 6,565,433 | B1 | 5/2003 | Baerlocher et al. |
| 6,565,436 | B1 | 5/2003 | Baerlocher |
| 6,569,016 | B1 | 5/2003 | Baerlocher |
| 6,575,830 | B2 | 6/2003 | Baerlocher et al. |
| 6,582,306 | B1 | 6/2003 | Kaminkow |
| 6,585,591 | B1 | 7/2003 | Baerlocher et al. |
| 6,589,114 | B2 | 7/2003 | Rose |
| 6,599,193 | B2 | 7/2003 | Baerlocher et al. |
| 6,604,740 | B1 | 8/2003 | Singer et al. |
| 6,609,972 | B2 | 8/2003 | Seelig et al. |
| 6,609,973 | B1 | 8/2003 | Weiss |
| 6,616,142 | B2 | 9/2003 | Adams |
| 6,632,139 | B1 | 10/2003 | Baerlocher |
| 6,632,140 | B2 | 10/2003 | Berman et al. |
| 6,634,945 | B2 | 10/2003 | Glavich et al. |
| 6,641,477 | B1 | 11/2003 | Dietz |
| 6,643,943 | B2 | 11/2003 | Dall'Aglio et al. |
| 6,644,663 | B2 | 11/2003 | Seelig et al. |
| 6,645,071 | B2 | 11/2003 | Perrie et al. |
| 6,656,044 | B1 | 12/2003 | Lewis |
| 6,659,864 | B2 | 12/2003 | McGahn et al. |
| 6,666,767 | B1 | 12/2003 | Dayan |
| 6,676,511 | B2 | 1/2004 | Payne et al. |
| 6,676,512 | B2 | 1/2004 | Fong et al. |
| 6,688,977 | B1 | 2/2004 | Baerlocher et al. |
| 6,695,696 | B1 | 2/2004 | Kaminkow |
| 6,702,671 | B2 | 3/2004 | Tarantino |
| 6,702,699 | B2 | 3/2004 | Touhey et al. |
| 6,709,332 | B2 | 3/2004 | Adams |
| 6,712,693 | B1 | 3/2004 | Hettinger |
| 6,712,694 | B1 | 3/2004 | Nordman |
| 6,715,756 | B2 | 4/2004 | Inoue |
| 6,719,630 | B1 | 4/2004 | Seelig et al. |
| 6,722,981 | B2 | 4/2004 | Kaminkow et al. |
| 6,722,982 | B2 | 4/2004 | Kaminkow et al. |
| 6,729,961 | B1 | 5/2004 | Millerschone |
| 6,733,386 | B2 | 5/2004 | Cuddy et al. |
| 6,739,970 | B2 | 5/2004 | Luciano |
| 6,746,328 | B2 | 6/2004 | Cannon et al. |
| 6,746,329 | B1 | 6/2004 | Duhamel |
| 6,749,500 | B1 | 6/2004 | Nelson et al. |
| 6,749,502 | B2 | 6/2004 | Baerlocher |
| 6,755,238 | B1 | 6/2004 | Hirokawa |
| 6,755,738 | B2 | 6/2004 | Glasson et al. |
| 6,764,397 | B1 | 7/2004 | Robb |
| 6,776,711 | B1 | 8/2004 | Baerlocher |
| 6,780,109 | B2 | 8/2004 | Kaminkow |
| 6,786,818 | B1 | 9/2004 | Rothschild et al. |
| 6,796,901 | B2 | 9/2004 | Baerlocher |
| 6,802,775 | B2 | 10/2004 | Baerlocher et al. |
| 6,805,349 | B2 | 10/2004 | Baerlocher et al. |
| 6,805,632 | B2 | 10/2004 | Suda |
| 6,808,454 | B2 | 10/2004 | Gerrard et al. |
| 6,811,483 | B1 | 11/2004 | Webb et al. |
| 6,811,485 | B2 | 11/2004 | Kaminkow |
| 6,824,465 | B2 | 11/2004 | Luciano, Jr. |
| 6,832,957 | B2 | 12/2004 | Falconer |
| 6,837,788 | B2 | 1/2005 | Cannon |
| 6,840,858 | B2 | 1/2005 | Adams |
| 6,855,054 | B2 | 2/2005 | White et al. |
| 6,855,055 | B2 | 2/2005 | Perrie et al. |
| 6,866,583 | B2 | 3/2005 | Glavich et al. |
| 6,875,106 | B2 | 4/2005 | Weiss et al. |
| 6,875,108 | B1 | 4/2005 | Hughs-Baird |
| 6,878,061 | B2 | 4/2005 | Baerlocher et al. |
| 6,887,157 | B2 | 5/2005 | LeMay et al. |
| 6,890,255 | B2 | 5/2005 | Jarvis et al. |
| 6,896,617 | B2 | 5/2005 | Daly |
| 6,905,406 | B2 | 6/2005 | Kaminkow et al. |
| 6,908,381 | B2 | 6/2005 | Ellis |
| 6,910,962 | B2 | 6/2005 | Marks et al. |
| 6,913,533 | B2 | 7/2005 | Cuddy et al. |
| 6,921,334 | B1 | 7/2005 | Bennett |
| 6,921,335 | B2 | 7/2005 | Rodgers et al. |
| 6,929,952 | B2 | 8/2005 | Baerlocher |
| 6,932,700 | B2 | 8/2005 | Bennett et al. |
| 6,935,950 | B2 | 8/2005 | Tarantino |
| 6,939,229 | B2 | 9/2005 | McClintic |

| | | | |
|---|---|---|---|
| 6,942,571 | B1 | 9/2005 | McAllister et al. |
| 6,960,133 | B1 | 11/2005 | Marks et al. |
| 6,960,134 | B2 | 11/2005 | Hard et al. |
| 6,964,416 | B2 | 11/2005 | McClintic et al. |
| 6,966,833 | B2 | 11/2005 | Kaminkow et al. |
| 6,971,955 | B2 | 12/2005 | Baerlocher et al. |
| 6,979,263 | B2 | 12/2005 | Baerlocher et al. |
| 6,981,635 | B1 | 1/2006 | Hughs-Baird et al. |
| 6,986,710 | B2 | 1/2006 | Baerlocher et al. |
| 6,991,538 | B2 | 1/2006 | Cannon |
| 6,997,804 | B2 | 2/2006 | Berman |
| 7,001,274 | B2 | 2/2006 | Baerlocher et al. |
| 7,014,560 | B2 | 3/2006 | Glavich et al. |
| 7,022,016 | B2 | 4/2006 | Wood et al. |
| 7,033,273 | B2 | 4/2006 | Olson |
| 7,040,983 | B2 | 5/2006 | Dolloff et al. |
| 7,048,275 | B2 | 5/2006 | Adams |
| 7,052,395 | B2 | 5/2006 | Glavich et al. |
| 7,056,209 | B2 | 6/2006 | Baerlocher et al. |
| 7,056,213 | B2 | 6/2006 | Ching et al. |
| 7,059,967 | B2 | 6/2006 | Baerlocher |
| 7,070,502 | B1 | 7/2006 | Bussick et al. |
| 7,074,127 | B2 | 7/2006 | Cuddy et al. |
| 7,077,745 | B2 | 7/2006 | Gomez et al. |
| 7,090,580 | B2 | 8/2006 | Rodgers et al. |
| 7,094,148 | B2 | 8/2006 | Baerlocher et al. |
| 7,104,886 | B2 | 9/2006 | Baerlocher et al. |
| 7,108,602 | B2 | 9/2006 | Daly |
| 7,128,646 | B2 | 10/2006 | Baerlocher et al. |
| 7,131,908 | B2 | 11/2006 | Baerlocher |
| 7,137,888 | B2 | 11/2006 | Glavich et al. |
| 7,144,322 | B2 | 12/2006 | Gomez et al. |
| 7,153,205 | B2 | 12/2006 | Baerlocher |
| 7,156,741 | B2 | 1/2007 | Hornik et al. |
| 7,160,186 | B2 | 1/2007 | Cuddy et al. |
| 7,169,042 | B2 | 1/2007 | Muir et al. |
| 7,172,506 | B2 | 2/2007 | Baerlocher et al. |
| 7,179,167 | B2 | 2/2007 | deKeller |
| 7,195,559 | B2 | 3/2007 | Gilmore et al. |
| 7,222,858 | B2 | 5/2007 | Moody |
| 7,226,359 | B2 | 6/2007 | Bussick et al. |
| 7,229,350 | B2 | 6/2007 | Baerlocher et al. |
| 7,236,113 | B1 | 6/2007 | Wang |
| 7,252,591 | B2 | 8/2007 | Van Asdale |
| 7,252,592 | B2 | 8/2007 | Rodgers et al. |
| 7,258,611 | B2 | 8/2007 | Bigelow, Jr. et al. |
| 7,294,055 | B2 | 11/2007 | Baerlocher et al. |
| 7,294,058 | B1 | 11/2007 | Slomiany et al. |
| 7,306,519 | B2 | 12/2007 | Baerlocher |
| 7,309,281 | B2 | 12/2007 | Baerlocher et al. |
| 7,309,282 | B2 | 12/2007 | Baerlocher et al. |
| 7,322,886 | B2 | 1/2008 | Manz |
| 7,331,862 | B2 | 2/2008 | Rodgers et al. |
| 7,331,866 | B2 | 2/2008 | Rodgers et al. |
| 7,341,512 | B2 | 3/2008 | Dolloff et al. |
| 7,357,713 | B2 | 4/2008 | Marks et al. |
| 7,371,169 | B2 | 5/2008 | Baerlocher |
| 7,371,170 | B2 | 5/2008 | Cregan et al. |
| 7,371,172 | B2 | 5/2008 | Inoue |
| 7,396,279 | B2 | 7/2008 | Berman et al. |
| 7,399,225 | B2 | 7/2008 | Kaminkow |
| 7,399,226 | B2 | 7/2008 | Mishra |
| 7,399,227 | B2 | 7/2008 | Michaelson et al. |
| 7,402,102 | B2 | 7/2008 | Marks et al. |
| 7,442,123 | B2 | 10/2008 | Brill et al. |
| 7,448,948 | B2 | 11/2008 | Hughs-Baird et al. |
| 7,470,186 | B2 | 12/2008 | Cannon |
| 7,473,173 | B2 | 1/2009 | Peterson et al. |
| 7,494,412 | B2 | 2/2009 | Baerlocher |
| 7,510,473 | B2 | 3/2009 | Thomas |
| 7,553,230 | B2 | 6/2009 | Cannon |
| 7,553,231 | B2 | 6/2009 | Rodgers et al. |
| 7,563,164 | B2 * | 7/2009 | D'Esposito ..................... 463/17 |
| 7,566,271 | B2 | 7/2009 | Hostetler et al. |
| 7,578,736 | B2 | 8/2009 | Baerlocher et al. |
| 7,597,618 | B2 | 10/2009 | Webb et al. |
| 7,604,539 | B2 | 10/2009 | Hartl et al. |
| 7,611,406 | B2 | 11/2009 | Fuller |
| 7,666,085 | B2 | 2/2010 | Vorias et al. |

7,682,241 B2 3/2010 Baerlocher
7,740,536 B2 6/2010 Pederson et al.
7,837,550 B2 11/2010 Odom
7,901,282 B2 3/2011 Cannon
7,914,373 B2 3/2011 Webb et al.
7,955,170 B2 6/2011 Gail et al.
7,959,509 B2 6/2011 Saffari et al.
2001/0016513 A1 8/2001 Muir et al.
2001/0040341 A1 11/2001 Kamille
2002/0010013 A1 1/2002 Walker et al.
2002/0010015 A1 1/2002 Acres
2002/0010017 A1 1/2002 Bennett
2002/0025849 A1 2/2002 Olive
2002/0045472 A1 4/2002 Adams
2002/0052232 A1 5/2002 Kaminkow
2002/0058545 A1 5/2002 Luciano
2002/0068623 A1 6/2002 Gauselmann
2002/0072404 A1 6/2002 Gerow
2002/0077165 A1 6/2002 Bansemer et al.
2002/0082070 A1 6/2002 Macke et al.
2002/0094857 A1 7/2002 Meyer
2002/0094861 A1 7/2002 Seelig et al.
2002/0098882 A1 7/2002 Lind et al.
2002/0098883 A1 7/2002 Packes, Jr. et al.
2002/0111214 A1 8/2002 Lind et al.
2002/0113369 A1 8/2002 Weingardt
2002/0160830 A1* 10/2002 Stern ............................... 463/20
2002/0169018 A1 11/2002 Schneier et al.
2003/0027623 A1 2/2003 Rose
2003/0034605 A1 2/2003 Hunter et al.
2003/0036422 A1 2/2003 Baerlocher et al.
2003/0036424 A1 2/2003 Baerlocher
2003/0045345 A1 3/2003 Berman
2003/0045354 A1 3/2003 Giobbi
2003/0054874 A1 3/2003 Kaminkow
2003/0057645 A1 3/2003 Baerlocher et al.
2003/0060267 A1 3/2003 Glavich et al.
2003/0064768 A1 4/2003 Fier
2003/0064793 A1 4/2003 Baerlocher et al.
2003/0073480 A1 4/2003 Thomas et al.
2003/0100356 A1 5/2003 Brown et al.
2003/0104856 A1 6/2003 Wolf
2003/0104865 A1 6/2003 Itkis et al.
2003/0127793 A1 7/2003 Adams
2003/0157981 A1 8/2003 Marks et al.
2003/0162579 A1 8/2003 Gauselmann
2003/0181234 A1 9/2003 Falciglia, Sr.
2003/0186736 A1 10/2003 Benbrahim
2003/0190945 A1 10/2003 Bussick et al.
2003/0193136 A1 10/2003 Walker et al.
2003/0203753 A1 10/2003 Muir et al.
2003/0207710 A1 11/2003 Rodgers et al.
2003/0216166 A1 11/2003 Baerlocher et al.
2004/0012145 A1 1/2004 Inoue
2004/0014516 A1 1/2004 Inoue
2004/0014517 A1 1/2004 Inoue
2004/0018866 A1 1/2004 Inoue
2004/0023714 A1 2/2004 Van Asdale
2004/0026854 A1 2/2004 Inoue
2004/0033827 A1 2/2004 Gilmore et al.
2004/0033829 A1 2/2004 Pacey et al.
2004/0036218 A1 2/2004 Inoue
2004/0038726 A1 2/2004 Inoue
2004/0043809 A1 3/2004 Gomez et al.
2004/0048651 A1 3/2004 Vorias et al.
2004/0053669 A1 3/2004 Gerrard et al.
2004/0053671 A1 3/2004 Nordman
2004/0053672 A1 3/2004 Baerlocher
2004/0053676 A1 3/2004 Rodgers
2004/0053687 A1 3/2004 Nordman et al.
2004/0067790 A1 4/2004 Peterson et al.
2004/0072612 A1 4/2004 Rodgers et al.
2004/0097280 A1 5/2004 Gauselmann
2004/0102236 A1 5/2004 Suda et al.
2004/0102244 A1 5/2004 Kryuchkov et al.
2004/0102245 A1 5/2004 Escalera et al.
2004/0106445 A1 6/2004 Perrie et al.
2004/0137982 A1 7/2004 Cuddy et al.
2004/0147306 A1 7/2004 Randall et al.
2004/0152509 A1 8/2004 Hornik et al.
2004/0178579 A1 9/2004 Lowell et al.
2004/0214628 A1 10/2004 Boyd et al.
2004/0224749 A1 11/2004 Seelig et al.
2004/0242310 A1 12/2004 Perkins
2005/0014553 A1 1/2005 Byrne
2005/0020344 A1 1/2005 Kaminkow
2005/0043079 A1 2/2005 Huang
2005/0049035 A1 3/2005 Baerlocher et al.
2005/0054416 A1 3/2005 Hostetler et al.
2005/0054429 A1 3/2005 Baerlocher et al.
2005/0059446 A1 3/2005 Kaminkow
2005/0059467 A1 3/2005 Saffari et al.
2005/0059469 A1 3/2005 Gail et al.
2005/0064924 A1 3/2005 Glavich et al.
2005/0070354 A1 3/2005 Baerlocher et al.
2005/0075161 A1 4/2005 Mcglone et al.
2005/0101379 A1 5/2005 Falconer
2005/0101380 A1 5/2005 Glavich et al.
2005/0101387 A1 5/2005 Wolf
2005/0119042 A1 6/2005 Chamberlain et al.
2005/0119403 A1 6/2005 St. Clair
2005/0148381 A1 7/2005 Marks et al.
2005/0148384 A1 7/2005 Marks et al.
2005/0164772 A1 7/2005 Lind et al.
2005/0164773 A1 7/2005 Lind et al.
2005/0164774 A1 7/2005 Gauselmann
2005/0181860 A1 8/2005 Nguyen et al.
2005/0187014 A1 8/2005 Saffari et al.
2005/0197180 A1 9/2005 Kaminkow et al.
2005/0208990 A1 9/2005 Moore
2005/0227753 A1 10/2005 Luciano, Jr.
2005/0227754 A1 10/2005 Kaminkow et al.
2005/0227759 A1 10/2005 Dolezal
2005/0245307 A1 11/2005 Gatto et al.
2005/0282620 A1 12/2005 Marks et al.
2005/0288094 A1 12/2005 Marks et al.
2006/0025196 A1 2/2006 Webb et al.
2006/0025198 A1 2/2006 Gail et al.
2006/0030392 A1 2/2006 Rodgers et al.
2006/0040727 A1 2/2006 Lind et al.
2006/0040729 A1 2/2006 Manz
2006/0046830 A1 3/2006 Webb
2006/0058097 A1 3/2006 Berman et al.
2006/0068875 A1 3/2006 Cregan et al.
2006/0068882 A1 3/2006 Baerlocher et al.
2006/0068884 A1 3/2006 Baerlocher et al.
2006/0068885 A1 3/2006 Cregan et al.
2006/0073872 A1 4/2006 B-jensen et al.
2006/0073876 A1 4/2006 Cuddy
2006/0073879 A1 4/2006 Baerlocher
2006/0082056 A1 4/2006 Kane et al.
2006/0084492 A1 4/2006 Baerlocher et al.
2006/0084494 A1 4/2006 Belger et al.
2006/0084498 A1 4/2006 Baerlocher et al.
2006/0089191 A1 4/2006 Singer et al.
2006/0116195 A1 6/2006 Baerlocher et al.
2006/0160603 A1 7/2006 Lulek
2006/0172795 A1 8/2006 Bussick et al.
2006/0172799 A1 8/2006 Kane et al.
2006/0178198 A1 8/2006 Fasbender et al.
2006/0199636 A1 9/2006 Ching et al.
2006/0199637 A1 9/2006 Ching et al.
2006/0205468 A1 9/2006 Saffari et al.
2006/0217189 A1 9/2006 Walker et al.
2006/0264254 A1 11/2006 Aoki
2006/0287055 A1 12/2006 Hamud
2006/0287057 A1 12/2006 Osawa
2007/0010316 A1 1/2007 Baerlocher et al.
2007/0021176 A1 1/2007 Jackson
2007/0021188 A1 1/2007 Rodgers et al.
2007/0060246 A1 3/2007 Baerlocher et al.
2007/0060248 A1 3/2007 Rodgers et al.
2007/0060287 A1 3/2007 Reddicks et al.
2007/0060294 A1 3/2007 Cuddy et al.
2007/0087812 A1 4/2007 Glavich et al.
2007/0093287 A1 4/2007 Brunelle et al.
2007/0105614 A1 5/2007 Hornik et al.
2007/0117608 A1 5/2007 Roper et al.

| | | | | |
|---|---|---|---|---|
| 2007/0155471 | A1 | 7/2007 | Powell et al. | |
| 2007/0155472 | A1 | 7/2007 | Gail et al. | |
| 2007/0173313 | A1 | 7/2007 | Bienvenue | |
| 2007/0184887 | A1 | 8/2007 | Cannon | |
| 2007/0287523 | A1 | 12/2007 | Esses et al. | |
| 2008/0051174 | A1 | 2/2008 | Fiden | |
| 2008/0054564 | A1 | 3/2008 | Siegel et al. | |
| 2008/0076535 | A1 | 3/2008 | Baerlocher et al. | |
| 2008/0090655 | A1 | 4/2008 | Marks et al. | |
| 2008/0096670 | A1 | 4/2008 | Baerlocher et al. | |
| 2008/0102931 | A1 | 5/2008 | Marks et al. | |
| 2008/0108411 | A1 | 5/2008 | Jensen et al. | |
| 2008/0108420 | A1 * | 5/2008 | Groves | 463/20 |
| 2008/0113765 | A1 | 5/2008 | DeWall | |
| 2008/0132320 | A1 | 6/2008 | Rodgers | |
| 2008/0139298 | A1 | 6/2008 | Rodgers et al. | |
| 2008/0200232 | A1 | 8/2008 | Baerlocher et al. | |
| 2008/0200238 | A1 | 8/2008 | Mishra | |
| 2008/0214272 | A1 | 9/2008 | Baerlocher et al. | |
| 2008/0214282 | A1 | 9/2008 | Inoue | |
| 2008/0234032 | A1 | 9/2008 | Mullahkhel et al. | |
| 2008/0254894 | A1 | 10/2008 | Michaelson et al. | |
| 2009/0111560 | A1 | 4/2009 | Davis et al. | |
| 2009/0118004 | A1 | 5/2009 | Hoffman | |
| 2009/0124325 | A1 | 5/2009 | Wadleigh et al. | |
| 2009/0124347 | A1 | 5/2009 | Rodgers et al. | |
| 2009/0197663 | A1 | 8/2009 | Schultz | |
| 2009/0264179 | A1 | 10/2009 | McKay et al. | |
| 2010/0004050 | A1 | 1/2010 | Caputo et al. | |
| 2010/0004056 | A1 | 1/2010 | Walker et al. | |
| 2010/0022297 | A1 | 1/2010 | Saunders | |
| 2010/0029364 | A1 | 2/2010 | Zielinski | |
| 2010/0120489 | A1 | 5/2010 | Meyer | |
| 2010/0120507 | A1 | 5/2010 | Rodgers et al. | |
| 2010/0124972 | A1 | 5/2010 | Rodgers et al. | |
| 2010/0130280 | A1 | 5/2010 | Arezina et al. | |
| 2010/0234094 | A1 | 9/2010 | Gagner et al. | |
| 2011/0045906 | A1 | 2/2011 | Berman et al. | |
| 2011/0053675 | A1 | 3/2011 | Aoki et al. | |
| 2011/0086695 | A1 | 4/2011 | Evans | |
| 2011/0111825 | A1 | 5/2011 | Caputo | |
| 2011/0117989 | A1 | 5/2011 | Kennedy et al. | |

FOREIGN PATENT DOCUMENTS

| | | |
|---|---|---|
| AU | 199739339 | 3/1998 |
| AU | 199822969 | 6/1998 |
| AU | 199917318 | 9/1999 |
| AU | 200169612 | 2/2001 |
| AU | 200139027 | 10/2001 |
| AU | 2001256012 | 12/2001 |
| AU | 2001256014 | 12/2001 |
| CA | 2140949 | 10/1995 |
| EP | 0058488 | 8/1982 |
| EP | 0060019 | 9/1982 |
| EP | 0410789 | 1/1991 |
| EP | 0874337 | 10/1998 |
| EP | 0945837 | 9/1999 |
| EP | 0981119 | 2/2000 |
| EP | 0984408 | 3/2000 |
| EP | 0984409 | 3/2000 |
| EP | 1039424 | 9/2000 |
| EP | 1063622 | 12/2000 |
| EP | 1150261 | 10/2001 |
| EP | 1184822 | 3/2002 |
| EP | 1197932 | 4/2002 |
| EP | 1205894 | 5/2002 |
| EP | 1422673 | 5/2004 |
| EP | 1513117 | 3/2005 |
| GB | 1454046 | 10/1976 |
| GB | 2062922 | 5/1981 |
| GB | 2081952 | 2/1982 |
| GB | 2090690 | 7/1982 |
| GB | 2096376 | 10/1982 |
| GB | 2097160 | 10/1982 |
| GB | 2100905 | 1/1983 |
| GB | 2105891 | 3/1983 |
| GB | 2106293 | 4/1983 |
| GB | 2106295 | 4/1983 |
| GB | 2113881 | 8/1983 |
| GB | 2117155 | 10/1983 |
| GB | 2137392 | 10/1984 |
| GB | 2161008 | 1/1986 |
| GB | 2165385 | 4/1986 |
| GB | 2170643 | 8/1986 |
| GB | 2180087 | 3/1987 |
| GB | 2181589 | 4/1987 |
| GB | 2183882 | 6/1987 |
| GB | 2191030 | 12/1987 |
| GB | 2222712 | 3/1990 |
| GB | 2225889 | 6/1990 |
| GB | 2226436 | 6/1990 |
| GB | 2242300 | 9/1991 |
| GB | 2262642 | 6/1993 |
| GB | 2322217 | 8/1998 |
| GB | 2335524 | 9/1999 |
| GB | 2372132 | 2/2001 |
| GB | 2366435 | 6/2002 |
| GB | 2374294 | 10/2002 |
| JP | 7275432 | 10/1995 |
| WO | WO8500910 | 2/1985 |
| WO | WO9732285 | 9/1997 |
| WO | WO9809259 | 3/1998 |
| WO | WO9820949 | 5/1998 |
| WO | WO0012186 | 3/2000 |
| WO | WO0017831 | 3/2000 |
| WO | WO0030727 | 6/2000 |
| WO | WO0032286 | 6/2000 |
| WO | WO0066235 | 11/2000 |
| WO | WO0076606 | 12/2000 |
| WO | WO0119476 | 3/2001 |
| WO | WO0126019 | 4/2001 |
| WO | WO0158546 | 8/2001 |
| WO | WO02092181 | 11/2002 |
| WO | WO02097749 | 12/2002 |
| WO | WO03015881 | 2/2003 |
| WO | WO03015883 | 2/2003 |
| WO | WO03026756 | 4/2003 |
| WO | WO03102885 | 12/2003 |
| WO | WO2004025584 | 3/2004 |
| WO | WO2005028043 | 3/2005 |
| WO | WO2006076294 | 7/2006 |
| WO | WO2007002935 | 1/2007 |
| WO | WO2007084766 | 7/2007 |
| WO | WO2007130443 | 11/2007 |
| WO | WO2007130444 | 11/2007 |

* cited by examiner

1500

All three of the selected digits are displayed along payline B and the order in which they are displayed (4-2-9) matches the selection order (4-2-9). Congratulations, you win 500 credits for payline B! A BONUS symbol was generated! Please wait while a group of multi-dimensional digits rotates to reveal hidden digits...

Award

500

GAMING SYSTEM AND METHOD PROVIDING MULTI-DIMENSIONAL SYMBOL WAGERING GAME

CROSS REFERENCE TO RELATED APPLICATIONS

The present application relates to the following commonly-owned pending patent applications: U.S. patent application Ser. No. 13/187,661, filed on Jul. 21, 2011, entitled "GAMING SYSTEM AND METHOD FOR PROVIDING A MULTI-DIMENSIONAL CASCADING SYMBOLS GAME WITH PLAYER SELECTION OF SYMBOLS," and U.S. patent application Ser. No. 13/187,664, filed on Jul. 21, 2011, entitled "GAMING SYSTEM AND METHOD FOR PROVIDING A MULTI-DIMENSIONAL SYMBOL WAGERING GAME WITH ROTATING SYMBOLS."

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices that provide players awards in primary or base games are well known. These gaming devices generally require a player to place or make a wager to activate the primary game. In many of these gaming devices, the award is based on the player obtaining a winning symbol or winning symbol combination and on the amount of the wager (e.g., the higher the wager, the higher the award). Symbols or symbol combinations that are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter, or dollar), up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary game ranging, for example, from 1 credit up to 125 credits (e.g., 5 credits on each of 25 separate paylines). Accordingly, it should be appreciated that different players play at substantially different wagering amounts or levels and at substantially different rates of play.

Gaming devices with slot games including multiple reels and multiple paylines associated with the reels are well known. In certain of these known gaming devices, the reels are dependent reels and in other of these known gaming devices, the reels are independent reels. Many players enjoy the high hit frequency and volatility the independent reel slot games provide.

Gaming devices that provide cascading symbol or tumbling reel games are also known. In one such cascading symbol or tumbling reel game, a gaming device generates and displays a plurality of symbols in a symbol display matrix or grid. This symbol display grid includes a plurality of two-dimensional symbol display positions. Each symbol display position is associated with a specific row and a specific column of the symbol display grid. In such a cascading symbol game, the gaming device evaluates the displayed symbols and provides an award for each winning symbol combination formed. The gaming device then removes the displayed symbols that form the winning combination(s) of symbols to create one or more empty symbol display positions. The gaming device shifts zero, one, or more of the remaining displayed symbols downward into zero, one, or more of the created empty symbol display positions. If any empty symbol display positions remain, the gaming device generates and displays a symbol for each remaining empty symbol display position. The gaming device then reevaluates the displayed symbols and provides an award for any winning symbol combinations formed. If winning symbol combinations continue to be formed, the gaming device repeats the steps of removing generated symbols, shifting generated symbols, generating new symbols, and evaluating generated symbols.

Another known gaming device provides a "3 Digit Game." During a play of the 3 Digit Game, a player places a wager and selects three of the digits 0 to 9. The order in which the player selects the three digits is a selection order. Thereafter, the gaming device independently generates and displays three of the digits 0 to 9 in a display order. The gaming device then determines whether to provide the player with an award based on: (a) a quantity of the selected digits that were generated and displayed by the gaming device, and (b) a comparison of the selection order and the display order. The gaming device provides the player any determined award.

There is a continuing need to increase the level of excitement and entertainment for people playing gaming devices. There is also need for new ways of providing better gaming experiences and environments at gaming devices. There is a further need for increasing the number of winning symbol combinations generated and awards provided to a player for a play of a game.

SUMMARY

Various embodiments of the present disclosure provide a gaming system and method providing a multi-dimensional symbol wagering game, a multi-dimensional symbol wagering game with cascading symbols, and a multi-dimensional symbol wagering game with rotating symbols.

In one embodiment of the multi-dimensional symbol wagering game, the gaming system has or displays a plurality of symbol display positions, each of the symbol display positions being configured to display one of a plurality of different symbols. The gaming system receives, from a player: (a) a selection of at least one of a plurality of different paylines, each of the paylines being associated with a different plurality of the symbol display positions; (b) at least one wager associated with the player selected paylines; and (c) a selection of a plurality of the symbols in a selection order. After receiving the player's selections and wagers, the gaming system randomly generates and displays one of the symbols at each of the symbol display positions. Thereafter, for each of the player selected paylines, the gaming system determines whether each of at least a designated quantity of the symbol display positions associated with that player selected payline displays any one of the player selected symbols. If each of at least a designated quantity of the symbol display positions associated with that player selected payline displays any one of the player selected symbols, the gaming system determines: (a) a display order of the symbols generated and displayed at the symbol display positions associated with that player selected payline; and (b) any awards associated with that player selected payline to be provided to the player based on: (i) a quantity of the symbol display positions associated with that player selected payline that display the player selected symbols, and (ii) a comparison of the selection order with the display order. The gaming system then causes any determined awards to be provided to the player.

In one embodiment of the multi-dimensional symbol wagering game with cascading symbols, the gaming system utilizes a plurality of adjacent symbol display position grids arranged at a plurality of different depths. Each symbol display position grid at each depth includes a plurality of columns of symbol display positions and a plurality of rows of symbol display positions. Such an arrangement of multiple symbol display position grids at different depths provides that one or more of the generated symbols of at least a first symbol display position grid at a first depth are initially displayed to a player while one or more of the generated symbols of at least a second symbol display position grid at a second depth are not initially displayed to the player (i.e., are blocked by one or more of the generated symbols of the first symbol display position grid at the first depth). In operation of this embodiment of the multi-dimensional symbol wagering game with cascading symbols, when one or more symbols are removed from the first symbol display position grid at the first depth, before and/or after shifting zero, one, or more of the remaining displayed symbols from the first symbol display position grid into zero, one, or more of the created empty symbol display positions of the first symbol display position grid, one or more symbols from the second symbol display position grid at the second depth become revealed or displayed to the player. Such revealed symbols from the second symbol display position grid are then evaluated (in combination with zero, one, or more symbols from one or more other symbol display position grids at different depths) to determine any additional awards to provide to the player.

In one embodiment of the multi-dimensional symbol wagering game with cascading symbols, the gaming system includes a plurality of matrices or grids of symbol display positions. Each grid includes a plurality of symbol display positions configured to display one of a plurality of different symbols. Each symbol display position of each grid is associated with a specific row, a specific column and a specific depth. In one such embodiment, each grid of symbol display positions is formed from a different set of a plurality of reels. For a play of this embodiment of the multi-dimensional symbol wagering game with cascading symbols, the gaming system receives, from a player: (a) a selection of at least one of a plurality of different paylines, each of the paylines being associated with a different plurality of the symbol display positions; (b) at least one wager associated with the player selected paylines; and (c) a selection of a plurality of the symbols in a selection order. The gaming system randomly generates one of the symbols at each of the symbol display positions. The gaming system initially displays the symbols generated at each of the symbol display positions of a first one of the symbol display position grids. In this embodiment, since at least a second one of the symbol display position grids is at least partially positioned behind the first one of the symbol display position grids (relative to the player's line of sight), at least one of the symbols generated in at least one of the symbol display positions of the second one of the symbol display position grids is not initially displayed to the player. In other words, the utilization of a plurality of different symbol display position grids of generated symbols at different depths provides that at different times during the play of the game, certain symbols will be exposed to the player and certain symbols will be hidden from the player.

After generating a symbol in each symbol display position, for each of the player selected paylines, the gaming system determines whether each of at least a designated quantity of the symbol display positions associated with that player selected payline displays any one of the player selected symbols. If each of at least a designated quantity of the symbol display positions associated with that player selected payline displays any one of the player selected symbols, the gaming system determines, for each player selected payline: (a) a display order of the symbols generated and displayed at the symbol display positions associated with that player selected payline; and (b) any awards associated with that player selected payline to be provided to the player based on: (i) a quantity of the symbol display positions associated with that player selected payline that display the player selected symbols, and (ii) a comparison of the selection order with the display order. The gaming system provides the player any determined awards.

After making any award determinations, the gaming system removes zero, one, or more displayed symbols to leave zero, one, or more empty symbol display positions in the first symbol display position grid or matrix. After such removal, if any empty symbol display positions are formed in the first symbol display position grid, the gaming system fills at least one of the empty symbol display positions of the first symbol display position grid. In one embodiment, the gaming system fills such empty symbol display positions by shifting at least one generated symbol displayed in a symbol display position of the first symbol display position into that empty symbol display position of the first symbol display position grid. In this embodiment, the shifting of one or more symbols of the first symbol display position grid into empty symbol display positions of the first symbol display position grid results in the creation of different empty symbol display positions of the first symbol display position grid and thus the exposure of symbols generated in symbol display positions of another symbol display position grid positioned at another depth. That is, the removal of generated symbols, shifting of generated symbols, and creation of empty symbol display positions of one symbol display position grid results in the gaming system displaying generated, but previously hidden, symbols from another symbol display position grid (which is positioned, relative to the player's line of sight, behind the symbol display position grid with the removed symbols).

After exposing zero, one, or more previously hidden symbols, the gaming system repeats the described process of making award determinations based on the displayed symbols, removing symbols, and shifting symbols within a single symbol display position grid to reveal generated symbols in different symbol display position grids at different depths. This repeated process continues until the displayed symbols result in no awards being provided to the player. In the event that an empty symbol display position is created in a symbol display position grid and no symbols from any other symbol display position grids are revealed behind the created empty symbol display position, the gaming system generates one or more of the symbols at one or more of the created empty symbol display positions and then proceeds as described above until the displayed symbols result in no awards being provided to the player. Such a configuration provides the player with additional opportunities to win awards in association with a plurality of grids of symbol display positions.

In one embodiment of the multi-dimensional symbol wagering game with rotating symbols, the gaming system includes a plurality of matrices or grids of symbol display positions. Each grid includes a plurality of symbol display positions configured to display one of a plurality of different multiple dimension symbols each including a plurality of symbol sides displaying one of a plurality of different symbols. This means that in this embodiment, rather than each generated symbol including a length component and a width component (i.e., a two dimensional tile with a symbol on the face of the tile), each generated multiple dimension symbol also includes a depth component (i.e., a three dimensional shape with individual symbols displayed on each side or face of the three dimensional shape). Each symbol display position of each grid is associated with a specific row, a specific column, and a specific depth. Such an arrangement of multiple symbol display position grids at different depths provides that one or more of the symbol sides of the generated multiple dimension symbols of at least a first symbol display position grid at a first depth are initially displayed to a player while one or more of the symbol sides of the generated multiple dimension symbols of at least a second symbol display position grid at a second depth are not initially displayed to the player (i.e., are blocked by one or more of the symbol sides of the generated multiple dimension symbols of the first symbol display position grid at the first depth).

For a play of this embodiment of the multi-dimensional symbol wagering game with cascading symbols, the gaming system receives, from a player: (a) a selection of at least one of a plurality of different paylines, each of the paylines being associated with a different plurality of the symbol display positions; (b) at least one wager associated with the player selected paylines; and (c) a selection of a plurality of the symbols in a selection order. The gaming system randomly generates one of the multiple dimension symbols at each of the symbol display positions. The gaming system initially displays a plurality of the symbol sides of a plurality of the generated multiple dimension symbols such that at least one of the symbol sides of a plurality of the multiple dimension symbols generated at a plurality of the symbol display positions of at least one of the symbol display position grids are initially displayed, and at least one of the symbol sides of a plurality of the multiple dimension symbols generated at a plurality of the symbol display positions of at least one of the symbol display position grids are not initially displayed. In this embodiment, therefore, the utilization of a plurality of different symbol display position grids of generated multiple dimension symbols at different depths provides that at different times during the play of the game, certain symbol sides (and the symbols displayed on those symbol sides) will be exposed to the player and certain symbol sides (and the symbols displayed on those symbol sides) will be hidden from the player.

After generating a symbol in each symbol display position, for each of the player selected paylines, the gaming system determines whether each of at least a designated quantity of the symbol sides of the multiple dimension symbols generated at the symbol display positions associated with that player selected payline displays any one of the player selected symbols. If each of at least a designated quantity of the symbol sides of the multiple dimension symbols generated at the symbol display positions associated with that player selected payline displays any one of the player selected symbols, the gaming system determines, for each player selected payline: (a) a display order of the symbols displayed at the displayed symbol sides of the multiple dimension symbols generated at the at the symbol display positions associated with that player selected payline; and (b) any awards associated with that player selected payline to be provided to the player based on: (i) a quantity of the displayed symbol sides of the multiple dimension symbols generated at the symbol display positions associated with that player selected payline that display the player selected symbols, and (ii) a comparison of the selection order with the display order. The gaming system provides the player any determined awards.

After making any award determinations, the gaming system determines whether a triggering event has occurred. If the triggering event has occurred, the gaming system repositions at least one of the generated multiple dimension symbols such that at least one of the initially displayed symbol sides is not displayed and at least one of the symbol sides not initially displayed is displayed. The gaming system repeats the described process of making award determinations based on the displayed symbols, determining whether a triggering event has occurred, and, if so, repositioning certain of the generated multiple dimension symbols to reveal hidden symbols displayed on hidden symbol sides of one or more generated multiple dimension symbols.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device; or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the multi-dimensional symbol wagering game of the present disclosure are communicated from the central server to the gaming device in a thick client configuration and computerized instructions for controlling any secondary or bonus games or functions are executed by a central server in a thin client configuration.

Figure 1A:
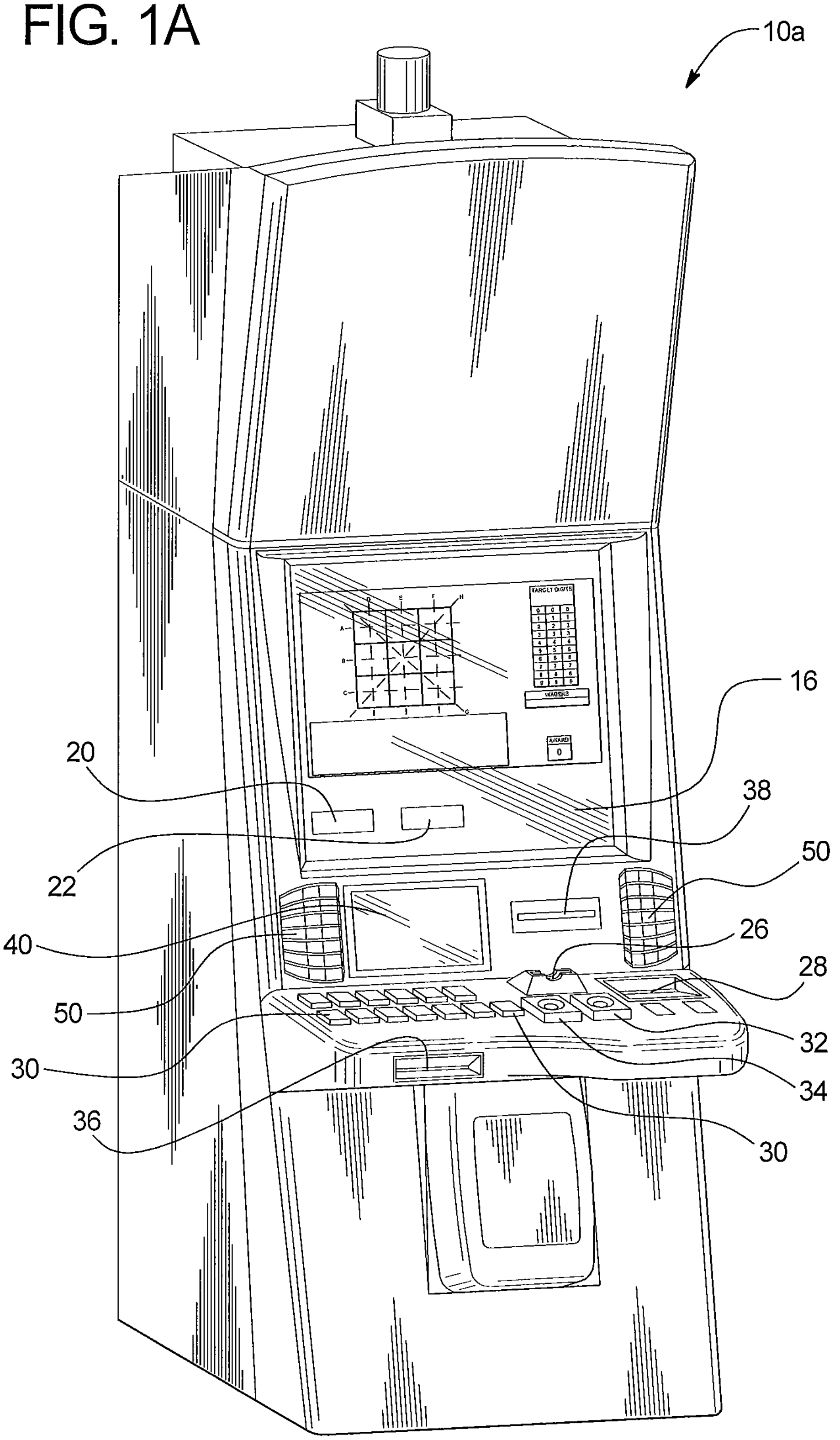
FIGS. 1A and 1B are front perspective views of alternative embodiments of gaming devices disclosed herein.
Figure 1B:
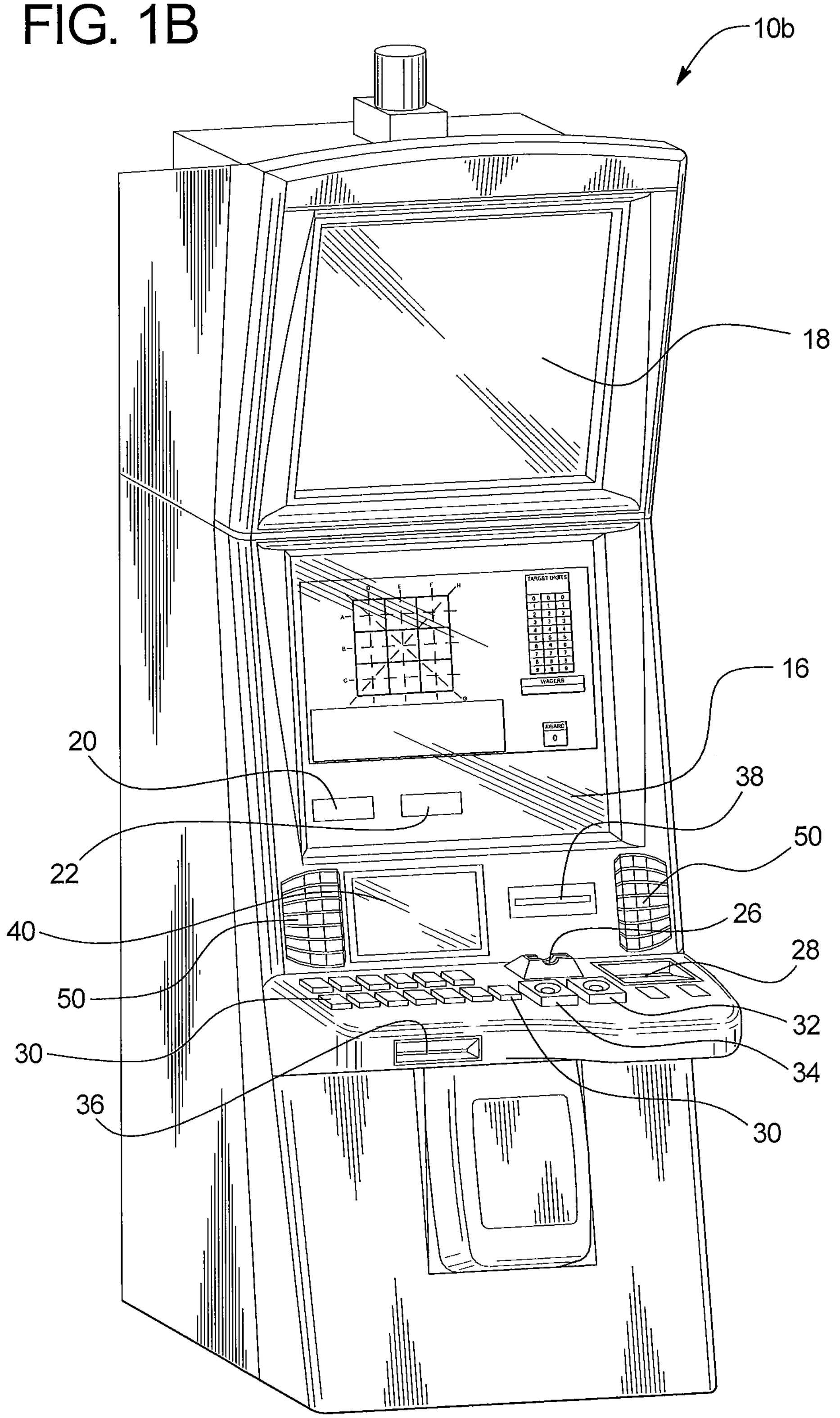

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
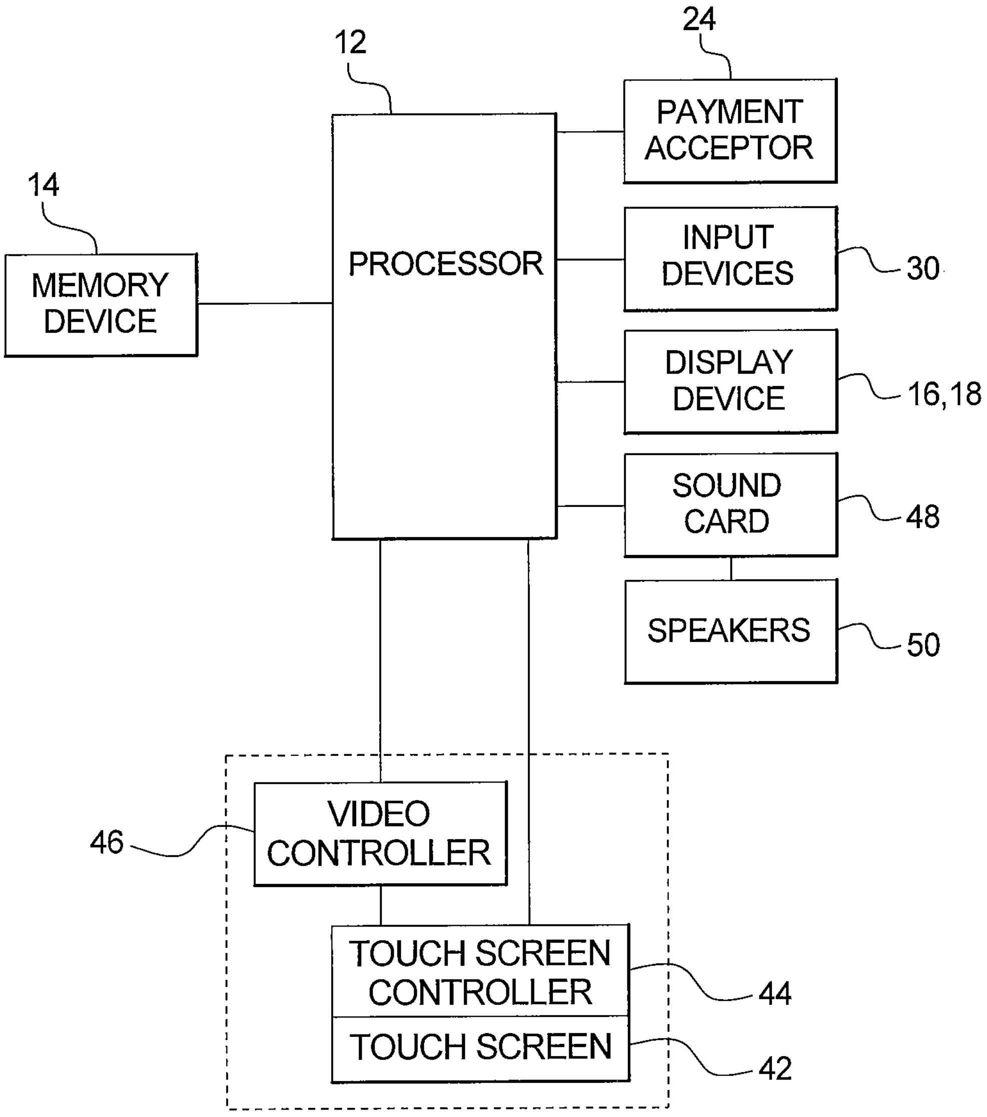
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays the multi-dimensional symbol wagering game. This display device may also display any suitable secondary or bonus game associated with the multi-dimensional symbol wagering game as well as information relating to the multi-dimensional symbol wagering game or the secondary or bonus game. The alternative embodiment shown in FIG. 1B includes a central display device 16 and an upper display device 18. The upper display device may display the multi-dimensional symbol wagering game, any suitable secondary or bonus game associated or not associated with the multi-dimensional symbol wagering game, and/or information relating to the multi-dimensional symbol wagering or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the multi-dimensional symbol wagering game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the multi-dimensional symbol wagering game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the multi-dimensional symbol wagering and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the multi-dimensional symbol wagering game and/or the secondary or bonus game as a game image, symbol, or indicia.

Gaming device 10 incorporates the multi-dimensional symbol wagering game as the primary or base game. It should be appreciated that in certain other embodiments the multi-dimensional symbol wagering game is a secondary or bonus game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different secondary or bonus games, such as video poker games, video blackjack games, video keno, video bingo, game may be implemented.

In one embodiment, the multi-dimensional symbol wagering game includes and/or the secondary or bonus game includes one or more paylines associated with a plurality of symbol display positions. The paylines may be horizontal, vertical, circular, diagonal, angled, or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the multi-dimensional symbol wagering game, the gaming device may also give players the opportunity to win credits in a secondary or bonus game or in a secondary or bonus round. The secondary or bonus game enables the player to obtain a prize or payout in addition to the prize or payout, if any, obtained from the multi-dimensional symbol wagering game. In general, a secondary or bonus game produces a significantly higher level of player excitement than the multi-dimensional symbol wagering game because it provides a greater expectation of winning than the multi-dimensional symbol wagering game, and is accompanied with more attractive or unusual features than the multi-dimensional symbol wagering game. In one embodiment, the secondary or bonus game may be any type of suitable game, either similar to or completely different from the multi-dimensional symbol wagering game.

In one embodiment, the triggering event or qualifying condition may be a selected outcome in the multi-dimensional symbol wagering game or a particular arrangement of one or more indicia on a display device in the multi-dimensional symbol wagering game, such as the number seven appearing on three adjacent reels along a payline in the multi-dimensional symbol wagering game. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the multi-dimensional symbol wagering game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the multi-dimensional symbol wagering game.

In one embodiment, the gaming device includes a program that will automatically begin a secondary or bonus round after the player has achieved a triggering event or qualifying condition in the multi-dimensional symbol wagering game. In another embodiment, after a player has qualified for a secondary or bonus game, the player may subsequently enhance his/her secondary or bonus game participation through continued play on the multi-dimensional symbol wagering game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the multi-dimensional symbol wagering game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the multi-dimensional symbol wagering game, thus encouraging play of the multi-dimensional symbol wagering game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the multi-dimensional symbol wagering game to qualify for the secondary or bonus game. In this embodiment, the secondary or bonus game triggering event must occur and the side-wager (or designated multi-dimensional symbol wagering game wager amount) must have been placed to trigger the secondary or bonus game.

Figure 2B:
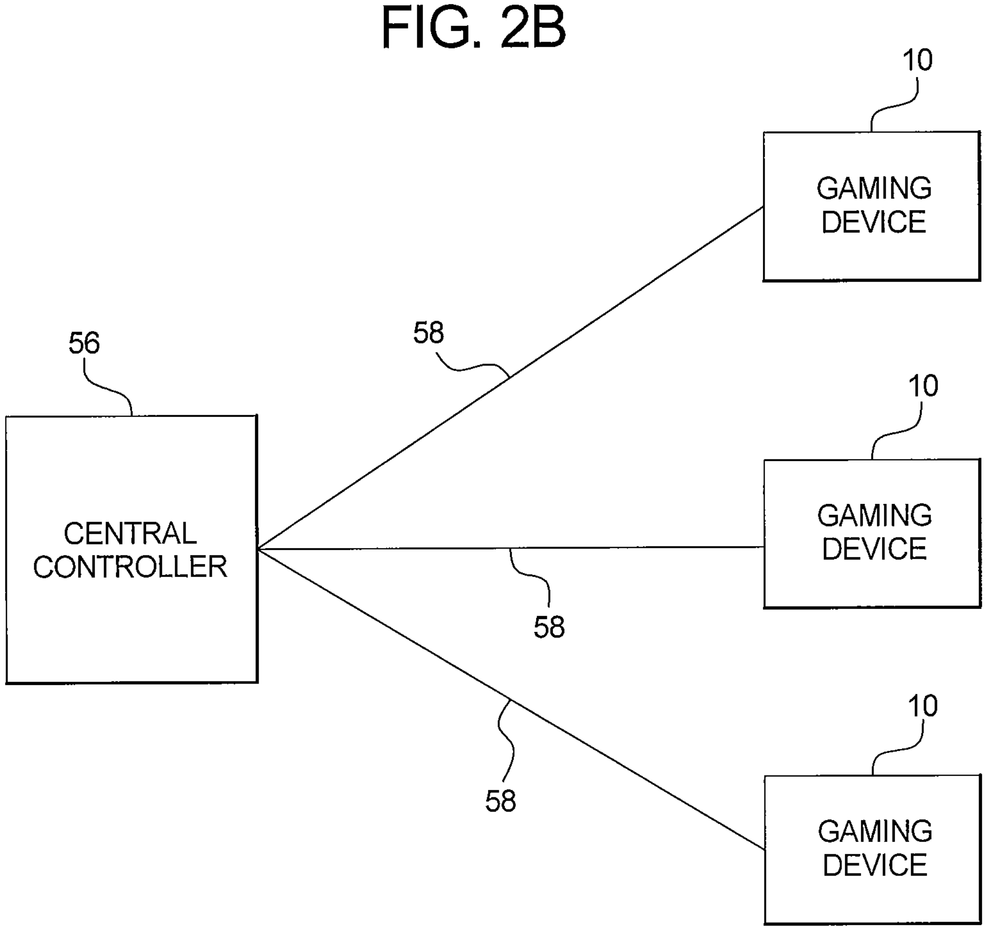
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the multi-dimensional symbol wagering game based on probability data. In another embodiment, the central server or controller randomly generates a game outcome for the secondary or bonus game based on probability data. In another embodiment, the central server or controller randomly generates a game outcome for both the multi-dimensional symbol wagering game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a multi-dimensional symbol wagering game outcome, a secondary or bonus game outcome, multi-dimensional symbol wagering game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the multi-dimensional symbol wagering game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first game, and a second gaming device to have selected elements marked in a different predetermined pattern is provided a second outcome of win $2, which will be provided to a second player regardless of how the second player plays a second game. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an Internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the multi-dimensional symbol wagering game, a secondary or bonus game, or both. In another embodiment, the game program may be executable as a secondary or bonus game to be played simultaneous with the play of the multi-dimensional symbol wagering game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the multi-dimensional symbol wagering game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the multi-dimensional symbol wagering game. That is, a player is provided a progressive award without any explanation or, alternatively, with simple explanations. In another embodiment, a player is provided a progressive award at least partially based on a game triggered or symbol triggered event, such as at least partially based on the play of the multi-dimensional symbol wagering game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the multi-dimensional symbol wagering game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the multi-dimensional symbol wagering game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the multi-dimensional symbol wagering game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multi-Dimensional Symbol Wagering Game

Figure 3:
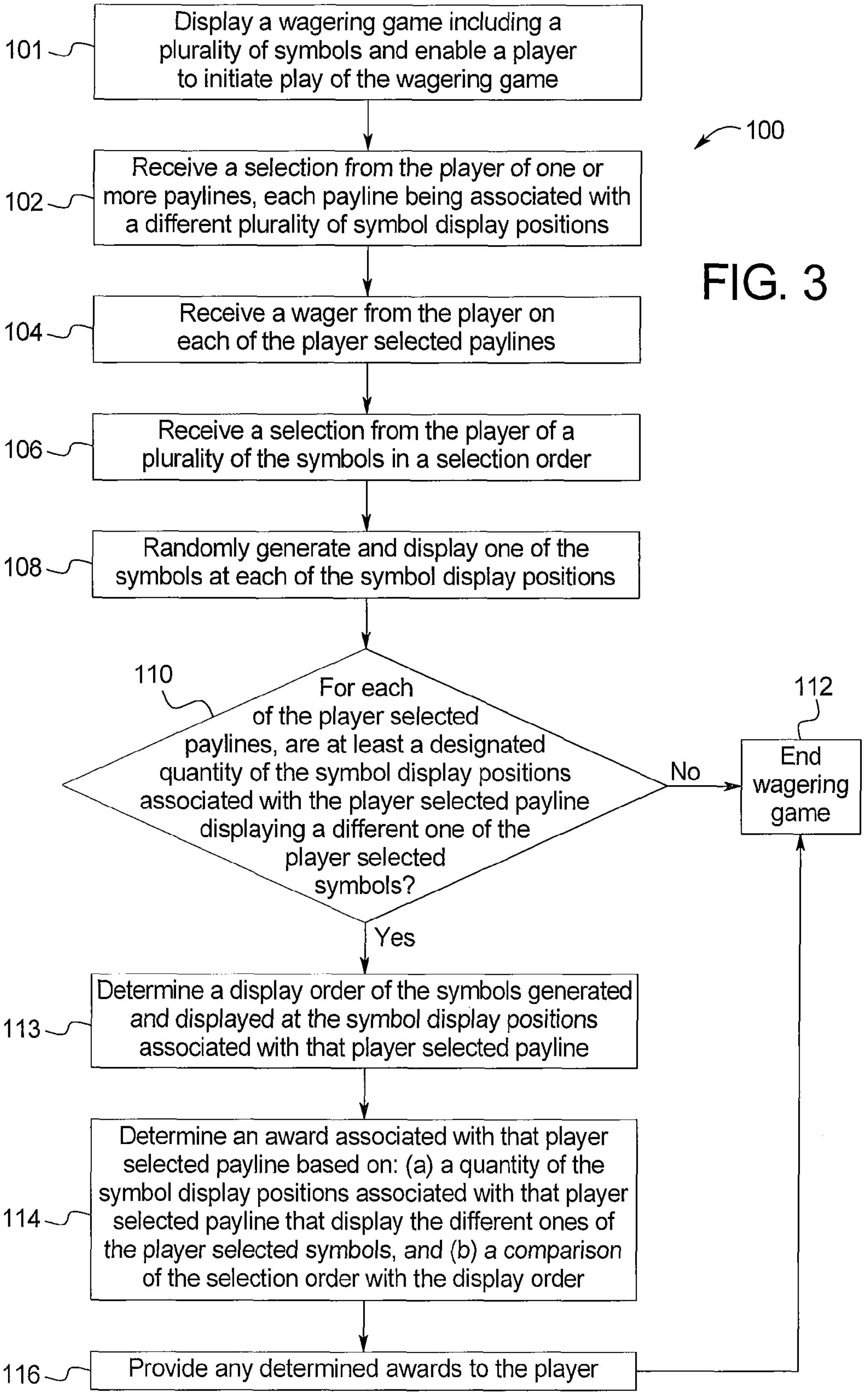
FIG. 3 is a flowchart illustrating one embodiment of a method of operating the gaming system providing the multi-dimensional symbol wagering game disclosed herein.

FIG. 3 illustrates a flowchart of one example embodiment of a process or method 100 for operating a gaming system or a gaming device. In one embodiment, this process 100 is embodied in one or more software programs stored in one or more memories and executed by one or more processors or controllers. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a wagering game including a plurality of symbols and enables a player to initiate play of the wagering game, as indicated in block 101. The gaming system receives a selection from the player of one or more paylines, as indicated in block 102. In this embodiment, each of the paylines is associated with a different plurality of symbol display positions. The gaming system receives a wager from the player on each of the selected paylines, as indicated in block 104. The gaming system receives a selection from the player of a plurality the symbols in a selection order, as indicated in block 106. The gaming system randomly generates and displays one of the symbols at each of the symbol display positions, as indicated in block 108.

The gaming system determines, for each of the player selected paylines, whether at least a designated quantity of the symbol display positions associated with that player selected payline displays a different one of the player selected symbols, as indicated in diamond 110. If a designated quantity of the symbol display positions associated with at least one of the player selected paylines do not each display different ones of the player selected symbols, the wagering game ends, as indicated by block 112. If a designated quantity of the symbol display positions associated with at least one of the player selected paylines each display a different one of the player selected symbols, the gaming system determines a display order of the symbols generated and displayed at the symbol display positions associated with that player selected payline, as indicated in block 113, and determines any awards associated with that player selected payline to be provided to the player based on (a) a quantity of the symbol display positions associated with that player selected payline that display the different ones of the player selected symbols, and (b) a comparison of the selection order with the display order, as indicated in block 114. The gaming system provides any determined awards to the player, as indicated in block 116.

FIGS. 4, 5, 6, 7, 8, and 9 illustrate screen shots of one example embodiment of the gaming system and gaming device of the present disclosure. The gaming system includes a display device that displays a multi-dimensional symbol wagering game (sometimes referred to herein as "wagering game" for brevity) including a plurality of different symbols. The display device displays a plurality of symbol display positions, each of which is configured to display one of the symbols. In this example embodiment, the symbols are digits and the symbol display positions are digit display positions. Accordingly, this embodiment of the gaming system includes a display device 130 that displays a wagering game including a plurality of different digits, which are digits: 0, labeled 170*a*; 1, labeled 170*b*; 2, labeled 170*c*; 3, labeled 170*d*; 4, labeled 170*e*; 5, labeled 170*f*; 6, labeled 170*g*; 7, labeled 170*h*; 8, labeled 170*i*; and 9, labeled 170*j*. For clarity and brevity, digits 0 170*a*, 1 170*b*, 2 170*c*, 3 170*d*, 4 170*e*, 5 170*f*, 6 170*g*, 7 170*h*, 8 170*i*, and 9 170*j* are sometimes referred to herein as digits 0, 1, 2, 3, 4, 5, 6, 7, 8, and 9.

The display device 130 displays a plurality of digit display positions 132, 134, 136, 138, 140, 142, 144, 146, and 148, each of which is configured to display one of the digits 0, 1, 2, 3, 4, 5, 6, 7, 8, and 9. In this embodiment, the display device 130 adjacently displays the digit display positions 132, 134, 136, 138, 140, 142, 144, 146, and 148 in a 3×3 grid or matrix. It should be appreciated that the display device may display any suitable quantity of symbol display positions in any suitable configuration. While, in this embodiment, the wagering game includes symbols in the form of the digits 0 to 9, it should be appreciated that the wagering game may include any suitable type of symbols such as, but not limited to, playing cards, dice, dominos, and Mahjong tiles.

The display device 130 displays a plurality of paylines, each of which is associated with a different plurality of the digit display positions 132, 134, 136, 138, 140, 142, 144, 146, and 148. Specifically, payline A 150 is associated with digit display positions 132, 134, and 136; payline B 152 is associated with digit display positions 138, 140, and 142; payline C 154 is associated with digit display positions 144, 146, and 148; payline D 156 is associated with digit display positions 132, 138, and 144; payline E 158 is associated with digit display positions 134, 140, and 146; payline F 160 is associated with digit display positions 136, 142, and 148; payline G 162 is associated with digit display positions 132, 140, and 148; and payline H 164 is associated with digit display positions 136, 140, and 144. For clarity and brevity, payline A 150, payline B 152, payline C 154, payline D 156, payline E 158, payline F 160, payline G 162, and payline H 164 are sometimes referred to herein as paylines A, B, C, D, E, F, G, and H.

It should be appreciated that in certain embodiments the display device may display any suitable quantity of paylines.

It should also be appreciated that each of the displayed paylines may be associated with any suitable quantity of the symbol display positions displayed by the display device. It should further be appreciated that each of the displayed paylines may be associated with any suitable combination of the symbol display positions displayed by the display device.

The display device 130 displays a digit selection area 170. The digit selection area 170 includes a first column of selectable digits 172, a second column of selectable digits 174, and a third column of selectable digits 176. In this example embodiment, each of the columns of selectable digits 172, 174, and 176 includes the digits 0, 1, 2, 3, 4, 5, 6, 7, 8, and 9. This means that each of the columns of selectable digits 172, 174, and 176 includes each of the digits included in the wagering game.

It should be appreciated that in certain embodiments the display device may display any suitable quantity of columns of selectable symbols. It should also be appreciated that at least one of the columns of selectable symbols may include fewer than all of the symbols included in the wagering game. It should further be appreciated that each of the columns of selectable symbols may include different quantities of the symbols included in the wagering game. It should further be appreciated that the column may include any suitable combination of the symbols included in the wagering game.

The display device 130 displays an award indicator or display 166, which indicates any award a player has won during play of the wagering game; a wager indicator or display 168, which indicates the paylines that the player has selected and wagered on and the amounts of any such wagers; and an indication or dialog box 128, which displays instructions or comments related to the wagering game during, before, and/or after play of the wagering game. It should be appreciated that, in certain embodiments, the display device displays one or a plurality of the award indicator, the wager indicator, and the indication box.

Figure 4:
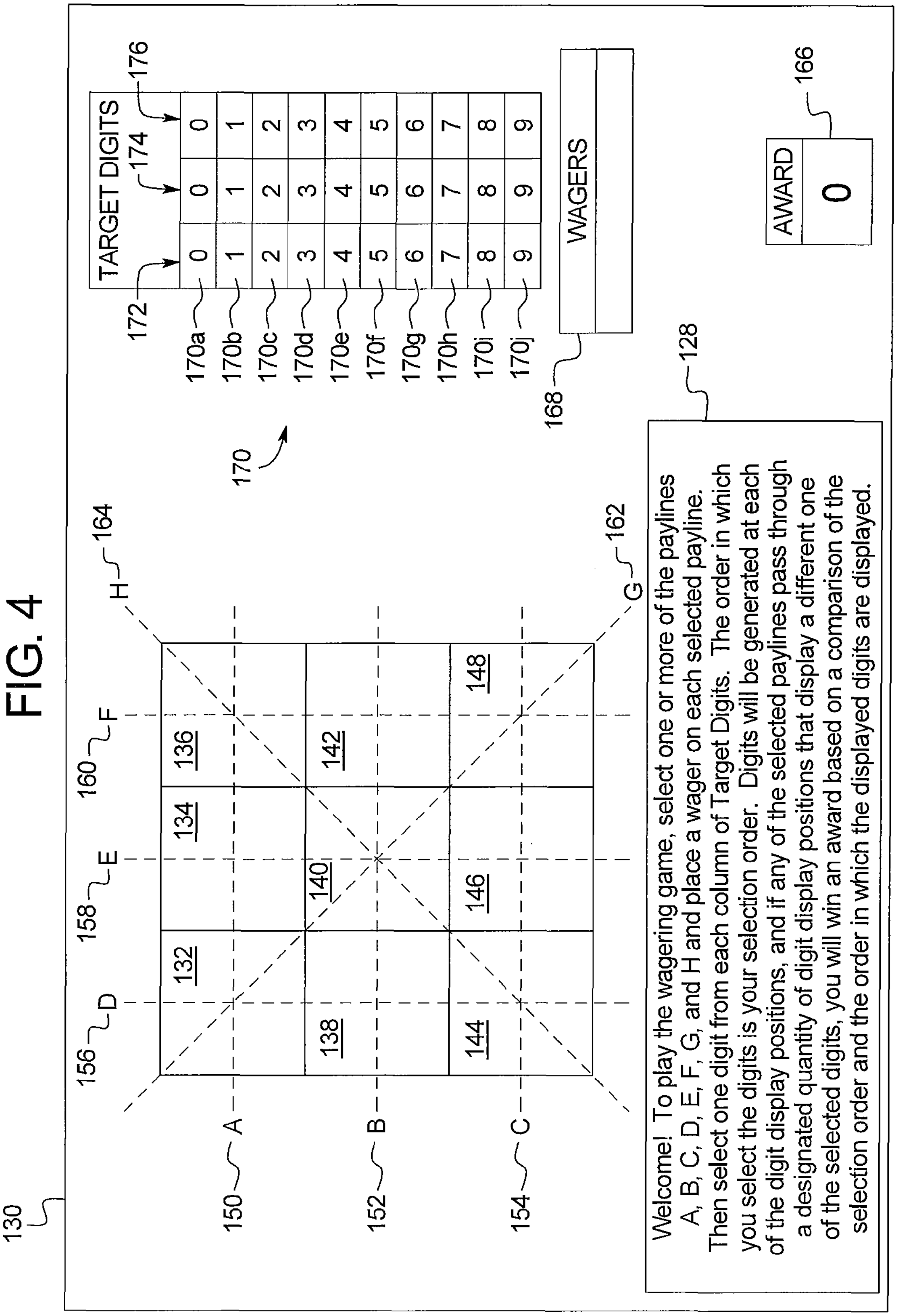
FIGS. 4, 5, 6, 7, 8, and 9 are front elevational views of the display of one embodiment of the gaming system disclosed herein illustrating a play of the multi-dimensional symbol wagering game.

As illustrated in FIG. 4, when the gaming system is not being played by a player, the display device 130 displays an attract screen that includes a welcome message in the indication box 128. The welcome message describes the operation of the wagering game, as generally explained below.

During a play of the wagering game, a player selects one or more of the paylines A, B, C, D, E, F, G, and H; places a wager on each of the selected paylines; and selects one of the digits 0, 1, 2, 3, 4, 5, 6, 7, 8, and 9 from each of (a) the first column of selectable digits 172, (b) the second column of selectable digits 174, (c) and the third column of selectable digits 176. The order in which the player selects the digits from the columns of selectable digits is referred to herein as the selection order. One of the digits 0, 1, 2, 3, 4, 5, 6, 7, 8, and 9 is randomly generated at each of the digit display positions 132, 134, 136, 138, 140, 142, 144, 146, and 148. For each of the player selected paylines, if that player selected payline is associated with (e.g., passes through) at least a designated quantity of digit display positions that each display a different one of the player selected digits, the gaming system determines: (a) a display order of the digits generated and displayed at the digit display positions associated with that player selected payline, and (b) any awards associated with that player selected payline to be provided to the player based at least in part on: (i) the quantity of digit display positions associated with that player selected payline that display different ones of the player selected digits, and (ii) a comparison of the selection order with the display order. It should be appreciated that the gaming system may determine the display order of the symbols at any suitable time.

Figure 5:
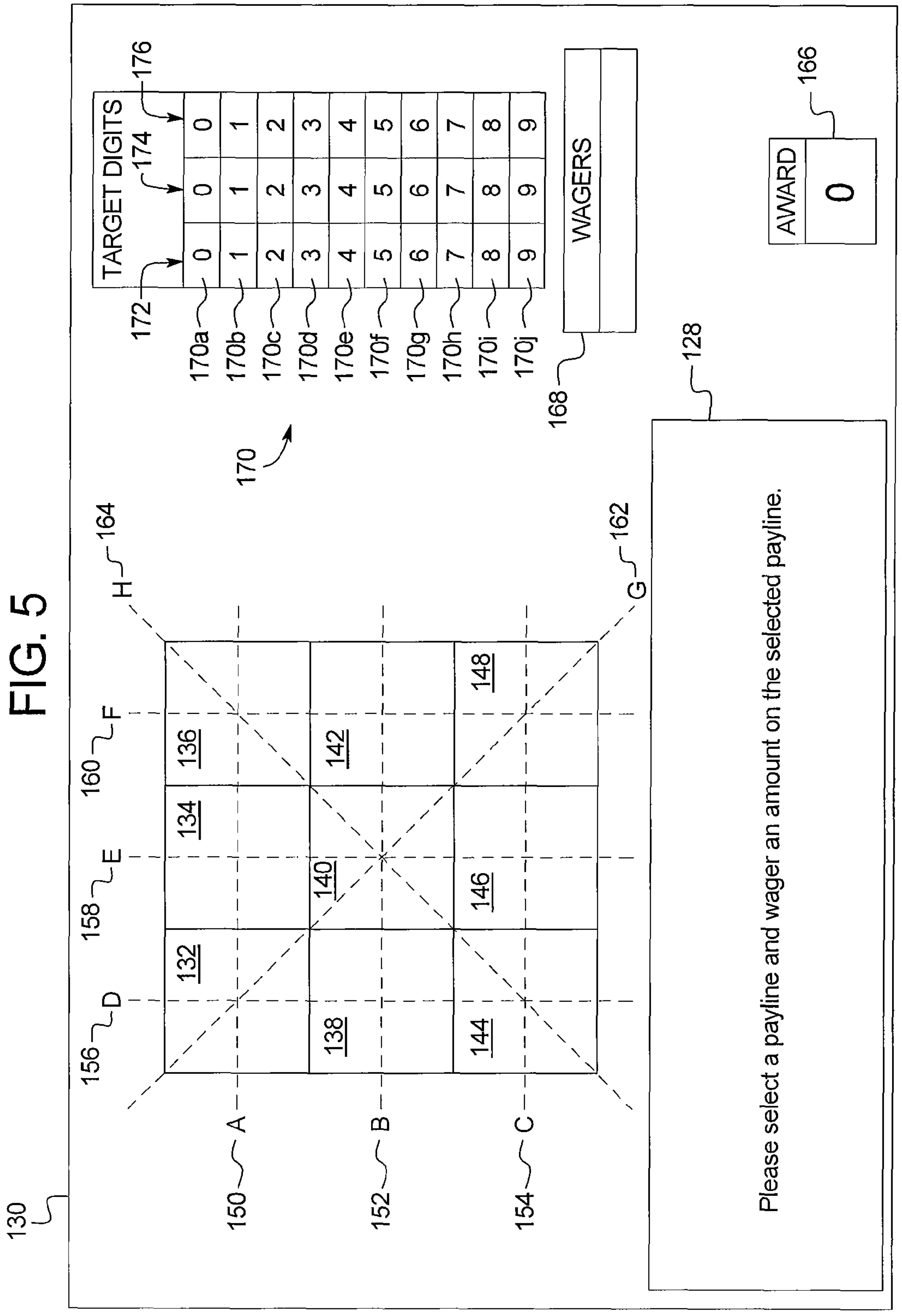

As illustrated in FIG. 5, when a player begins play of the wagering game, the gaming system instructs and enables the player to select one of the paylines A, B, C, D, E, F, G, and H and to place a wager on the selected payline. In this embodiment, the digit display positions 132, 134, 136, 138, 140, 142, 144, 146, and 148 are blank, meaning that they do not display any digits at the outset of the wagering game. It should be appreciated that, in other embodiments, each or a plurality of the symbol display positions initially display one of the symbols. In one example embodiment, each of the symbol display positions initially displays the symbol generated at that symbol display position in the previous play of the wagering game.

Figure 6:
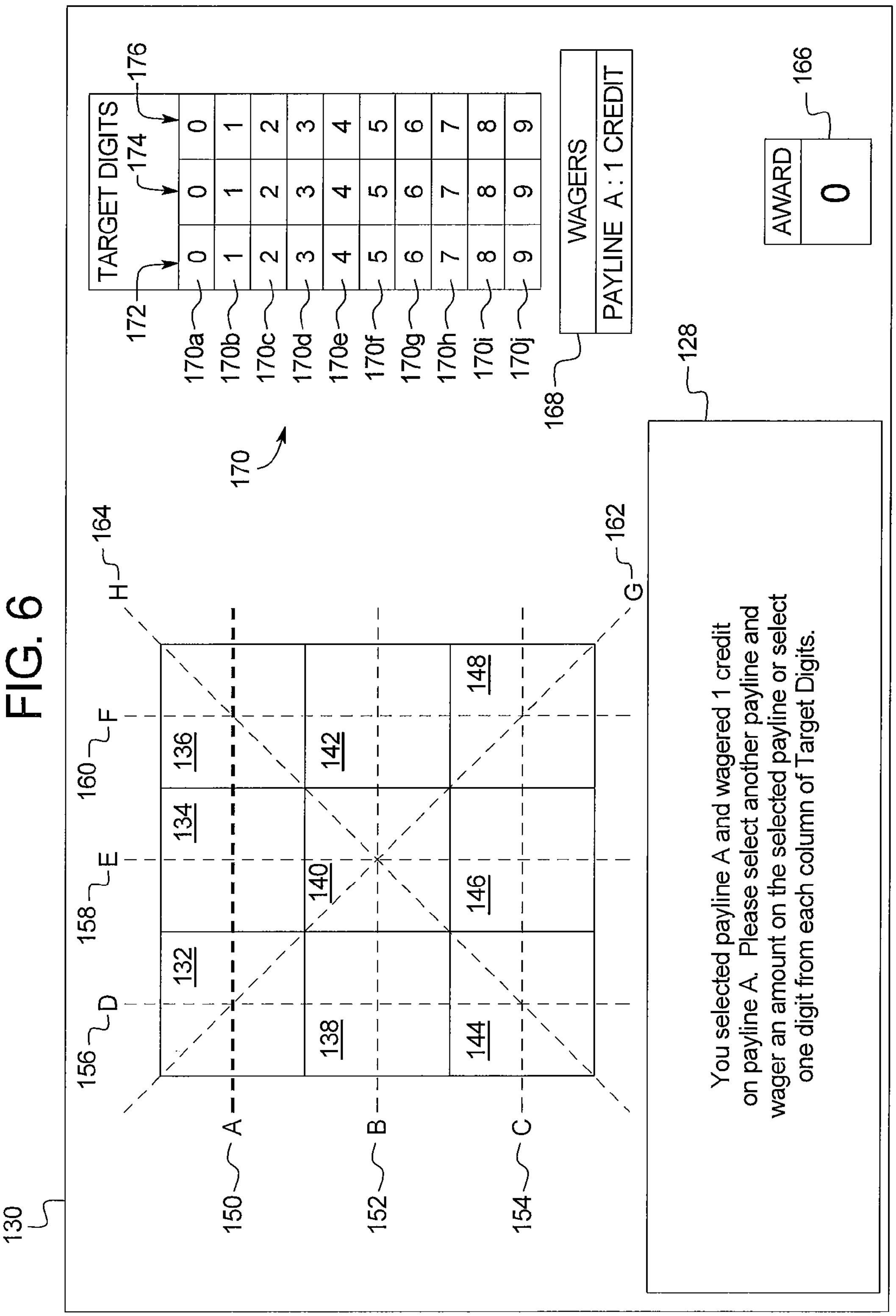

As illustrated in FIG. 6, the player has selected payline A and has wagered 1 credit on payline A. In this embodiment, the player selected payline (i.e., payline A) is highlighted to indicate that it has been selected. The wager indicator 168 also displays an indication that the player has wagered 1 credit on payline A. The gaming system instructs and enables the player to select another one of the paylines B, C, D, E, F, G, and H (if desired) and to place a wager on the selected payline. Alternatively, the gaming system instructs and enables the player to select one of the digits 0, 1, 2, 3, 4, 5, 6, 7, 8, and 9 from each of (a) the first column of selectable digits 172, (b) the second column of selectable digits 174, and (c) the third column of selectable digits 176. It should be appreciated that the gaming system may require the player to select and wager on a minimum quantity of paylines prior to enabling the player to select the symbols.

Figure 7:
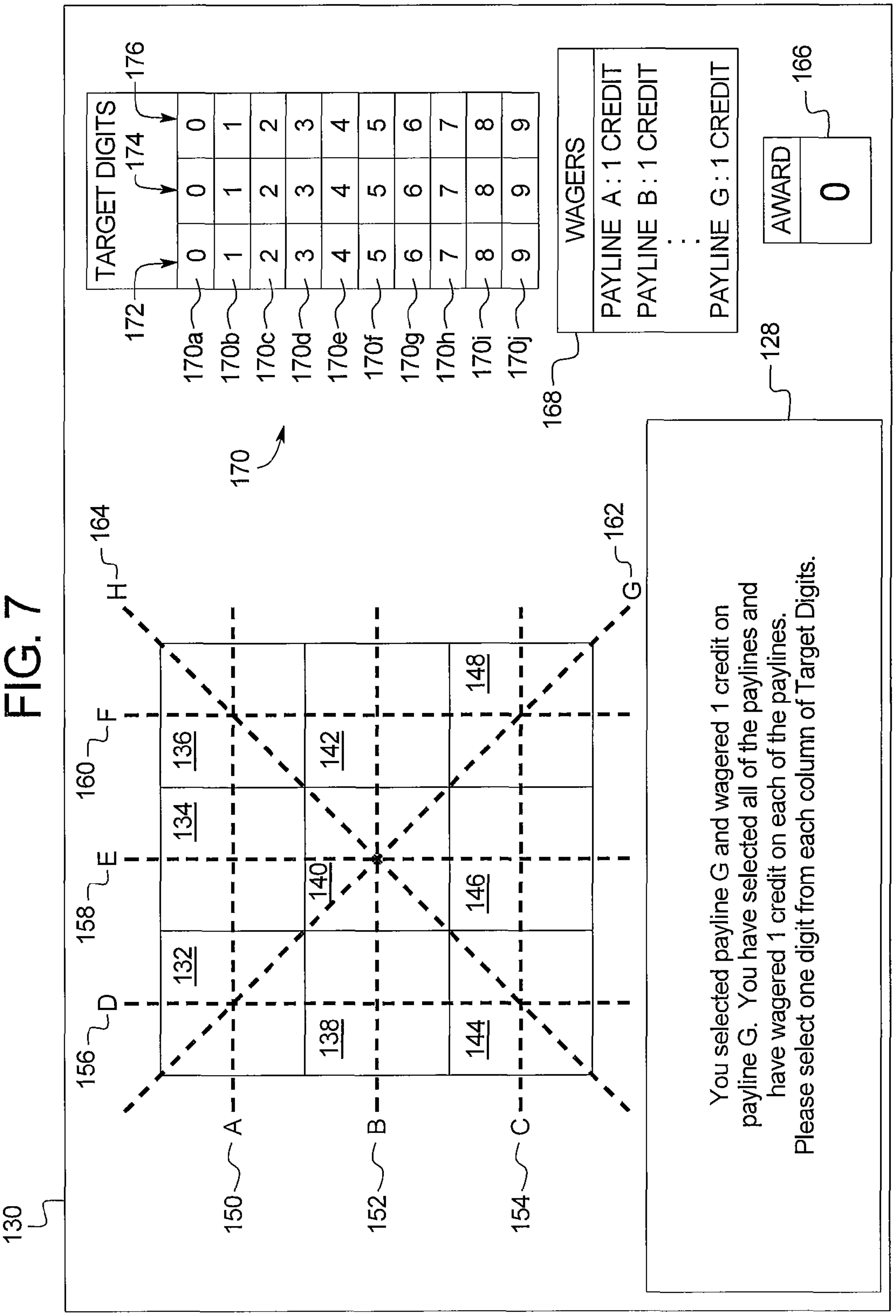

As illustrated in FIG. 7, the player has selected each of the paylines A, B, C, D, E, F, G, and H, and has placed a wager of 1 credit on each of these selected paylines. In this embodiment, the player selected paylines (i.e., all of the paylines) are highlighted to indicate that they have been selected. The wager indicator 168 also displays an indication of each of these wagers. The gaming system instructs and enables the player to select one of the digits 0, 1, 2, 3, 4, 5, 6, 7, 8, and 9 from each of (a) the first column of selectable digits 172, (b) the second column of selectable digits 174, and (c) the third column of selectable digits 176.

As explained above, the order in which the player selects the digits from the columns of selectable digits is referred to herein as the selection order. In this embodiment, the gaming system establishes the selection order, meaning that the gaming system enables the player to select the digits in a predetermined order. Specifically, the gaming system enables the player to select one of the digits from the first column of selectable digits 172, then, after the player makes that selection, enables the player to select one of the digits from the second column of selectable digits 174, then, after the player makes that selection, enables the player to select one of the digits from the third column of selectable digits 176. Thus, in this embodiment, the selection order is: (1) the digit selected from the first column of selectable symbols 172, which is referred to herein as the first player selected digit; (2) the digit selected from the second column of selectable digits 174, which is referred to herein as the second player selected digit; and (3) the digit selected from the third column of selectable digits 176, which is referred to herein as the third player selected digit. It should be appreciated that in certain embodiments the gaming system does not establish the selection order. It should also be appreciated that in certain embodiments the gaming system establishes the selection order randomly, based on a wager made by a player, or in any other suitable manner. It should be appreciated that in certain embodiments the gaming system enables the player to change the selection order. In one of these embodiments, the gaming system enables the player to change the selection order before it generates symbols in the symbol display positions. It should be appreciated that in certain embodiments the gaming system enables the player to confirm the selection order and, if the selection order is not the desired selection order, change the selection order. In one of these embodiments, the gaming system enables the player to confirm the selection order before it generates symbols at the symbol display positions.

Figure 8:
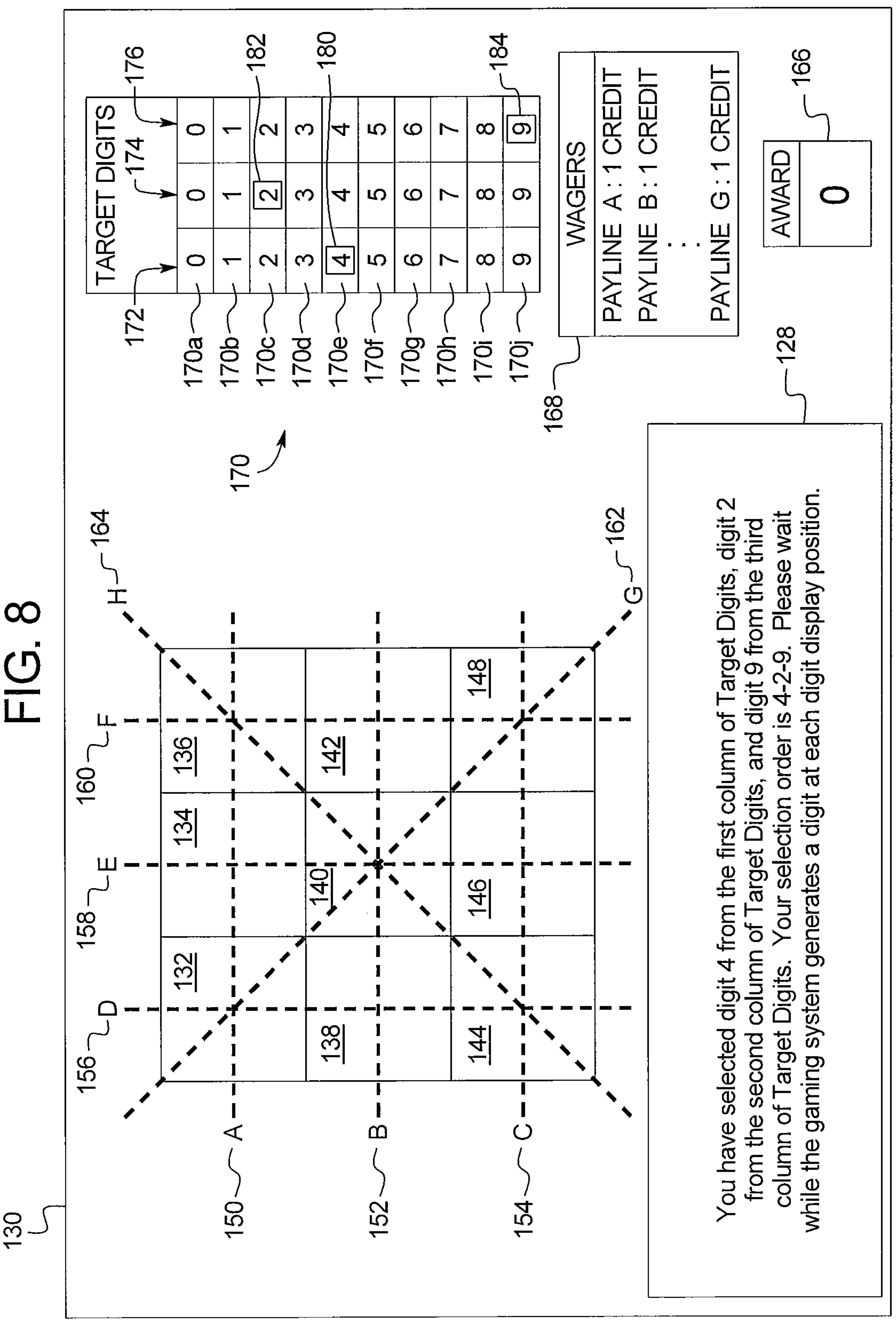

As illustrated in FIG. 8, the player selected: digit 4 from the first column of selectable digits 172, digit 2 from the second column of selectable digits 174, and digit 9 from the third column of selectable digits 176. Thus, in this embodiment, digit 4 is the first player selected digit, digit 2 is the second player selected digit, and digit 9 is the third player selected digit. Accordingly, the selection order of the player selected digits is 4-2-9. In this embodiment, the display device 130 displays indications that indicate the first, second, and third player selected digits, such as by displaying boxes 180, 182, and 184 around the player selected digits in the digit selection area 170. It should be appreciated that any suitable indication may be employed to indicate the player selected symbols.

Figure 9:
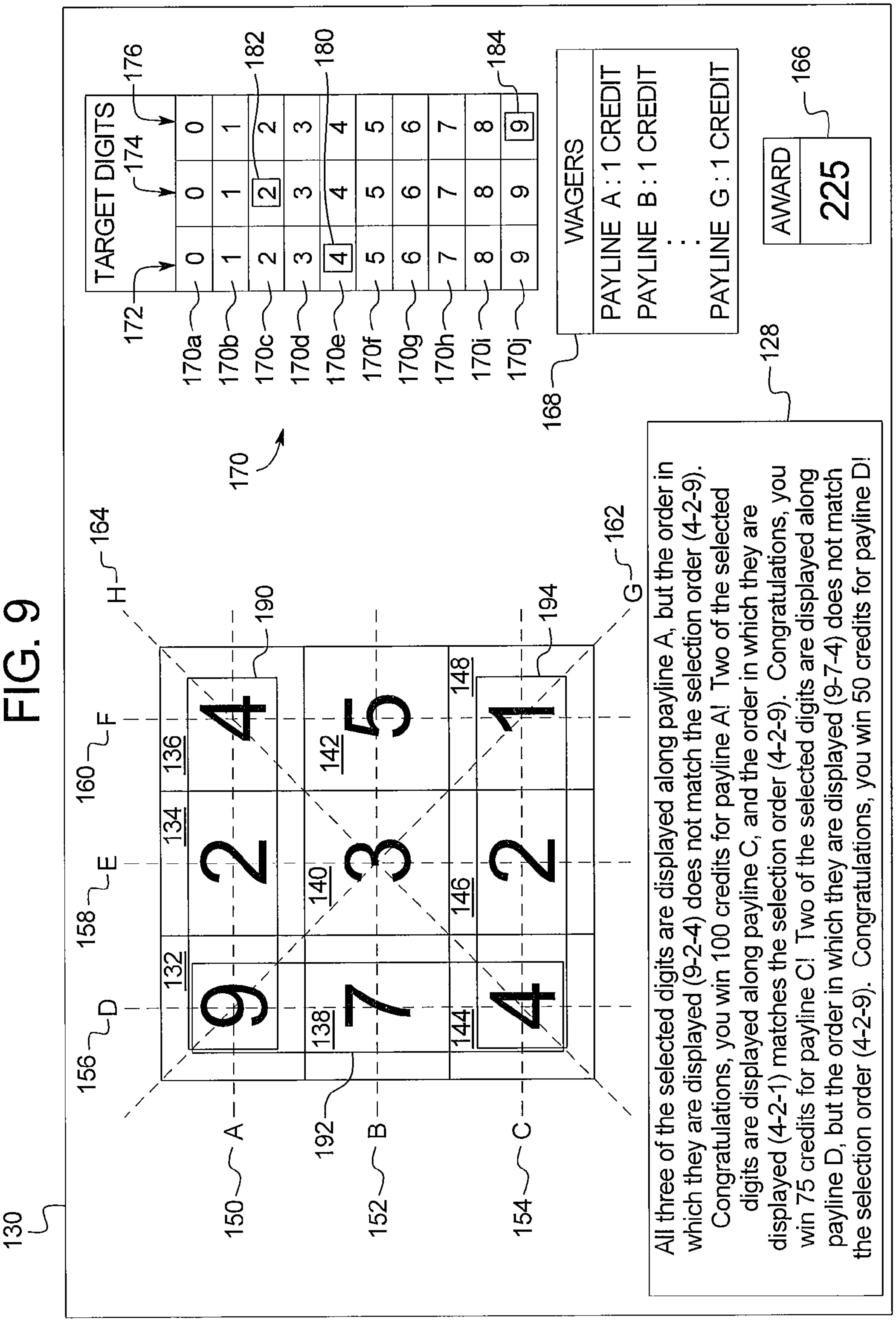

As illustrated in FIG. 9, after the player selects the first, second, and third player selected symbols, the gaming system randomly generates one of the symbols at each of the symbol display positions. In this embodiment, the gaming system generated and displayed: digit 9 at symbol display position 132, digit 2 at digit display position 134, digit 4 at digit display position 136, digit 7 at digit display position 138, digit 3 at digit display position 140, digit 5 at digit display position 142, digit 4 at digit display position 144, digit 2 at digit display position 146, and digit 1 at digit display position 148.

The gaming system determines, for each of the player selected paylines, if that player selected payline is associated with (e.g., passes through) a designated quantity of digit display positions that each display a different one of the player selected digits. If so, the gaming system determines: (a) a display order of the digits generated and displayed at the digit display positions associated with that player selected payline; and (b) any awards associated with that player selected payline to be provided to the player based at least in part on: (i) the quantity of digit display positions associated with that player selected payline that display different ones of the player selected digits, and (ii) a comparison of the selection order with the display order. In this embodiment, the designated quantity is two, although it should be appreciated that in other embodiments the designated quantity may be any suitable quantity. In this embodiment, the player selected and placed a wager on each of the paylines; therefore, the gaming system makes an award determination for each of the paylines. In certain embodiments, a paytable (not shown) indicating the awards the player may win during play of the wagering game and the conditions for receiving such awards is displayed to the player.

In this embodiment, the display order for a horizontal payline is defined from left to right, the display order for a vertical payline is defined from top to bottom, and the display order for a diagonal payline is defined from top to bottom. It should be appreciated that the display order for a horizontal payline may be defined in any suitable manner such as, but not limited to, left to right, right to left, or randomly. It should also be appreciated that the display order for a vertical payline may be defined in any suitable manner such as, but not limited to, top to bottom, bottom to top, or randomly. It should further be appreciated that the display order for a vertical payline may be defined in any suitable manner such as, but not limited to, top to bottom, bottom to top, left to right, right to left, or randomly.

In this embodiment, for a given payline, the award increases as the quantity of digit display positions associated with that payline that display different ones of the player-selected digits increases. For example, if a payline is associated with three symbol display positions, a play of the multi-dimensional symbol wagering game that results in all of the three symbol display positions each displaying a different one of the player-selected digits is associated with a greater award than a play that results in two of the three symbol display positions each displaying a different one of the player-selected digits. The award also increases the closer the selection order is to the display order. For example, if the selection order is 1-2-3, a play of the multi-dimensional symbol wagering game that results in a display order of 1-2-3 is associated with a greater award than a play that results in a display order of 1-2, 1-3, 2-3, or 1-3-2. In one embodiment, if a payline is associated with three digit display positions, the player receives the maximum award if each of the digit display positions displays a different one of the player-selected digits in a display order that exactly matches the selection order. In one embodiment, a player may receive an award if only one of the symbol display positions associated with a payline displays one of the player-selected symbols, and the position of that displayed player-selected symbol matches its position in the selection order. For example, if the selection order is 4-5-6 and the display order is 1-5-8, the player wins an award for matching the 5 in the correct order.

Horizontal payline A is associated with digit display position 132, which displays digit 9; digit display position 134, which displays digit 2; and digit display position 136, which displays digit 4. Thus, the display order of the digits associated with payline A is 9-2-4. The first, second, and third player selected digits, listed in the selection order, are 4-2-9. Each of the three digit display positions 132, 134, and 136 associated with payline A display a different one of the first, second, and third player selected digits. The display order does not exactly match the selection order (i.e., the displayed digits along payline A are not displayed in the order 4-2-9). The player is provided an award of 100 credits associated with payline A in accordance with these determinations (i.e., all three of the player selected digits being displayed along payline A, but the display order not matching the selection order). In this embodiment, the display device displays an indicator, such as a box 190, associated with the digit combination 9-2-4 along payline A to indicate to the player that that digit combination is associated with an award.

Horizontal payline B is associated with digit display position 138, which displays digit 7; digit display position 140, which displays digit 3; and digit display position 142, which displays digit 5. Thus, the display order of the digits associated with payline B is 7-3-5. The first, second, and third player selected digits, listed in the selection order, are 4-2-9. None of the three symbol display positions 138, 140, and 142 associated with payline B display the first, second, or third player selected digits. Accordingly, the player is not provided with an award associated with payline B.

Horizontal payline C is associated with digit display position 144, which displays digit 4; digit display position 146, which displays digit 2; and digit display position 148, which displays digit 1. Thus, the display order of the digits associated with payline C is 4-2-1. The first, second, and third player selected digits, listed in the selection order, are 4-2-9. Two digit display positions 144 and 146 associated with payline C display a different one of the first, second, and third player selected digits. The display order in which digits 4 and 2 are displayed exactly matches the selection order. The player is provided an award of 75 credits in accordance with these determinations (i.e., two of the player selected digits being displayed along payline C, and the display order matching the selection order). In this embodiment, the display device 130 displays an indicator, such as a box 194, associated with the digit combination 4-2-1 along payline C to indicate to the player that that digit combination is associated with an award.

Vertical payline D is associated with digit display position 132, which displays digit 9; digit display position 138, which displays digit 7; and digit display position 144, which displays digit 4. Thus, the display order of the digits associated with payline D is 9-7-4. The first, second, and third player selected digits, listed in the selection order, are 4-2-9. Two digit display positions 132 and 144 associated with payline D display a different one of the first, second, and third player selected digits. The display order does not exactly match the selection order. The player is provided an award of 50 credits in accordance with these determinations (i.e., two of the player selected digits being displayed along payline D, but the display order not matching the selection order). In this embodiment, the display device 130 displays an indicator, such as a box 192, associated with the digit combination 9-7-4 along payline D to indicate to the player that that digit combination is associated with an award.

Vertical payline E is associated with digit display position 134, which displays digit 2; digit display position 140, which displays digit 3; and digit display position 146, which displays digit 2. Thus, the display order of the digits associated with payline E is 2-3-2. While digit display positions 134 and 146 each display the second player selected digit, there are not at least two digit display positions associated with payline E that display different ones of the player selected digits. Accordingly, the player is not provided with an award associated with payline E.

Vertical payline F is associated with digit display position 136, which displays digit 4; digit display position 142, which displays digit 5; and digit display position 148, which displays digit 1. Thus, the display order of the digits associated with payline F is 4-5-1. The first, second, and third player selected digits, listed in the selection order, are 4-2-9. Only digit display position 136 displays one of the first, second, and third player selected digits. Accordingly, the player is not provided with an award associated with payline F.

Diagonal payline G is associated with digit display position 132, which displays digit 9; digit display position 140, which displays digit 3; and digit display position 148, which displays digit 1. Thus, the display order of the digits associated with payline G is 9-3-1. The first, second, and third player selected digits, listed in the selection order, are 4-2-9. Only digit display position 132 displays one of the first, second, and third player selected digits. Accordingly, the player is not provided with an award associated with payline G.

Diagonal payline H is associated with digit display position 136, which displays digit 4; digit display position 140, which displays digit 3; and digit display position 144, which displays digit 4. Thus, the display order of the digits associated with payline H is 4-3-4. The first, second, and third player selected digits, listed in the selection order, are 4-2-9. While digit display positions 136 and 144 each display the first player selected digit, there are not at least two digit display positions associated with payline H that display different ones of the player selected digits. Accordingly, the player is not provided with an award associated with payline H.

Once the gaming system has made any award determinations associated with the player selected paylines, the determined awards are provided to the player. In this embodiment, the display device displays an indication of the sum of any determined awards in the award indicator 166. In other embodiments, the display device displays each individual determined award in the award indicator 166. The display device 130 may also display a more detailed explanation of any determined awards in the indication area 128.

In certain embodiments, the gaming system enables the player to select paylines in any suitable manner such as, but not limited to, enabling the player to select a payline selection area associated with the payline or enabling the player to press a button associated with the payline. The gaming system may also enable the player to select a group of paylines on which to place one or more wagers.

In certain embodiments, the gaming system enables the player to place wagers on the selected paylines in any suitable manner such as, but not limited to, enabling the player to press wagering buttons to choose the wager amount for the payline, enabling the player to manipulate a slider interface to choose the wager amount for the payline, or enabling the player to manipulate a data field to choose the wager amount for the payline. In other embodiments, the gaming system does not enable the player to wager a different amount on each selected payline; rather, the gaming system enables the player to wager the same amount on each payline.

In another embodiment, the gaming system enables the player to place a box wager on at least one of the player selected paylines. In this embodiment, if a designated quantity of the symbol display positions associated with that payline display different ones of the player selected symbols, the player wins an award regardless of the order in which the different ones of the player selected symbols are displayed.

In one embodiment, the gaming system enables the player to select the quantity of paylines on which the player desires to place a wager rather than enabling the player to select which paylines on which the player desires to place a wager. It should be appreciated that in this embodiment the gaming system enables the player to select the quantity of paylines on which to place a wager in any suitable manner such as, but not limited to, enabling the player to press one of a plurality of buttons to choose the quantity of paylines, enabling the player to manipulate a slider interface to choose the quantity of paylines, or enabling the player to manipulate a data field to choose the quantity of paylines. In another embodiment, the gaming system randomly chooses which paylines on which the player may place a wager. In another embodiment, the gaming system chooses the paylines based on the wager placed by the player.

In certain embodiments, the gaming system randomly selects the selectable symbols rather than enabling the player to select the selectable symbols. In one of these embodiments, the gaming system enables the player to select a quick pick button or input and, in response to that selection, randomly selects the selectable symbols.

In certain embodiments, the gaming system enables the player to select the quantity of symbol display positions to be displayed by the display device for the play of the wagering game. In one of these embodiments, the award opportunities, size of the awards, number of paylines, quantity of player-selected symbols, and/or wagering opportunities increase as the quantity of symbol display positions increases.

In one embodiment, each payline is associated with the same quantity of symbol display positions. In another embodiment, each payline is not associated with the same quantity of symbol display positions. In another embodiment, the quantity of player selected symbols the gaming system enables the player to choose is equal to the maximum quantity of symbol display positions associated with any one of the paylines.

In one embodiment, the symbols are chosen from the plurality of symbols without replacement. In certain of these embodiments, the player-selected symbols are also chosen without replacement. In certain of these embodiments, the gaming system requires the player to select and wager on a minimum quantity of paylines.

In another embodiment, the gaming system enables the player to determine the display order for at least one of the player selected paylines. For example, the player may determine that the display order is determined any one of the following manners: top to bottom, bottom to top, left to right, right to left, and randomly. In other embodiments, the manner in which the gaming system determines the display order is based on the wager(s) placed by the player.

While the symbol selection area 170 of the embodiment described above with respect to FIGS. 4, 5, 6, 7, 8, and 9 includes three columns of selectable digits 172, 174, and 176, it should be appreciated that the selectable symbols may be displayed or provided to the player in any suitable manner. For example, in one embodiment the selectable symbols are displayed in rows of selectable symbols, and a player selects one symbol from each row of selectable symbols. In another embodiment, the selectable symbols are displayed in a data field, and a player selects a quantity of the displayed symbols by manipulating the data field. In yet another embodiment, the selectable symbols are displayed in association with one or more sliders, and the player selects a quantity of the symbols by manipulating the sliders.

In certain embodiments, the gaming system may require the player to press or actuate a "Play" or "Start" button in order for the gaming system to randomly generate the symbols. If the player does not press the "Play" or "Start" button within a predetermined time period, the gaming system may randomly generate the symbols. It should also be appreciated that any symbols initially displayed at the symbol display positions may be removed prior to, during, or upon the generation and display of new symbols at the symbol display positions.

In certain embodiments, the display device displays an indication at each symbol display position that the gaming system is generating one of the symbols for display at that symbol display position. In one example embodiment, during symbol generation the display device displays symbols that continuously change at each of the symbol display positions. In another example embodiment, during symbol generation the display device displays a rotating sphere at each of the symbol display positions that includes a plurality of the symbols. It should be appreciated that the display device may or may not display any indication at the symbol display positions during symbol generation.

In certain embodiments, the display device displays an indication that the symbols have been generated prior to, during, or after the generated symbols are displayed at the symbol display positions. In one example embodiment, the display device displays a hopper, and balls displaying the generated symbols are shot from the hopper into their corresponding symbol display positions. In another example embodiment, the display device displays blocks displaying the generated symbols that fall from the top of the display device into their corresponding symbol display positions.

In one embodiment, the plurality of symbols includes a WILD symbol. In this embodiment, the gaming system may randomly generate and display the WILD symbol at one of the symbol display positions instead of or in addition to one of the symbols. When a WILD symbol is generated and displayed at one of the symbol display positions, the WILD symbol acts as the symbol that will maximize the player's award. For example, if the player-selected symbols in the selection order are 1-2-3 and the gaming system generates and displays the symbols in the display order 1-WILD-3, the WILD symbol acts as the 2 symbol, which is associated with the maximum award in this play of the multi-dimensional symbol wagering game. It should be appreciated that in certain embodiments the player may not select the WILD symbol as one of the player selected symbols.

In another embodiment, the gaming system includes a BONUS symbol. In this embodiment, the gaming system may randomly generate and display the BONUS symbol at one of the symbol display positions instead of or in addition to one of the symbols. In one embodiment, the BONUS symbol triggers one or more free plays of a secondary or bonus game, which may be the multi-dimensional symbol wagering game of the present disclosure or any other suitable game. In another embodiment, the gaming system provides the player with a bonus award when the BONUS symbol is generated and displayed at one of the symbol display positions. In another embodiment, the BONUS symbol acts as the WILD symbol described above. It should be appreciated that in certain embodiments the player may not select the BONUS symbol as one of the player selected symbols.

Multi-Dimensional Symbol Wagering Game With Cascading Symbols

Figure 10A:
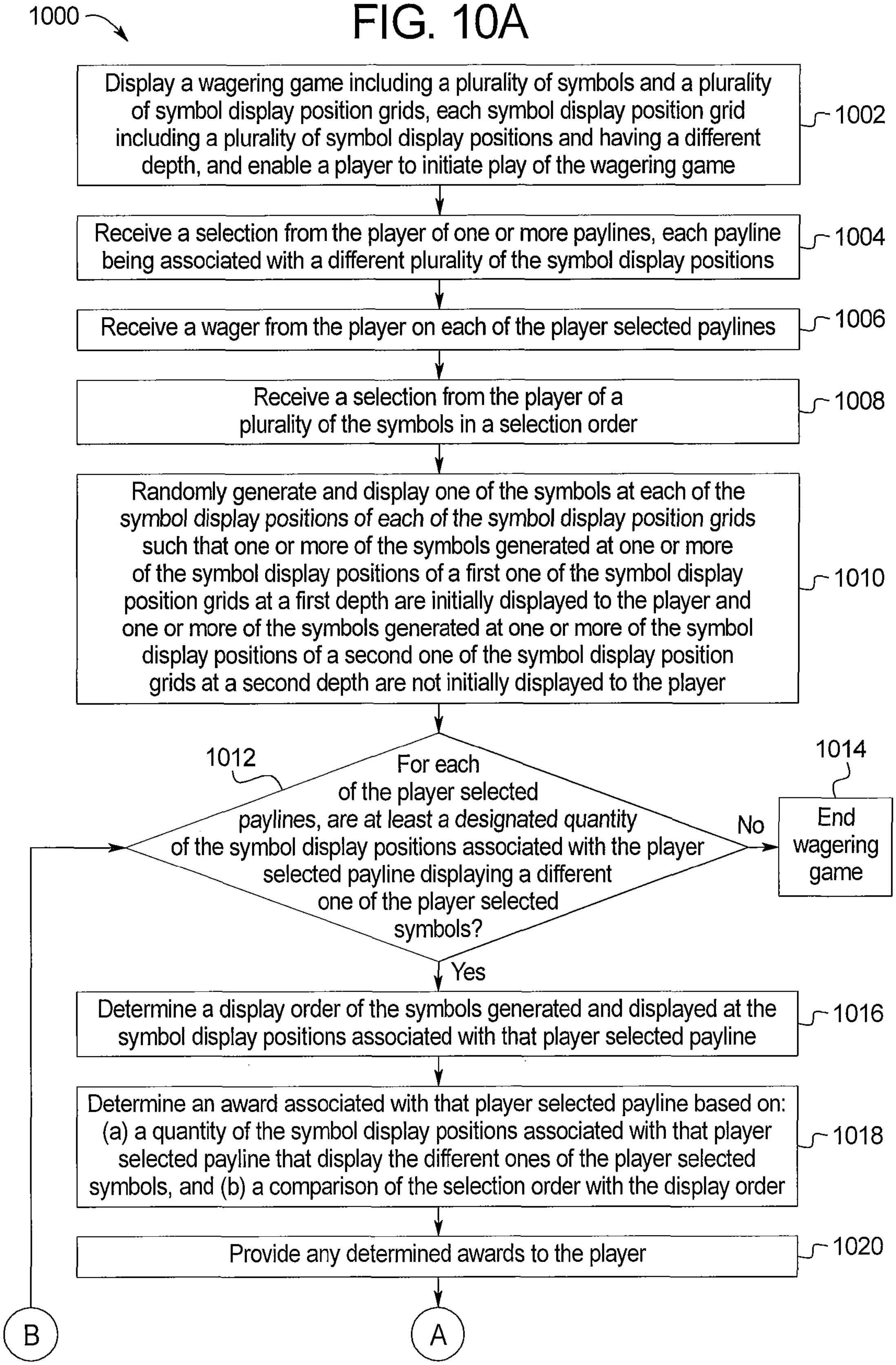
FIGS. 10A and 10B are a flow chart illustrating one embodiment of a process for operating the gaming system providing the multi-dimensional symbol wagering game with cascading symbols disclosed herein.
Figure 10B:
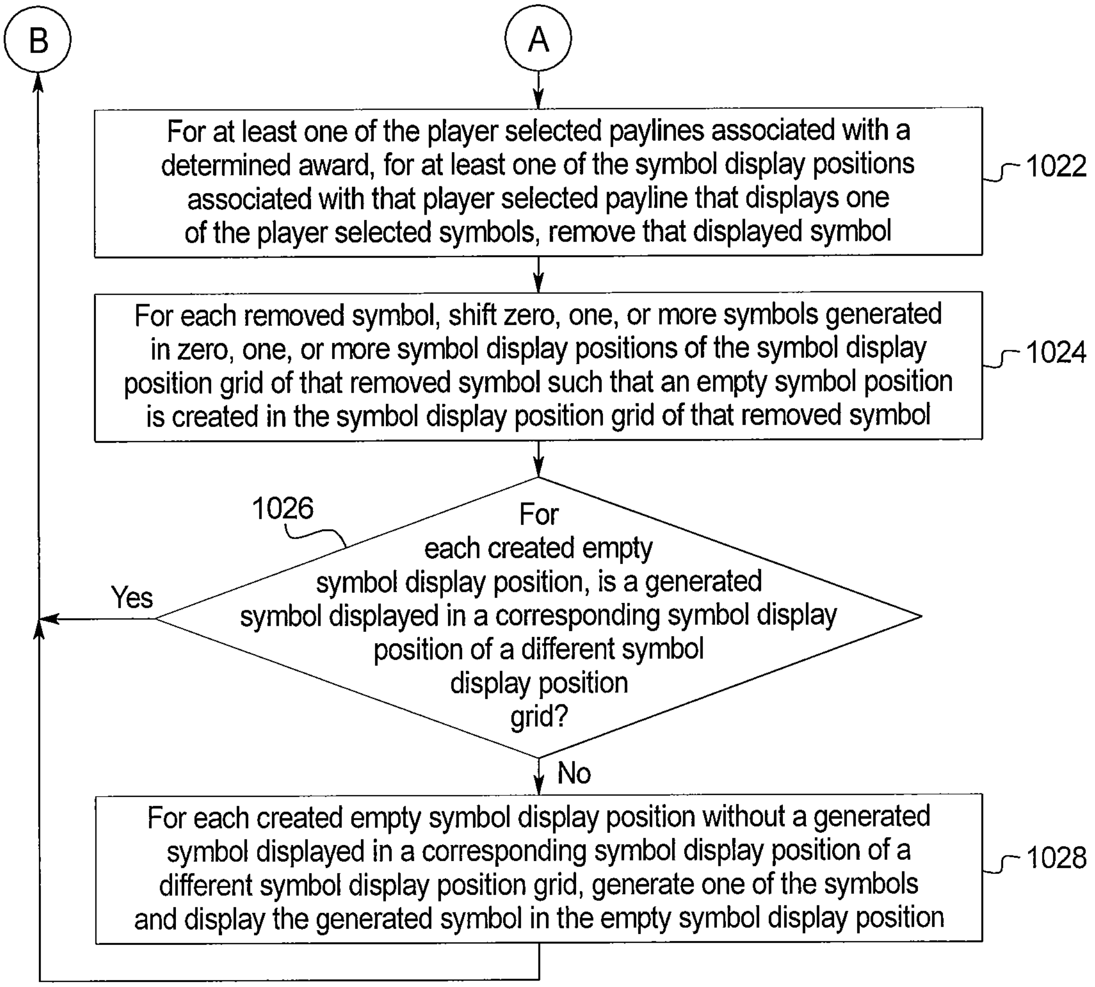

FIGS. 10A and 10B illustrate a flowchart of one example embodiment of a process or method 1000 for operating a gaming system or a gaming device. In one embodiment, this process 1000 is embodied in one or more software programs stored in one or more memories and executed by one or more processors or controllers. Although this process 1000 is described with reference to the flowchart shown in FIGS. 10A and 10B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a multi-dimensional symbol wagering game with cascading symbols (sometimes referred to herein as the wagering game) including a plurality of symbols and a plurality of symbol display position grids, and enables a player to initiate play of the wagering game, as indicated in block 1002. Each symbol display position grid includes a plurality of symbol display positions arranged in a plurality of rows and a plurality of columns. Each symbol display position grid also has a different depth. Thus, each symbol display position of each symbol display position grid is associated with a specific row, a specific column, and a specific depth. Moreover, in each symbol display position grid, one or more symbol display positions are aligned with or otherwise correspond with one or more symbol display positions of one or more symbol display position grids of different depths. That is, one or more symbol display position grids are positioned (relative to the player's line of sight) behind one or more other symbol display position grids and thus one or more symbol display positions of one or more symbol display position grids are positioned (relative to the player's line of sight) behind one or more symbol display positions of one or more other symbol display position grids.

In one embodiment, one or more paylines of any suitable direction extend through a plurality of the symbol display positions of one of the symbol display position grids at one depth. In another embodiment, one or more paylines of any suitable direction extend through a plurality of the symbol display positions of a plurality of the symbol display position grids at a plurality of different depths. In this embodiment, the gaming system enables the player to wager on one or more of such paylines. In another embodiment, one or more ways to win are associated with a plurality of symbol display positions of a symbol display position grid at one depth. In another embodiment, one or more ways to win are associated with a plurality of symbol display positions of a plurality of symbol display position grids at a plurality of different depths. In these embodiments, the gaming system enables the player to wager on a quantity of active symbol display positions or a quantity of ways to win.

The gaming system receives a selection from the player of one or more of the paylines, as indicated in block 1004. In this embodiment, each of the paylines is associated with a different plurality of the symbol display positions. The gaming system receives a wager from the player on each of the selected paylines, as indicated in block 1006. The gaming system receives a selection from the player of a plurality the symbols in a selection order, as indicated in block 1008.

The gaming system randomly generates one of the symbols at each of the symbol display positions of each of the different symbol display position grids, as indicated in block 1010. The generation results in one or more symbols generated at one or more of the symbol display positions of a first of the symbol display position grids at a first depth being initially displayed to the player and one or more symbols generated at one or more of the symbol display positions of a second of the symbol display position grids at a second depth not being initially displayed to the player. Put differently, since at least a second one of the symbol display position grids is at least partially positioned behind the first one of the symbol display position grids (relative to the player's line of sight), at least one of the symbols generated at at least one of the symbol display positions of the second one of the symbol display position grids is masked by at least one symbol generated at at least one of the symbol display positions of another symbol display position grid and thus not initially displayed to the player.

In one embodiment, each symbol display position grid is associated with a different set of a plurality of reels. In this embodiment, when the gaming system generates one of the symbols at each of the symbol display positions of each of the different symbol display position grids, the gaming system causes each of the sets of reels to generate one or more of the symbols at the symbol display positions of the symbol display position grid associated with that set of reels. In another embodiment, the plurality of symbol display position grids are associated with a single set of a plurality of reels. In this embodiment, such as described in U.S. Pat. No. 7,252,591, each reel of the plurality of reels is associated with a plurality of symbol stacks. Each symbol stack includes an initially displayed symbol and at least one initially hidden symbol. In this embodiment, when the gaming system generates one of the symbols at each of the symbol display positions of each of the different symbol display position grids, the gaming system causes the plurality of reels to generate a plurality of symbol stacks wherein one symbol (associated with a first symbol display position grid at a first depth) of the generated symbol stack is initially displayed to the player and another symbol (associated with another symbol display position grid at another depth) of the generated symbol stack is not initially displayed to the player. In another embodiment, one or more symbol display positions of one or more symbol display position grids are associated with different sets of reels and one or more symbol display positions of one or more symbol display position grids are associated with one or more symbol stacks.

The gaming system determines, for each of the player selected paylines, whether at least a designated quantity of the symbol display positions associated with that player selected payline displays a different one of the player selected symbols, as indicated in diamond 1012. If a designated quantity of the symbol display positions associated with at least one of the player selected paylines do not each display different ones of the player selected symbols, the wagering game ends, as indicated in block 1014. If a designated quantity of the symbol display positions associated with at least one of the player selected paylines each display a different one of the player selected symbols, the gaming system determines a display order of the symbols generated and displayed at the symbol display positions associated with that player selected payline, as indicated in block 1016, and determines any awards associated with that player selected payline to be provided to the player based on (a) a quantity of the symbol display positions associated with that player selected payline that display the different ones of the player selected symbols, and (b) a comparison of the selection order with the display order, as indicated in block 1018. The gaming system provides any determined awards to the player, as indicated in block 1020. It should be appreciated that because certain generated symbols are not initially displayed to the player (i.e., certain generated symbols are blocked from being displayed by other symbols generated at different depths), the gaming system disclosed herein only evaluates the symbols currently displayed to the player for award evaluation purposes.

After providing the player any awards, for at least one of the player selected paylines associated with a determined award, for at least one of the symbol display positions associated with that player selected payline that displays one of the player selected symbols, the gaming system removes that displayed symbol, as indicated in block 1022. Removing such symbols results in one or more empty symbol display positions which the gaming system may fill by shifting one or more other displayed symbols. Specifically, as indicated in block 1024, for each removed symbol, the gaming system shifts zero, one, or more symbols generated in zero, one, or more symbol display positions of the symbol display position grid of that removed symbol. Such shifting results in, for each removed symbol, an empty symbol display position being created in the symbol display position grid of that removed symbol.

It should be appreciated that the creation of one or more empty symbol display positions at one symbol display position grid causes the exposure of symbols generated in symbol display positions of another grid positioned at another depth. Put differently, the removal of symbols, shifting of symbols, and creation of empty symbol display positions of one symbol display position grid results in the gaming system displaying previously hidden symbols from another symbol display position grid (which is positioned, relative to the player's line of sight, behind the grid with the removed symbols).

After exposing zero, one, or more previously hidden symbols, for each created empty symbol display position, the gaming system determines whether a generated symbol is displayed in a corresponding symbol display position of a different symbol display position grid, as indicated in diamond 1026. The gaming system thus determines whether each created empty symbol display position reveals another symbol generated at another depth.

If any created empty symbol display position does not reveal another symbol generated at another depth, the gaming system generates a symbol for each created empty symbol display position without a generated symbol displayed in a corresponding symbol display position of a different symbol display position grid, as indicated in block 1028. The gaming system then returns to diamond 1012 and again determines, for each of the player-selected paylines, whether at least a designated quantity of the symbol display positions associated with that player-selected payline display a different one of the player-selected symbols. On the other hand, if each created empty symbol display position reveals another symbol of another symbol display position of another symbol display position grid of a different depth, the gaming system returns to diamond 1012 and again determines, for each of the player-selected paylines, whether at least a designated quantity of the symbol display positions associated with that player-selected payline display a different one of the player-selected symbols.

It should be appreciated that when determining, for each of the player-selected paylines, whether at least a designated quantity of the symbol display positions associated with that player-selected payline display a different one of the player-selected symbols, the gaming system may evaluate symbols displayed at a plurality of the symbol display positions of a plurality of the symbol display position grids at a plurality of different depths. That is, since the gaming system only evaluates the symbols that are currently displayed to the player and different symbols positioned at different depths may be currently displayed to the player (due to the removal and/or shifting of symbols positioned in front of these symbols), the gaming system is configured to evaluate symbols displayed at different depths to determine any additional awards to provide to the player. Such a configuration provides the player with additional opportunities to win awards in association with a plurality of grids of symbol display positions. In this embodiment, the disclosed gaming system enables a play of the multi-dimensional cascading symbols game to continue so long as one or more winning symbol combinations continue to be displayed to the player.

In certain embodiments, the gaming system enables the player to modify the selected symbols and/or the selection order during game play. In one of these embodiments, the gaming system may require the player to place a wager or pay a fee to modify the selected symbols, the selection order, or both. In another of these embodiments, the gaming system enables the player to choose at least one of the new symbols and/or to choose at least one of the symbols to be replaced. In another of these embodiments, the gaming system enables the player to choose at least one of the new positions in the new selection order. In other of these embodiments, the gaming system chooses at least one of the new symbols and/or at least one of the new positions of the selection order.

Figure 11A:
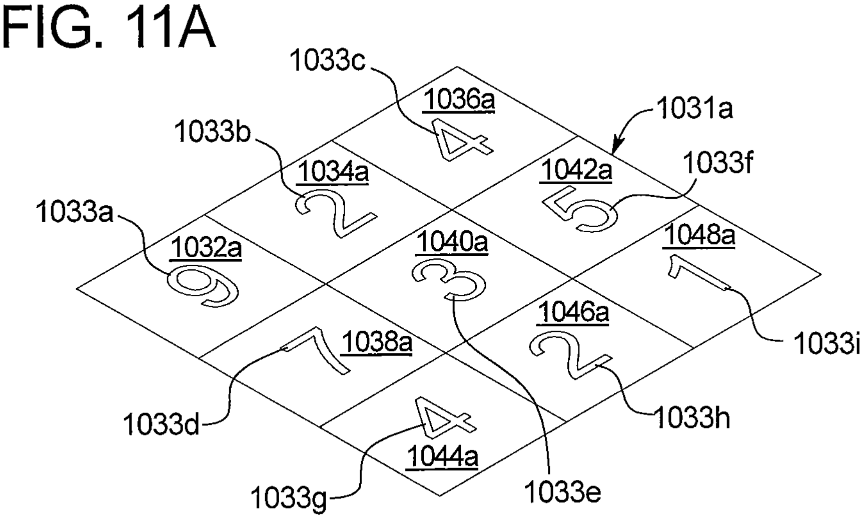
FIG. 11A is a front perspective view of the display of one embodiment of the gaming system disclosed herein illustrating a plurality of symbols generated in a plurality of symbol display positions of a plurality of symbol display position grids at a plurality of different depths.
Figure 11A:
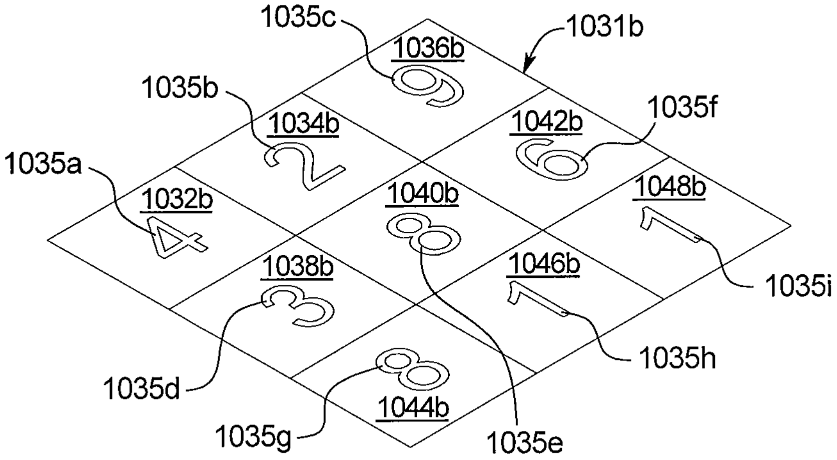
Figure 11A:
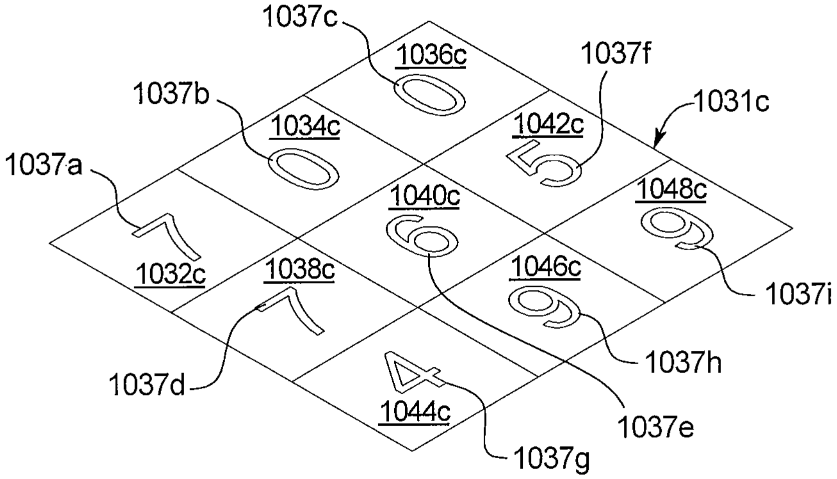
Figure 11B:
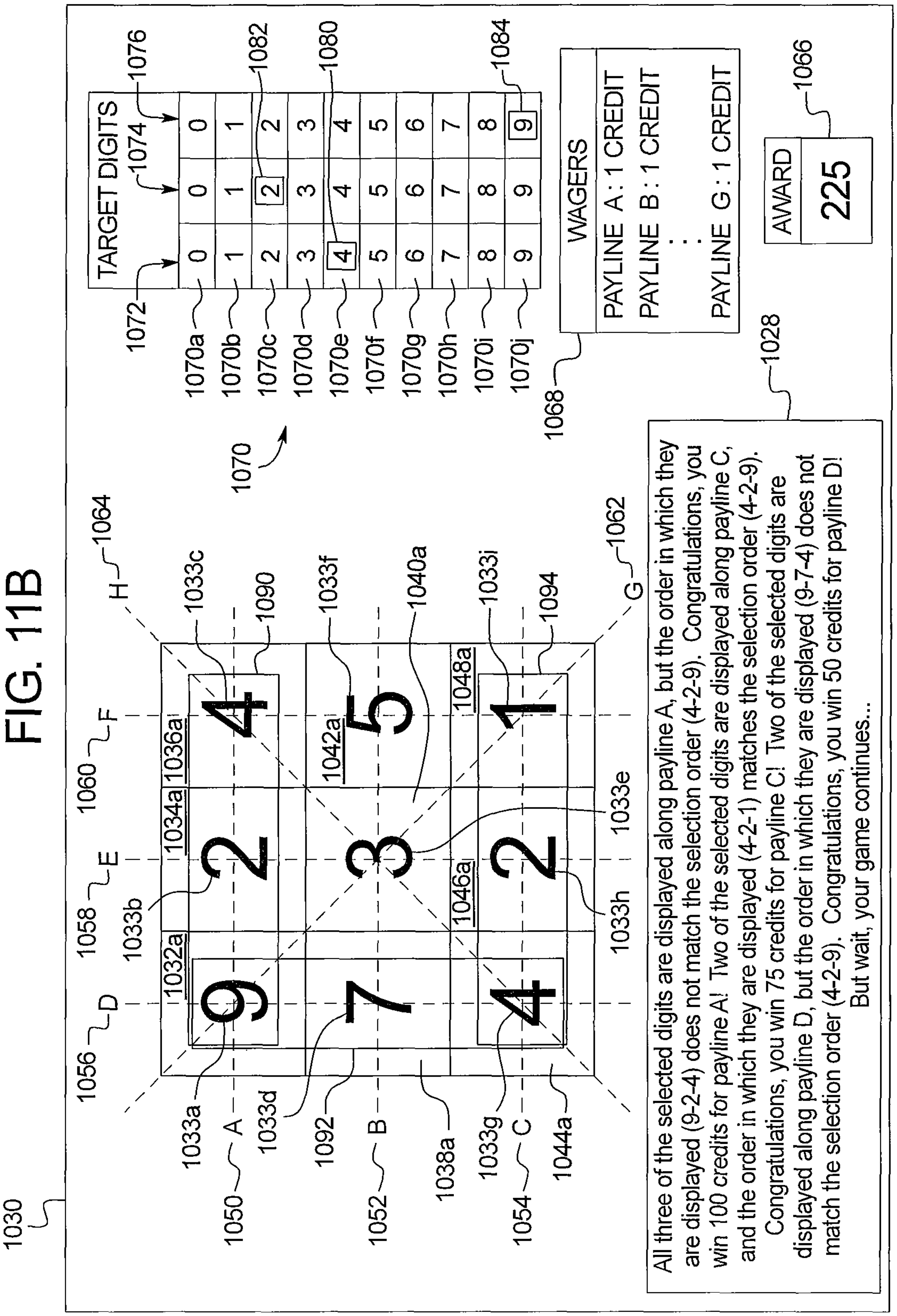
FIGS. 11B, 11C, 11D, 11E, 11F and 11G are front elevational views of the display of one embodiment of the gaming system of FIG. 11A illustrating a play of the multi-dimensional symbol wagering game with cascading symbols.

As illustrated in FIG. 11A, in one example embodiment of a play of the multi-dimensional symbol wagering game with cascading symbols disclosed herein, the gaming system generates a plurality symbols at a plurality of symbol display positions at each of a plurality of symbol display position grids 1031*a*, 1031*b*, and 1031*c* of different depths. In this embodiment, the symbols are the digits 0 to 9, the symbol display positions are digit display positions, and the symbol display position grids are digit display position grids. Specifically, the gaming system: (i) randomly generates a plurality of digits 1033*a* to *i* at digit display positions 1032*a*, 1034*a*, 1036*a*, 1038*a*, 1040*a*, 1042*a*, 1044*a*, 1046*a*, and 1048*a* of digit display position grid 1031*a*; (ii) randomly generates a plurality of digits 1035*a* to *i* at digit display positions 1032*b*, 1034*b*, 1036*b*, 1038*b*, 1040*b*, 1042*b*, 1044*b*, 1046*b*, and 1048*b* of digit display position grid 1031*b*; and (iii) randomly generates a plurality of digits 1037*a* to *i* at digit display positions 1032*c*, 1034*c*, 1036*c*, 1038*c*, 1040*c*, 1042*c*, 1044*c*, 1046*c*, and 1048*c* of digit display position grid 1031*c*. As seen in FIGS. 11A and 11B, because digit display position grids 1031*b* and 1031*c* are positioned behind digit display position grid 1031*a*, the digits generated at the digit display positions of digit display position grids 1031*b* and 1031*c* are not initially displayed to the player.

As seen in FIG. 11B, after generating a plurality of the digits, the gaming system makes an award determination with respect to each wagered-on payline. In this example, as in the example described above with respect to FIGS. 4, 5, 6, 7, 8, and 9, the player has placed a wager of one credit on each of the paylines A 1050, B, 1052, C 1054, D 1056, E 1058, F 1060, G 1062, and H 1064 (referred to herein as paylines A, B, C, D, E, F, G, and H for brevity). Further, as in the example described above with respect to FIGS. 4, 5, 6, 7, 8, and 9, the player has selected the digits 4, 2, and 9 in a selection order of 4-2-9. In this example, the gaming system determines that the digits 9 1033*a*, 2 1033*b*, and 4 1033*c* displayed in digit display positions 1032*a*, 1034*a*, and 1036*a* associated with payline A are associated with an award of 100 credits, as described in detail above with respect to the example illustrated in FIGS. 4, 5, 6, 7, 8, and 9. The gaming system determines that the digits 4 1033*g* and 2 1033*h* displayed in digit display positions 1044*a* and 1046*a* associated with payline C are associated with an award of 75 credits, as described above in detail with respect to the example illustrated in FIGS. 4, 5, 6, 7, 8, and 9. The gaming system determines that the digits 9 1033*a* and 4 1033*g* displayed in digit display positions 1032*a* and 1044*a* associated with payline D are associated with an award of 50 credits, as described in detail above with respect to the example illustrated in FIGS. 4, 5, 6, 7, 8, and 9. Accordingly, the gaming system provides an award of 225 credits to the player. Since at least one of the player selected paylines is associated with an award, the play of the multi-dimensional symbol wagering game with cascading symbols continues as described below.

Figure 11C:
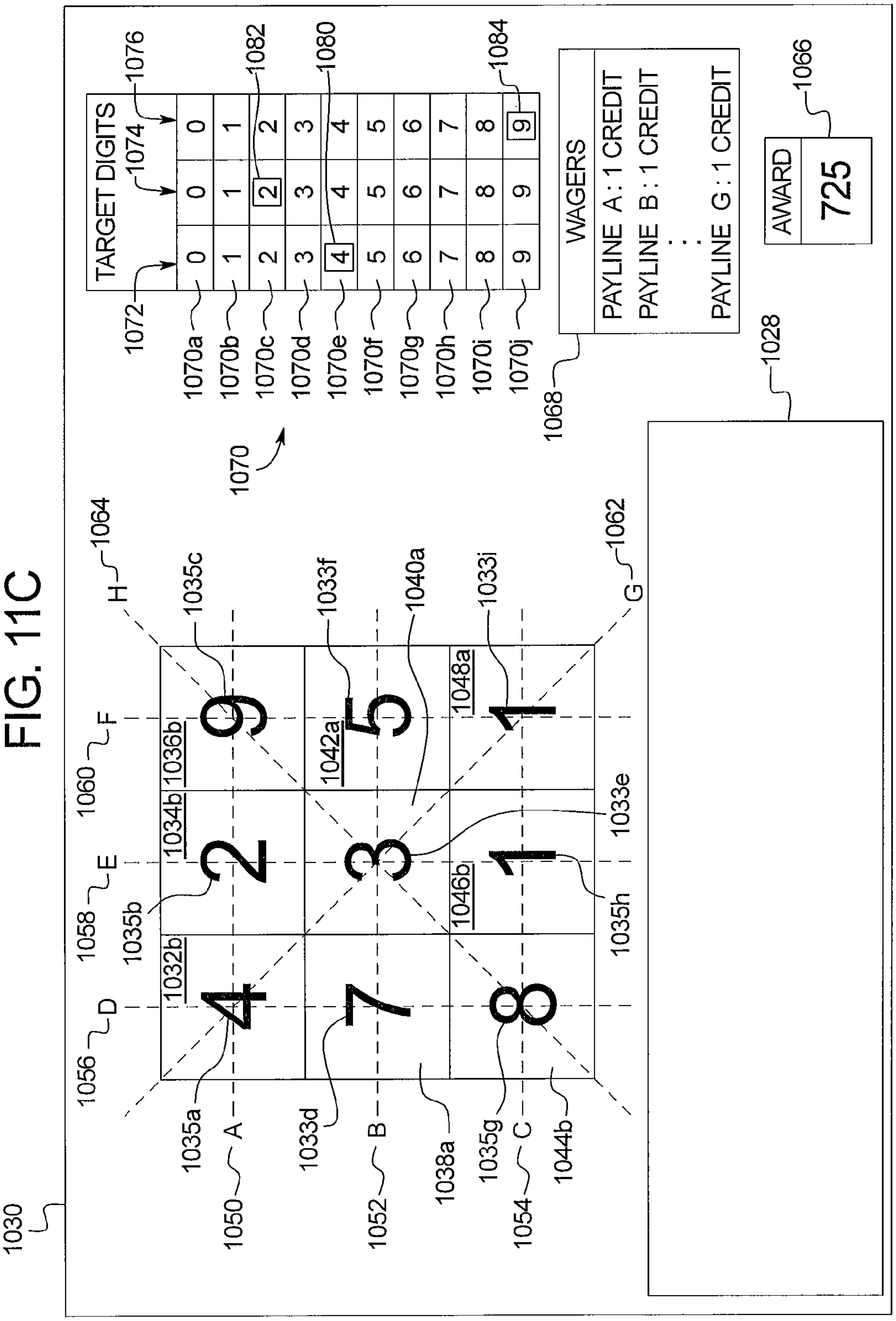

As seen in FIG. 11C, for each player selected payline, the gaming system removes each of the player selected digits displayed at each digit display position associated with that player selected payline. Specifically, the gaming system removes the digits: 9 1033*a*, 2 1033*b*, 4 1033*c*, 4 1033*g*, and 2 1033*h*. In this example, the removal of the digits 9 1033*a*, 2 1033*b*, 4 1033*c*, 4 1033*g*, and 2 1033*h* from their respective digit display positions of digit display position grid 1031*a* (as seen in FIG. 11B) causes empty digit display positions 1032*a*, 1034*a*, 1036*a*, 1044*a*, and 1046*a* in digit display position grid 1031*a*. As seen in FIG. 11C, such empty digit display positions thus causes certain of the digits 4 1035*a*, 2 1035*b*, 9 1035*c*, 8 1035*g*, and 1 1035*h* generated at digit display positions 1032*b*, 1034*b*, 1036*b*, 1044*b*, and 1046*b*, respectively, of digit display position grid 1031*b* to be displayed to the player. Thus, the creation of one or more empty digit display positions in a front digit display position grid (relative to the player's line of sight) causes one or more digits at one or more corresponding digit display positions of another digit display position grid (which is, relative to the player's line of sight, behind the front digit display position grid) to become displayed to the player.

Figure 11D:
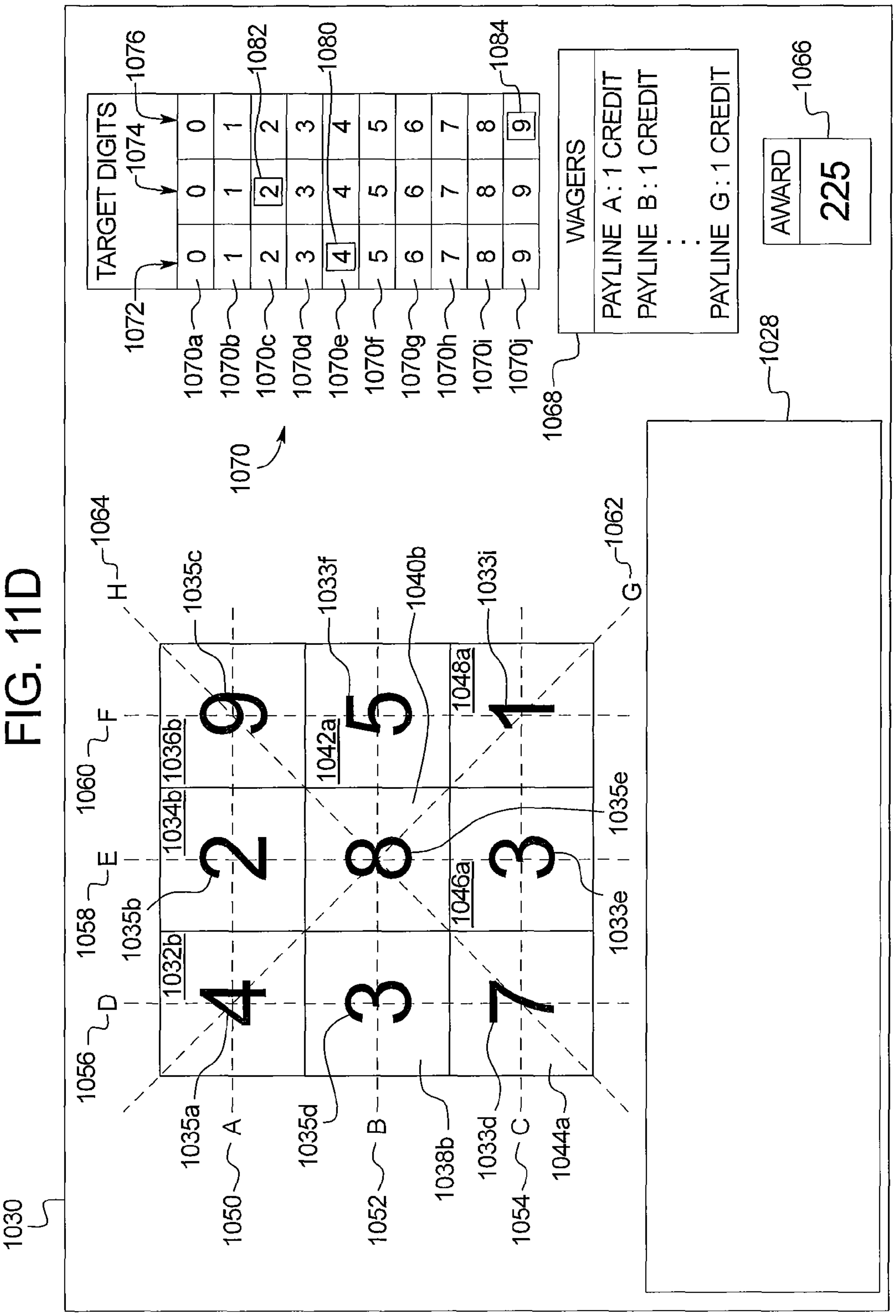

As seen in FIG. 11D, the revealing of certain of the digits of digits display position grid 1031*b* is temporary because following the removal of the digits 9 1033*a*, 2 1033*b*, 4 1033*c*, 4 1033*g*, and 2 1033*h* from digit display position grid 1031*a* (as seen in FIG. 11B), the gaming system shifts one or more digits from digit display position grid 1031*a* downward to fill the empty digit display positions created from any removed digits from this digit display position grid. In the illustrated embodiment, the disclosed gaming system shifts digits 7 1033*d* and 3 1033*e* from the middle row of digit display position grid 1031*a* downward into digit display positions 1044*a* and 1046*a* of the third row of digit display position grid 1031*a* to fill the created empty digit display positions. In this example, the shifting of the symbols from the middle row of digit display position grid 1031*a* downward into digit display positions of the third row of digit display position grid 1031*a* causes different empty digit display positions 1038*a* and 1040*a* in digit display position grid 1031*a* to be created. As seen in FIG. 11D, such different empty digit display positions thus causes certain of the symbols 1035*d* and 1035*e* generated at digit display positions 1038*b* and 1040*b* of the second or middle row of digit display position grid 1031*b* to be displayed to the player.

Figure 11E:
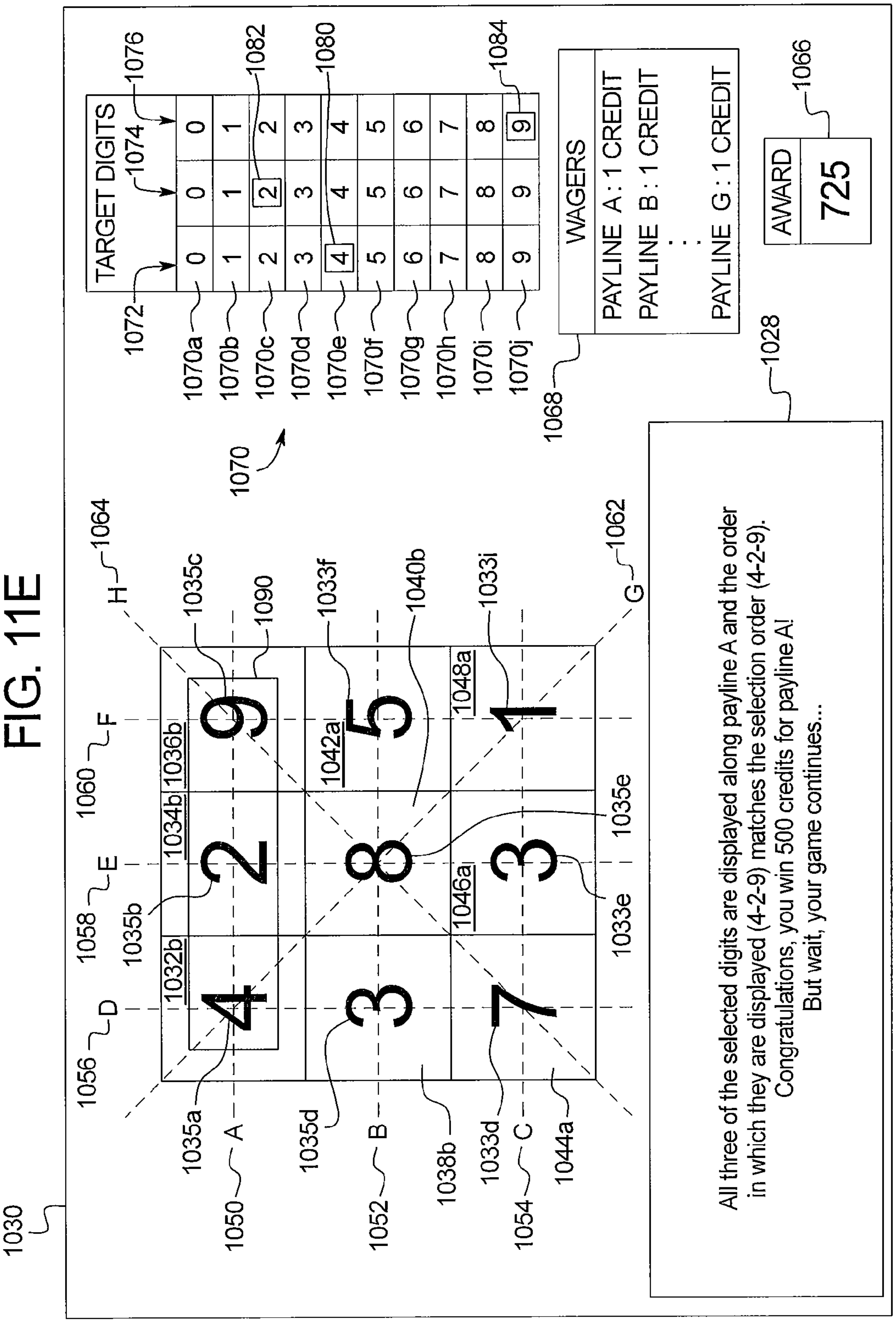

After removing one or more digits from one of the digit display position grids; shifting zero, one, or more digits from that digit display position grid; and revealing one or more digits from another one of the digit display position grids, as seen in FIG. 11E, the gaming system makes an award determination for each wagered-on payline which, in this example, is every payline. Here, the gaming system determines, as explained in detail above with respect to the example illustrated FIGS. 4, 5, 6, 7, 8, and 9, that payline A is associated with an award of 500 credits because: (a) each digit display position 1032*b*, 1034*b*, and 1036*b* associated with payline A displays a different one of the player-selected digits; and (b) the player-selected digits are displayed in a display order that matches the selection order (4-2-9). Accordingly, the gaming system provides an award of 500 credits to the player. Award indicator 1066 updates the player's award to reflect the 500 credit award (i.e., adds 500 credits to the previous award of 225 credits). It should be appreciated that in certain embodiments the gaming system evaluates the digits displayed to the player regardless of in which digit display position grid such digits were generated.

Figure 11F:
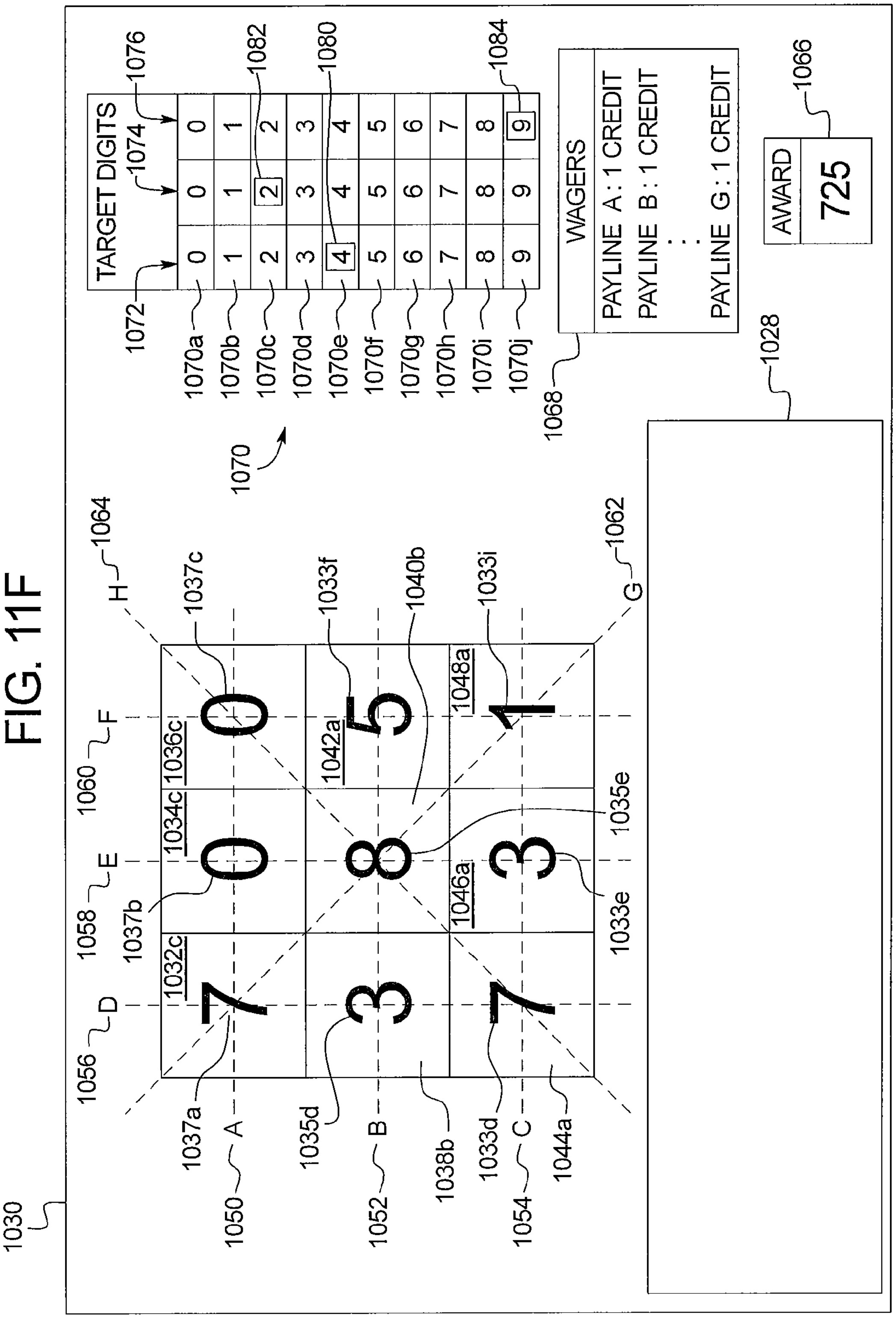

For each player selected payline, the gaming system removes each of the player selected digits displayed at each digit display position associated with that player selected payline. Specifically, the gaming system removes the digits: 4 1035*a*, 2 1035*b*, and 9 1035*c*. In this example, the removal of these digits causes three empty digit display positions 1032*b*, 1034*b*, and 1036*b* in digit display position grid 1031*b*. This creates a plurality of empty digit display positions in a plurality of different digit display position grids at different depths and causes a plurality of the digits generated at the different digit display position grids at a plurality of different depths to be simultaneously displayed to the player. Specifically, as seen in FIGS. 11E and 11F, the creation of empty digit display positions 1032*b*, 1034*b*, and 1036*b* in digit display position grid 1032*b* causes three digits 7 1037*a*, 0 1037*b*, and 0 1037*c* generated at digit display positions 1032*c*, 1034*c*, and 1036*c* of digit display position grid 1031*c* to be displayed to the player.

Figure 11G:
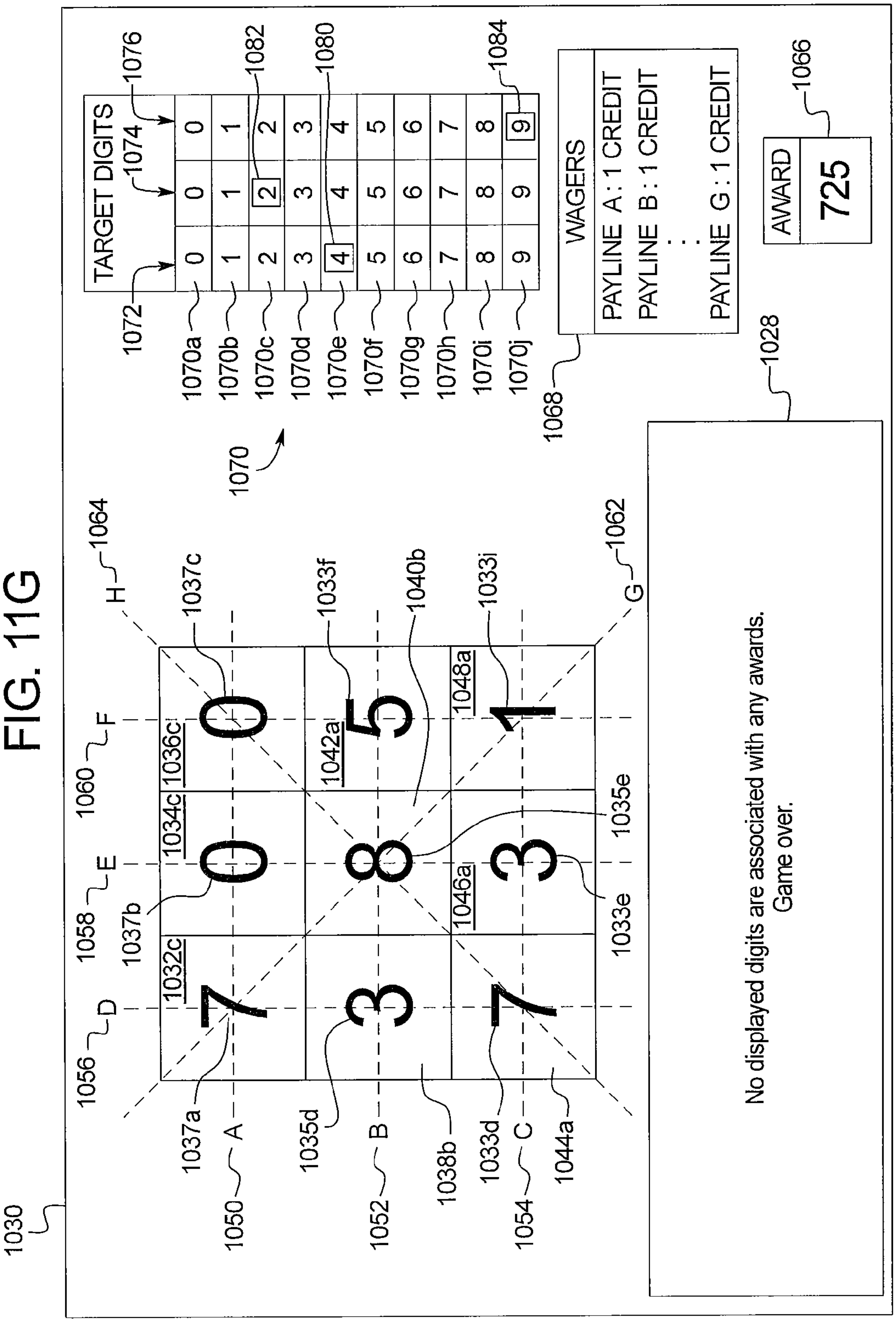

After removing one or more digits from one of the digit display position grids; shifting zero, one, or more digits from that digit display position grid; and revealing one or more digits from another one of the digit display position grids, as seen in FIG. 11G, the gaming system determines that no displayed digits are associated with any awards. Accordingly, the gaming system ends the play of the multi-dimensional symbol wagering game with cascading symbols.

In another embodiment, one or more of the generated symbols are multiple dimension symbols including a depth component. For example, one or more multiple dimension symbols each include a six-sided or hexagonal shape with individually displayed symbols on each side or face of the multi-dimensional shape. In another example, one or more multiple dimension symbols each include a four-sided square or rectangular shape with individually displayed symbols on each side or face. In another example, one or more multiple dimension symbols each include a three-sided or triangular shape with individually displayed symbols on each side or face. In an alternative embodiment, one or more faces or sides of one or more multiple dimension symbols do not include an individually displayed symbol. It should be appreciated that such multiple dimension symbols can include any suitable number of sides and any suitable number of individually displayed symbols per side. Each side or face of a multiple dimension symbol is sometimes referred to herein as a symbol side.

In one embodiment utilizing such multiple dimension symbols, when zero, one, or more empty symbol display positions are created in a symbol display position grid (due to the above-described removal of one or more symbols), not only is one symbol side of the multiple dimension symbol of another symbol display position grid of a different depth exposed, but one or more symbol sides of one or more multiple dimension symbols of the same symbol display position grid of the removed symbol may be exposed. That is, the removal of a multiple dimension symbol from a symbol display position grid results in previously hidden symbol sides of other multiple dimension symbols from the same symbol display position grid becoming exposed for award evaluation purposes.

Figure 12A:
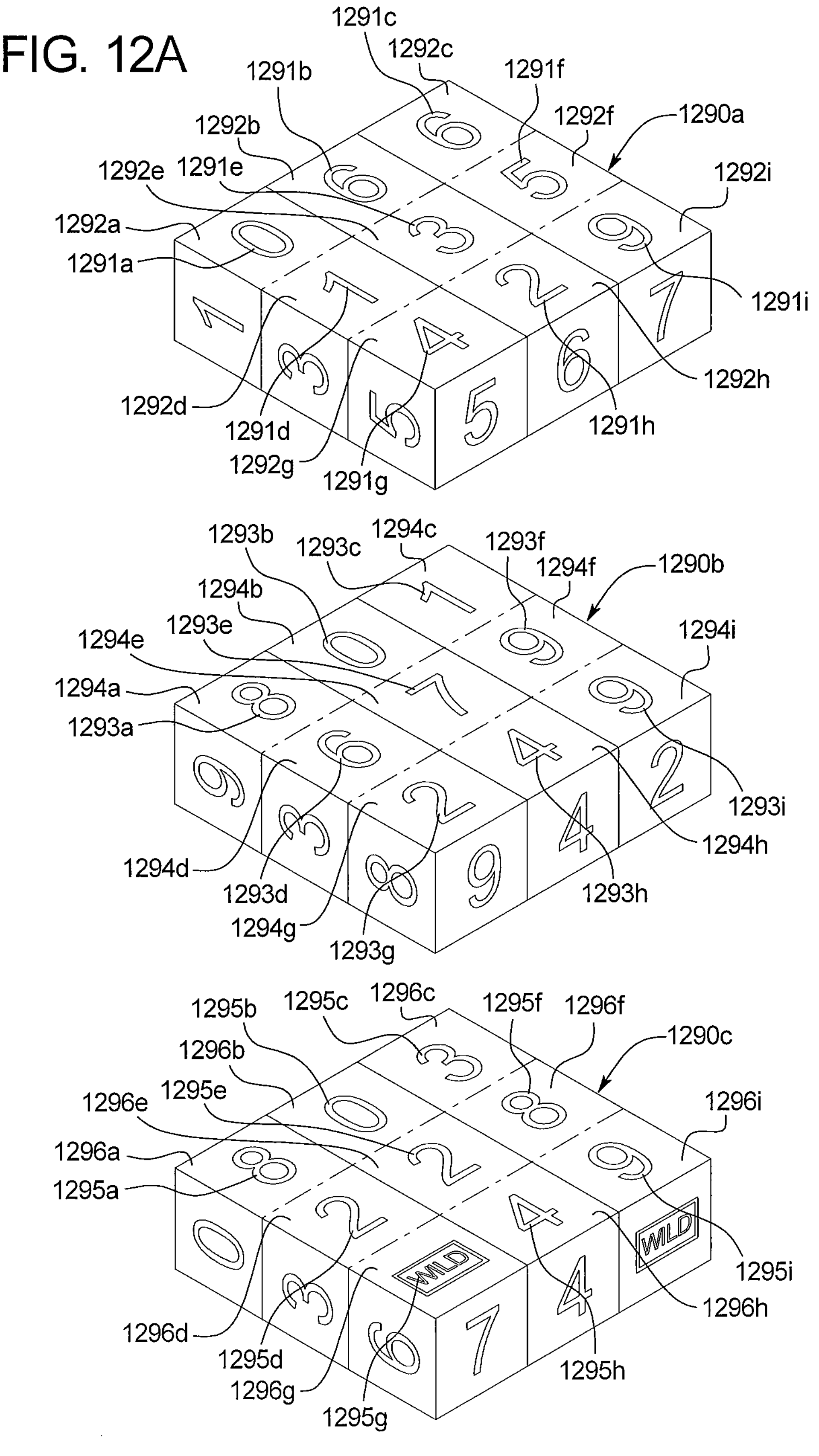
FIG. 12A is a front perspective view of the display of one alternative embodiment of the gaming system disclosed herein illustrating a plurality of multiple dimension symbols generated in a plurality of symbol display positions of a plurality of symbol display position grids at a plurality of different depths.

For example, as seen in FIG. 12A, in one example embodiment of a play of the multi-dimensional symbol wagering game with cascading symbols disclosed herein, the multiple dimension symbols are multiple dimension digits, the symbol sides are digit sides, the symbols are the digits 0 to 9, the symbol display positions are digit display positions, and the symbol display position grids are digit display position grids. In this embodiment, the gaming system generates a plurality of multiple dimension digits at a plurality of digit display positions of each of a plurality of digit display position grids 1290*a*, 1290*b*, and 1290*c* of different depths. Specifically, the gaming system: (i) generates a plurality of multiple dimension digits 1291 at digit display positions 1292 of digit display position grid 1290*a*, (ii) generates a plurality of multiple dimension digits 1293 at digit display positions 1294 of digit display position grid 1290*b*, and (iii) generates a plurality of multiple dimension digits 1295 at digit display positions 1296 of digit display position grid 1290*c*.

Figure 12B:
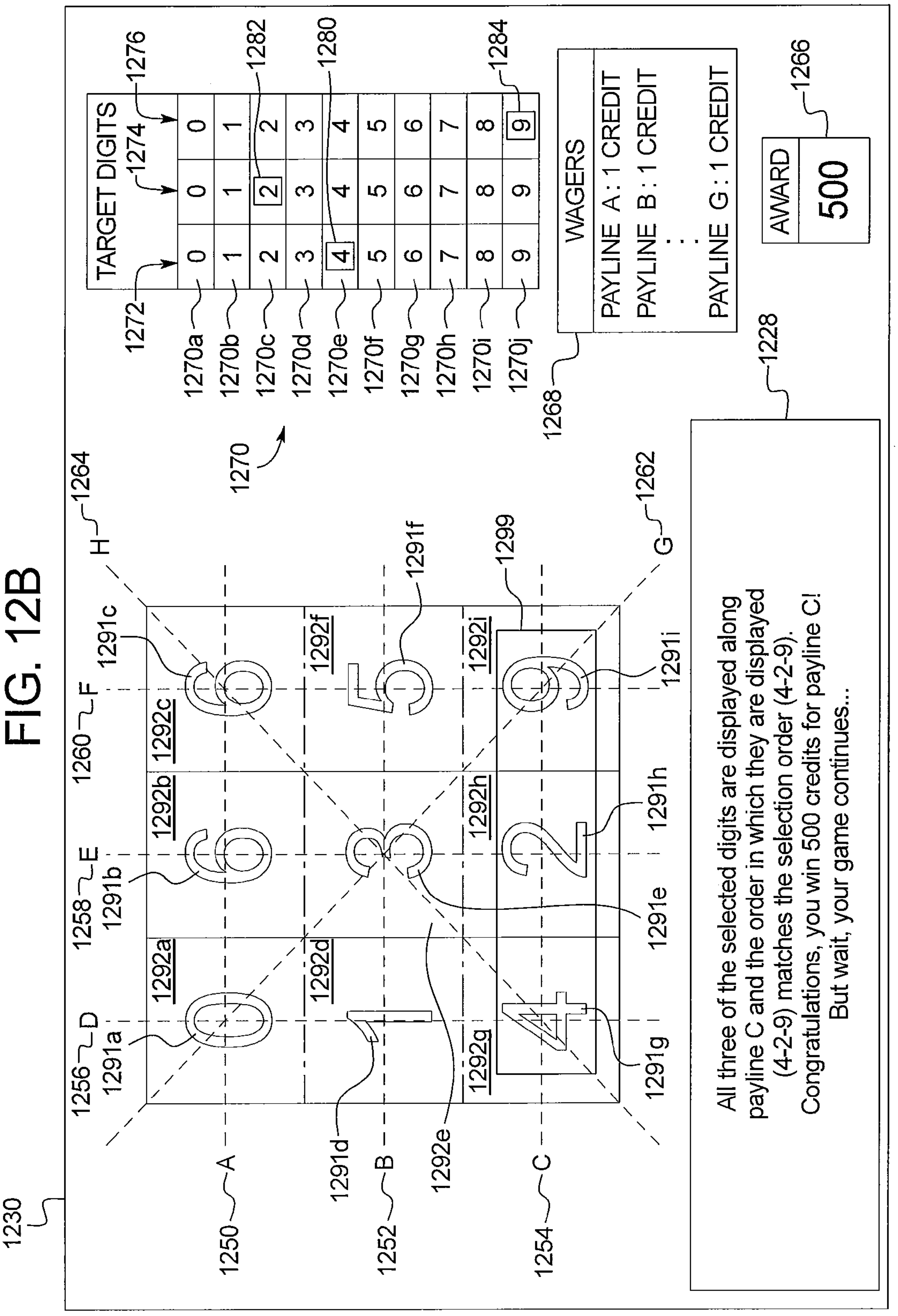
FIGS. 12B, 12C, 12D, and 12E are front elevational views of the display of one alternative embodiment of the gaming system of FIG. 12A illustrating a play of the multi-dimensional symbol wagering game with cascading symbols utilizing multiple dimension symbols.

As seen in FIGS. 12A and 12B, because digit display position grids 1290*b* and 1290*c* are positioned behind digit display position grid 1290*a*, the multiple dimension digits 1293 and 1295 generated at the plurality of digit display positions 1294 and 1296 of digit display position grids 1290*b* and 1290*c* are not initially displayed to the player. It should be appreciated that the configuration of the multiple dimension digits causes one or more of the digit sides of certain multiple dimension digits to be hidden from or otherwise not displayed to the player. For example, as seen in FIGS. 12A and 12B, the configuration of the multiple dimension digits causes only one digit side of certain of the multiple dimension digits generated in the plurality of digit display positions 1292 of digit display position grid 1290*a* to be initially displayed to the player.

After generating a plurality of the multiple dimension digits, the gaming system evaluates the digits displayed on the digit sides currently displayed to the player to determine, for each of the player-selected paylines, whether at least a designated quantity of the digit sides of the multiple dimension digits generated at the digit display positions associated with that payline display a different one of the player-selected digits. In this embodiment, as in the embodiments discussed above with respect to FIGS. 4, 5, 6, 7, 8, and 9 and FIGS. 11A, 11B, 11C, 11D, 11E, 11F, and 11G, the player has placed a wager of one credit on each of the paylines A 1250, B 1252, C 1254, D 1256, E 1258, F 1260, G 1262, and H 1264 (referred to herein as paylines A through H for brevity). Further, the player has selected digits 4, 2, and 9, in the selection order 4-2-9. As shown in FIG. 12B, the gaming system evaluates the digits displayed on each of the displayed digit sides of the generated multiple dimension digits of digit display position grid 1290*a*. The gaming system determines, as explained in detail above with respect to the examples described with respect to FIGS. 4, 5, 6, 7, 8, and 9 and FIGS. 11A, 11B, 11C, 11D, 11E, 11F, and 11G, that payline C is associated with an award of 500 credits because: (a) each digit display position 1292*g*, 1292*h*, and 1292*i* associated with payline C displays a different one of the player-selected digits; and (b) the player-selected digits are displayed in a display order that matches the selection order (4-2-9). Accordingly, the gaming system provides an award of 500 credits to the player. Since at least one of the player selected paylines is associated with an award, the play of the multi-dimensional symbol wagering game with cascading symbols continues as described below.

Figure 12C:
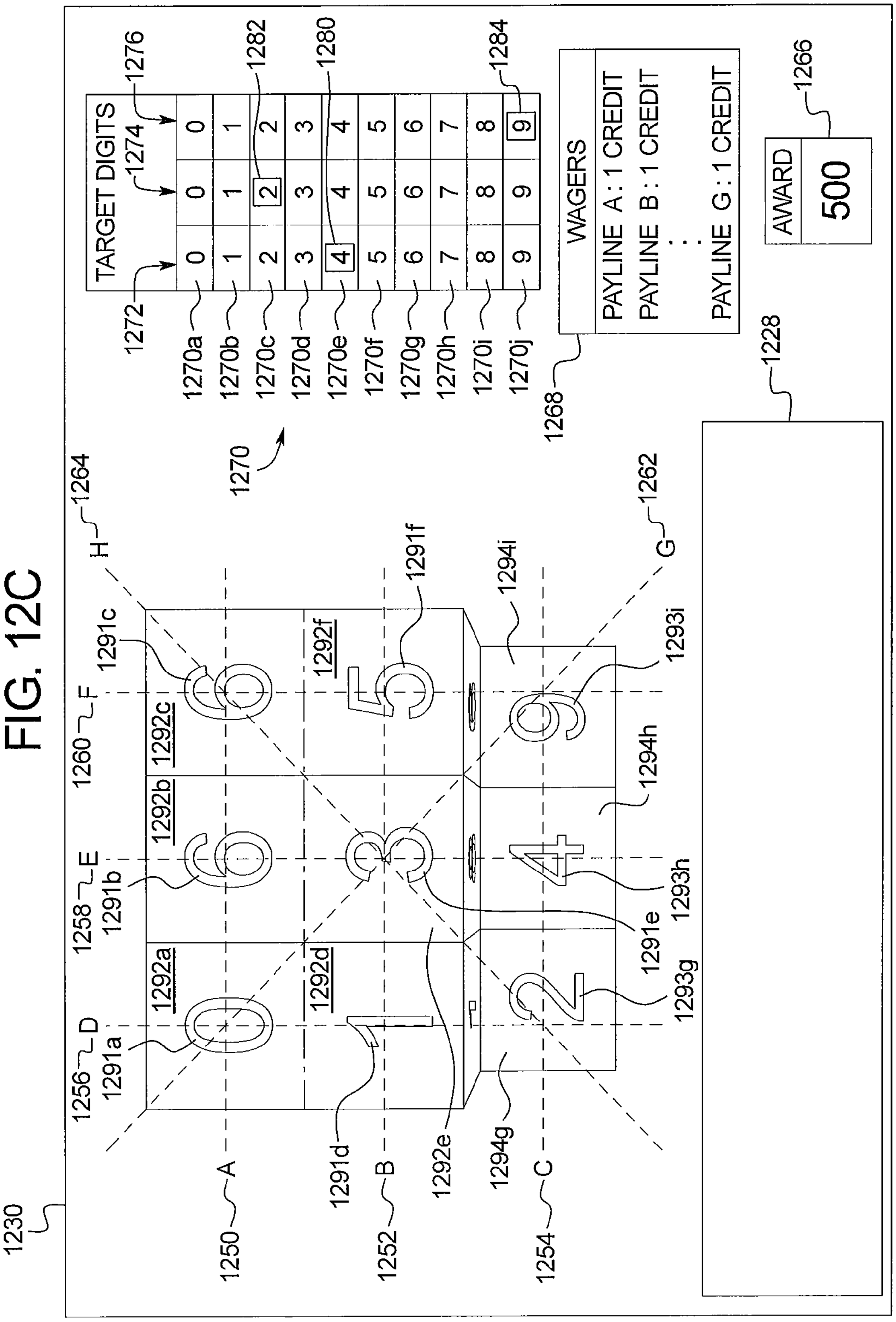

As seen in FIG. 12C, the gaming system then removes each of the multiple dimension digits associated with the award of 500 credits. In this example, as seen in FIGS. 12B and 12C, the removal of the multiple dimension digits 1291*g*, 1291*h*, and 12911 from the bottom row of digit display position grid 1290*a* causes empty symbol display positions 1292*g*, 1292*h*, and 1292*i* in digit display position grid 1290*a*.

As illustrated in FIG. 12C, the created empty digit display positions causes certain of the multiple dimension digits 1293*g*, 1293*h*, and 1293*i* generated at digit display positions 1294*g*, 1294*h*, and 1294*i* of the bottom or third row of digit display position grid 1290*b* to be displayed to the player. Thus, the creation of one or more empty digit display positions in a front digit display position grid (relative to the player's line of sight) causes one or more multiple dimension digits at one or more corresponding digit display positions of another digit display position grid (which is, relative to the player's line of sight, behind the front digit display position grid) to become displayed to the player.

As also illustrated in FIG. 12C, the created empty digit display positions causes a plurality of the faces or sides of multiple dimension digits 1291*d*, 1291*e*, and 1291*f* of digit display position grid 1290*a* to be displayed to the player. Thus, the creation of one or more empty digit display positions in a digit display position grid causes zero, one, or more previously hidden faces or sides of one or more multiple dimension digits at one or more corresponding digit display positions in the same digit display position grid to be revealed to the player.

Figure 12D:
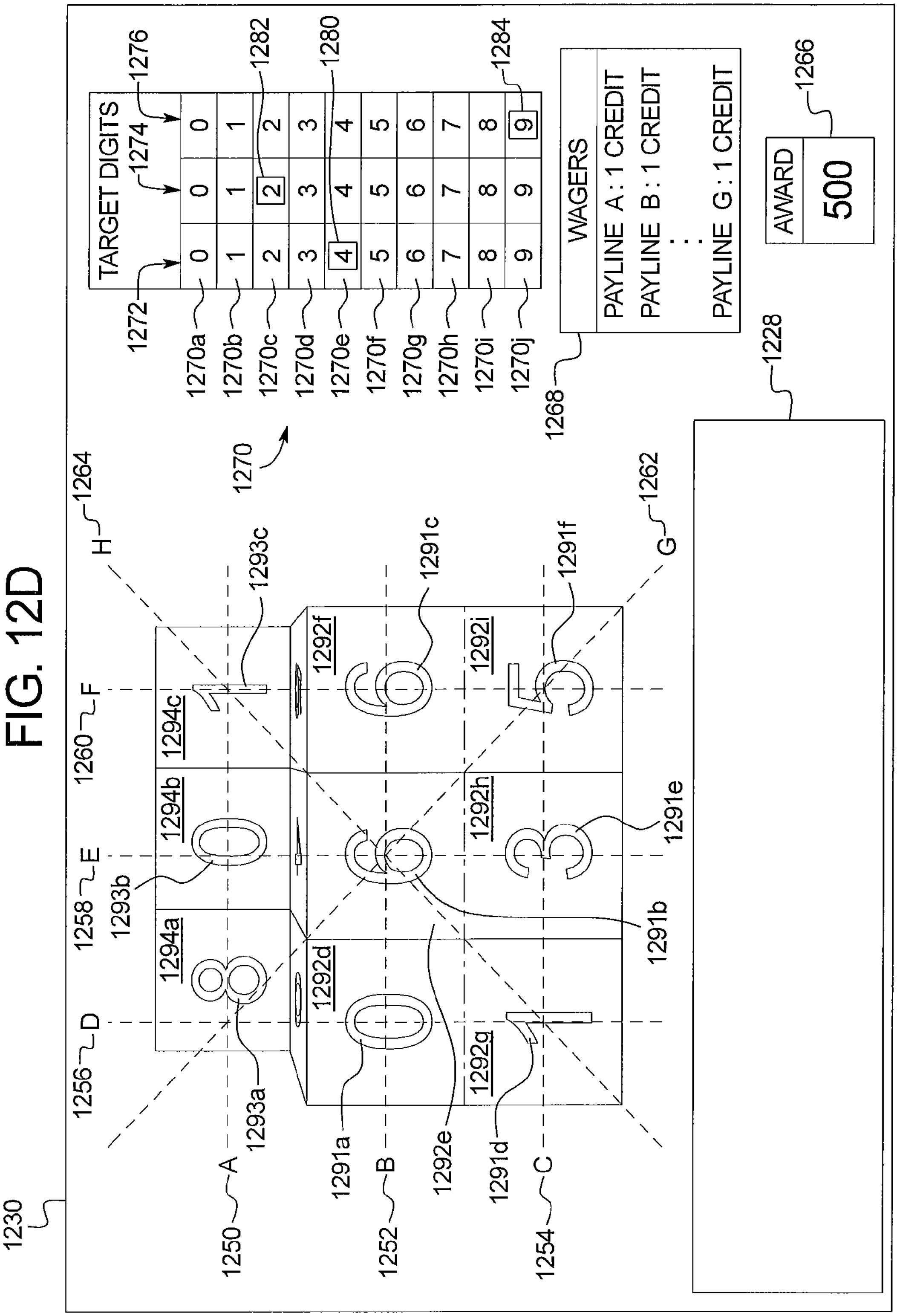

As seen in FIG. 12D, the revealing of certain of the multiple dimension digits of the bottom row of digit display position grid 1290*b* and the revealing of certain sides of the multiple dimension digits of digit display position grid 1290*a* is temporary because following the removal of the multiple dimension digits 1291*g*, 1291*h*, and 1291*i* from the bottom row of digit display position grid 1290*a*, the gaming system shifts one or more multiple dimension digits 1291 from the digit display position grid 1290*a* downward to fill the empty digit display positions 1292 created from the removed digits from this digit display position grid. Thus, in the illustrated embodiment, to fill the created empty digit display positions, the disclosed gaming system: (i) shifts multiple dimension digits 1291*d*, 1291*e*, and 1291*f* from the middle row of digit display position grid 1290*a* downward into empty digit display positions 1292*g*, 1292*h*, and 1292*i* of the bottom row of digit display position grid 1290*a*; and then (ii) shifts multiple dimension digits 1291*a*, 1291*b*, and 1291*c* from the top row of digit display position grid 1290*a* downward into vacant digit display positions 1292*d*, 1292*e*, and 1292*f* of the middle row of digit display position grid 1290*a*.

In this example, the shifting of the multiple dimension digits from the top and middle row of digit display position grid 1290*a* downward into digit display positions of the bottom row of digit display position grid 1290*a* causes different empty digit display positions 1292*a*, 1292*b*, and 1292*c* in digit display position grid 1290*a* to be created. As seen in FIG. 12D, such different empty digit display positions causes certain of the multiple dimension digits 1293*a*, 1293*b*, and 1293*c* generated at digit display positions 1294*a*, 1294*b*, and 1294*c* of digit display position grid 1290*b* to be displayed to the player. Moreover, such different empty digit display positions also causes certain of the previously hidden digit sides of certain of the multiple dimension digits 1291*a* (now in digit display position 1292*d*), 1291*b* (now in digit display position 1292*e*), and 1291*c* (now in digit display position 1292*f*) to be displayed to the player.

Figure 12E:
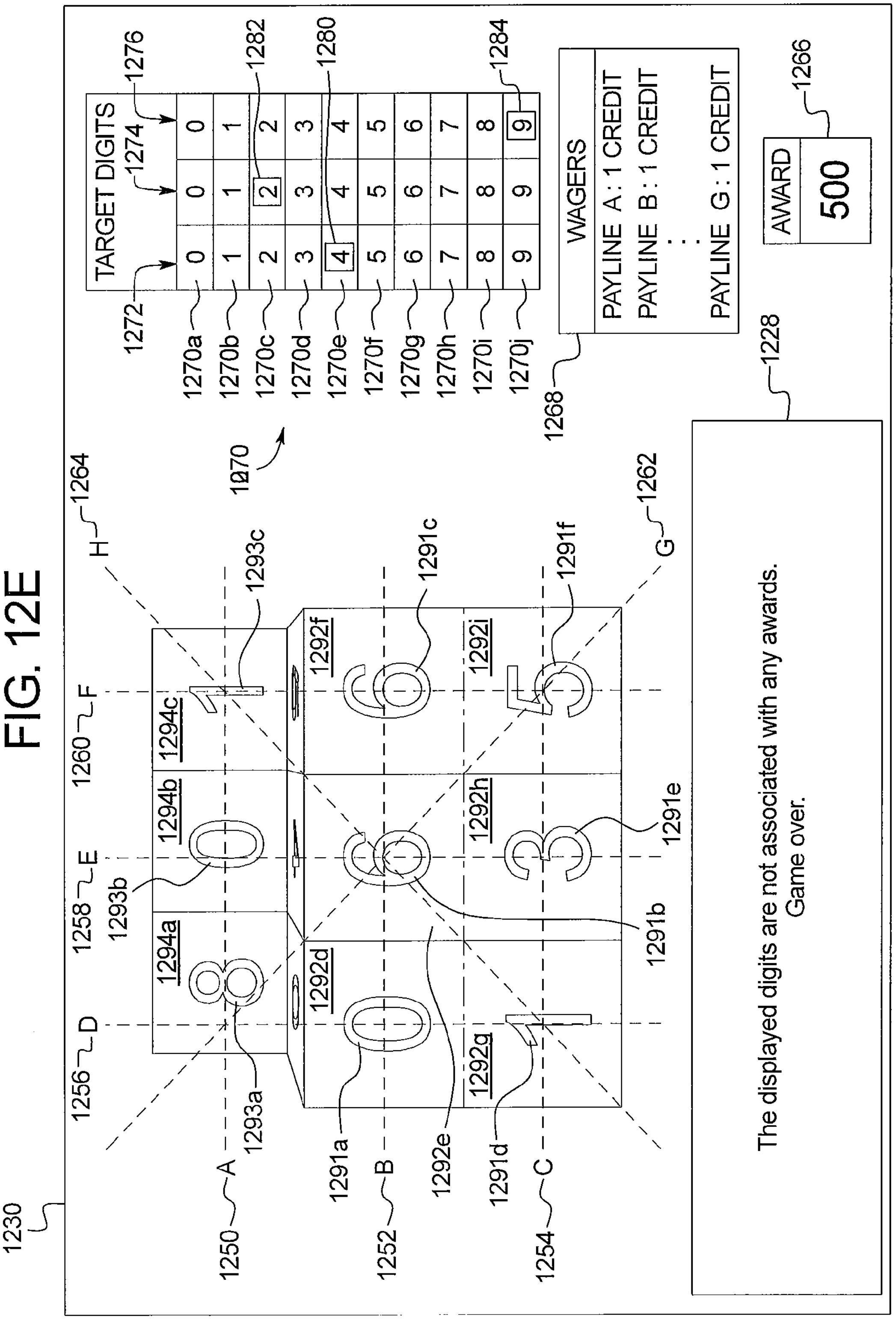

After removing one or more multiple dimension digits from one of the digit display position grids; shifting zero, one, or more multiple dimension symbols within that digit display position grid; and revealing one or more multiple dimension digits from both the same digit display position grid and another one of the digit display position grids, the gaming system evaluates the digits displayed on the digit sides currently displayed to the player to determine, for each of the player-selected paylines, whether at least a designated quantity of the digit sides of the multiple dimension digits generated at the digit display positions associated with that payline display a different one of the player-selected. Specifically, as seen in FIG. 12E, the gaming system evaluates each of the displayed digit sides of the generated multiple dimension digits from digit display position grid 1290*a* (i.e., digits 1291*a*, 1291*b*, 1291*c*, 1291*d*, 1291*e*, and 1291*f*) and each of the displayed sides or faces of the displayed multiple dimension digits from digit display position grid 1290*b* (i.e., digits 1293*a*, 1293*b*, and 1293*c*). In different embodiments, if a multiple dimension digit includes a plurality of digit sides currently displayed to the player, the gaming system evaluates one, more, or each of the displayed digit sides in determining any awards to provide to the player. In this case, as seen in FIG. 12E, the gaming system determines that there are no awards associated with the digits displayed at the displayed digit sides of the displayed multiple dimension digits.

In another embodiment employing multiple dimension symbols, for one play of the game, the gaming system evaluates the symbols exposed on a plurality of symbol sides of a plurality of multiple dimension symbols. In this embodiment, when a plurality of multiple dimension symbols are generated in the symbol display positions of each of the plurality of symbol display position grids, zero, one, or more of the multiple dimension symbols from the plurality of symbol display position grids form a plurality of multiple dimension symbol display position planes or surfaces. These multiple dimension symbol display position planes or surfaces each include one or more symbol display positions from one or more of the symbol display position grids at one or more depths. In this embodiment, for each plane or surface of the multiple dimension symbol display position grid displayed to the player, the gaming system evaluates the symbols displayed on the symbol sides of the multiple dimension symbols associated with that plane or surface. As described above, for each displayed plane or surface of the multiple dimension symbol display position grid, the gaming system removes any multiple dimension symbols from any winning symbol combinations, and shifts any multiple dimension symbols to reveal generated multiple dimension symbols in different symbol display position grids at the same depth or at different depths. This process is repeated until no winning symbol or winning symbol combination is displayed to the player.

Figure 13A:
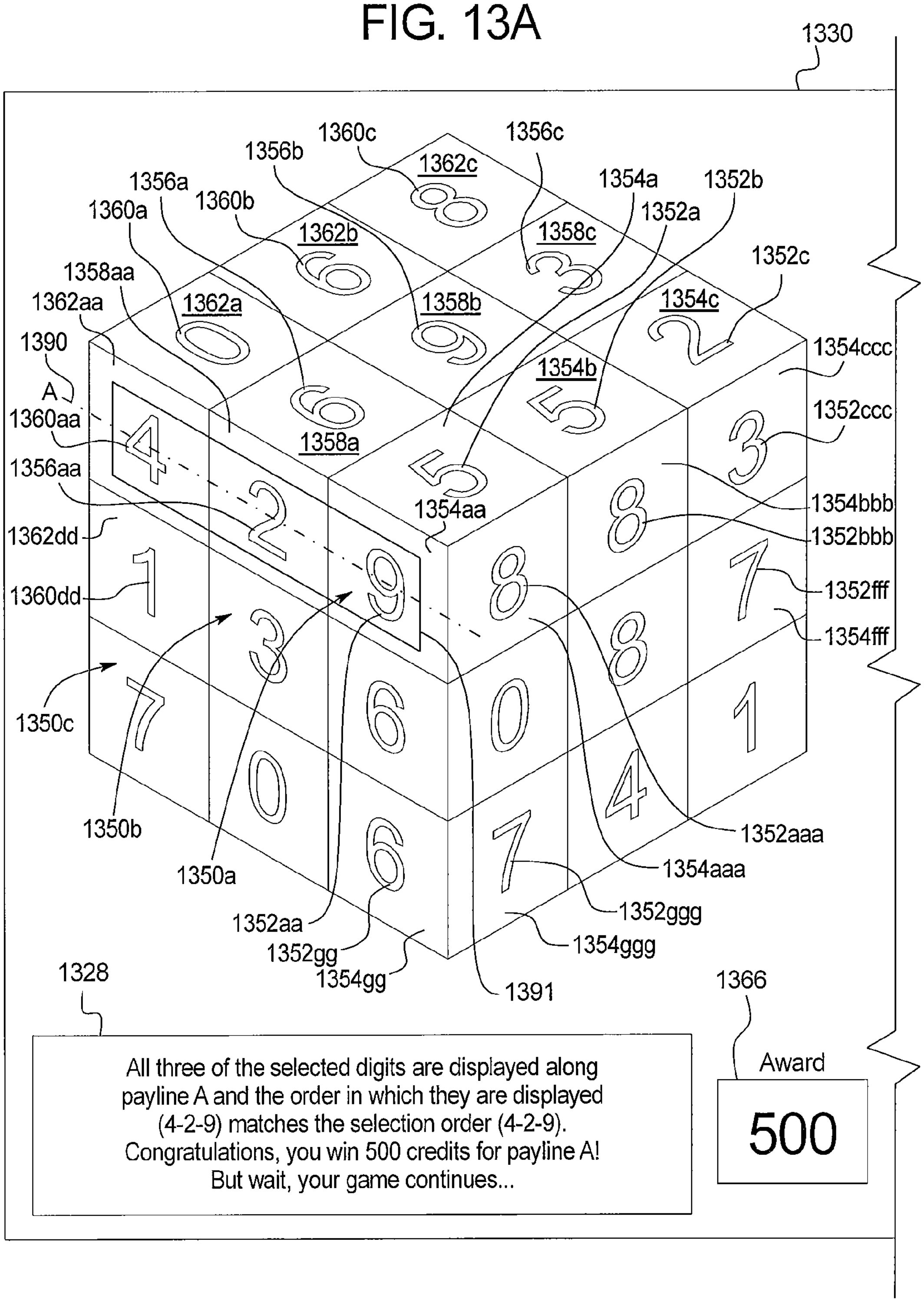
FIGS. 13A, 13B and 13C are front elevational views of the display of one embodiment of the gaming system disclosed herein illustrating the gaming system evaluating the symbols exposed on a plurality of faces or sides of a plurality of multiple dimension symbols.

For example, as seen in FIG. 13A, in one example embodiment of a play of the multi-dimensional symbol wagering game with cascading symbols disclosed herein, the multiple dimension symbols are multiple dimension digits, the symbol sides are digit sides, the symbols are the digits 0 to 9, the symbol display positions are digit display positions, and the symbol display position grids are digit display position grids. In this embodiment, the gaming system generates a plurality of multiple dimension digits at a plurality of digit display positions of each of a plurality of digit display position grids 1350*a*, 1356*b*, and 1350*c* at different depths. Specifically, the gaming system: (i) generates a plurality of multiple dimension digits 1352 at a plurality of digit display positions 1354 of digit display position grid 1350*a*, (ii) generates a plurality of multiple dimension digits 1356 at a plurality of digit display positions 1358 of digit display position grid 1350*b*, and (iii) generates a plurality of multiple dimension digits 1360 at a plurality of digit display positions 1362 of digit display position grid 1350*c*.

As seen in FIG. 13A, because digit display position grids 1350*b* and 1350*c* are positioned behind digit display position grid 1350*a*, one or more digit sides of one or more of the multiple dimension digits 1356 and 1360 generated at the plurality of digit display positions 1358 and 1362 of digit display position grids 1350*b* and 1350*c* are not initially displayed to the player. In this illustrated embodiment, the specific static view that this play of the game is displayed to the player causes a plurality of digit sides of a plurality of the multiple dimension digits 1352, 1356, and 1360 to be initially displayed to the player. For example, as seen in FIG. 13A, for one of the multiple dimension digits, the gaming system displays: (i) digit 5 1352*a* generated at digit display position 1354*a* on the displayed top digit side of this multiple dimension digit, (ii) digit 9 1352*aa* generated at digit display position 1354*aa* on the displayed left digit side of this multiple dimension digit, and (iii) digit 8 1352*aaa* generated at digit display position 1354*aaa* on the displayed right digit side on this multiple dimension digit. In another example, as also seen in FIG. 13A, for another one of the multiple dimension symbols, the gaming system displays: (i) digit 6 1356*a* generated at digit display position 1358*a* on the displayed top digit side of this multiple dimension digit, and (ii) digit 2 1356*aa* generated at digit display position 1358*aa* on the displayed left digit side of this multiple dimension digit.

After generating a plurality of multiple dimension digits, for each player-selected payline, the gaming system evaluates the digits displayed on the digit sides currently displayed to the player to determine, for each of the player-selected paylines, whether at least a designated quantity of the digit sides of the multiple dimension digits generated at the digit display positions associated with that payline display a different one of the player-selected digits. In this illustrated embodiment, the player has placed a wager of one credit on payline A 1390, which is associated with digit display positions 1362*aa*, 1358*aa*, and 1354*aa*, which display digit 4 1360*aa*, digit 2 1356*aa*, and digit 9 1352*aa*, respectively. Further, the player has selected digits 4, 2, and 9, in the selection order 4-2-9. The gaming system determines, as explained in detail above with respect to the examples illustrated in FIGS. 4, 5, 6, 7, 8, and 9; FIGS. 11A, 11B, 11C, 11D, 11E, 11F, and 11G; and FIGS. 12A, 12B, 12C, 12D, and 12E, that payline A 1390 is associated with an award of 500 credits because: (a) each digit display position 1362*aa*, 1358*aa*, and 1354*aa* associated with payline A displays a different one of the player-selected digits; and (b) the player-selected digits are displayed in a display order that matches the selection order (4-2-9). Accordingly, the gaming system provides an award of 500 credits to the player. It should be appreciated that this winning combination includes one digit displayed on one digit side of a multiple dimension digit generated in digit display position grid 1350*a*, one digit displayed on one digit side of a multiple dimension digit generated in digit display position grid 1350*b* and one digit displayed on one digit side of a multiple dimension digit generated in digit display position grid 1350*c*.

In one embodiment, the gaming system evaluates the displayed symbol sides of one or more multiple dimension symbols to determine if the displayed symbol sides form any designated patterns or any designated three dimensional patterns. For example, the gaming system evaluates the displayed symbol sides of one or more multiple dimension symbols to determine if any lines of three or more displayed symbol sides of one or more multiple dimension symbols are formed, any rectangles of four or more displayed symbol sides of two or more multiple dimension symbols are formed and/or any "L" shaped patterns of three or more displayed symbol sides of two or more multiple dimension symbols are formed. In this embodiment, such three-dimensional patterns may appear anywhere on one or more multiple dimension symbol display position planes (and not at a predetermined starting position and/or predetermined ending position). In one such embodiment, the gaming system displays the player any winning symbol combination in 3D.

Figure 13B:
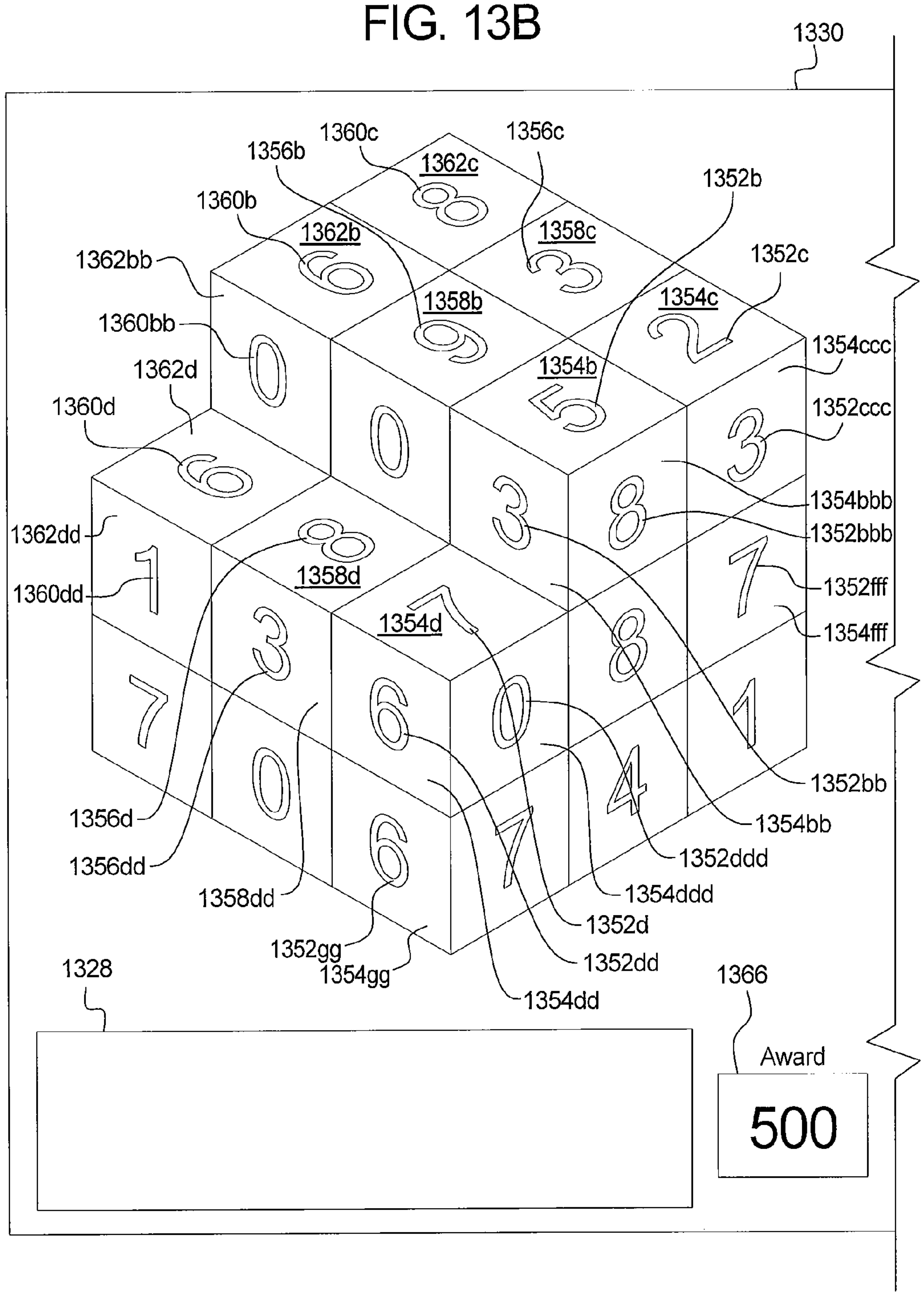

As seen in FIG. 13B, after determining any awards, the gaming system then removes each of the multiple dimension digits associated with the award of 500 credits. In this example, as seen in FIG. 13B, the removal of these multiple dimension digits from the left multiple dimension digit display position plane causes an empty digit display position in each of digit display position grids 1350*a*, 1350*b*, and 1350*c* to be created. In this embodiment, the created empty digit display positions causes a plurality of the digit sides of a plurality of multiple dimension digits to be displayed to the player. For example, the removal of the multiple dimension digit having a digit side displaying digit 9 1352*aa* causes both: (i) digit 7 1352*d* of one digit side of the multiple dimension digit generated at digit display position 1354*d* and (ii) digit 3 1352*bb* of one digit side of the multiple dimension digit generated at digit display position 1354*b*, to be displayed to the player. Thus, the creation of one or more empty digit display positions in one or more digit display position grids causes zero, one, or more previously hidden digit sides of one or more multiple dimension digits at one or more corresponding digit display positions in one or more digit display position grids to become displayed to the player.

Figure 13C:
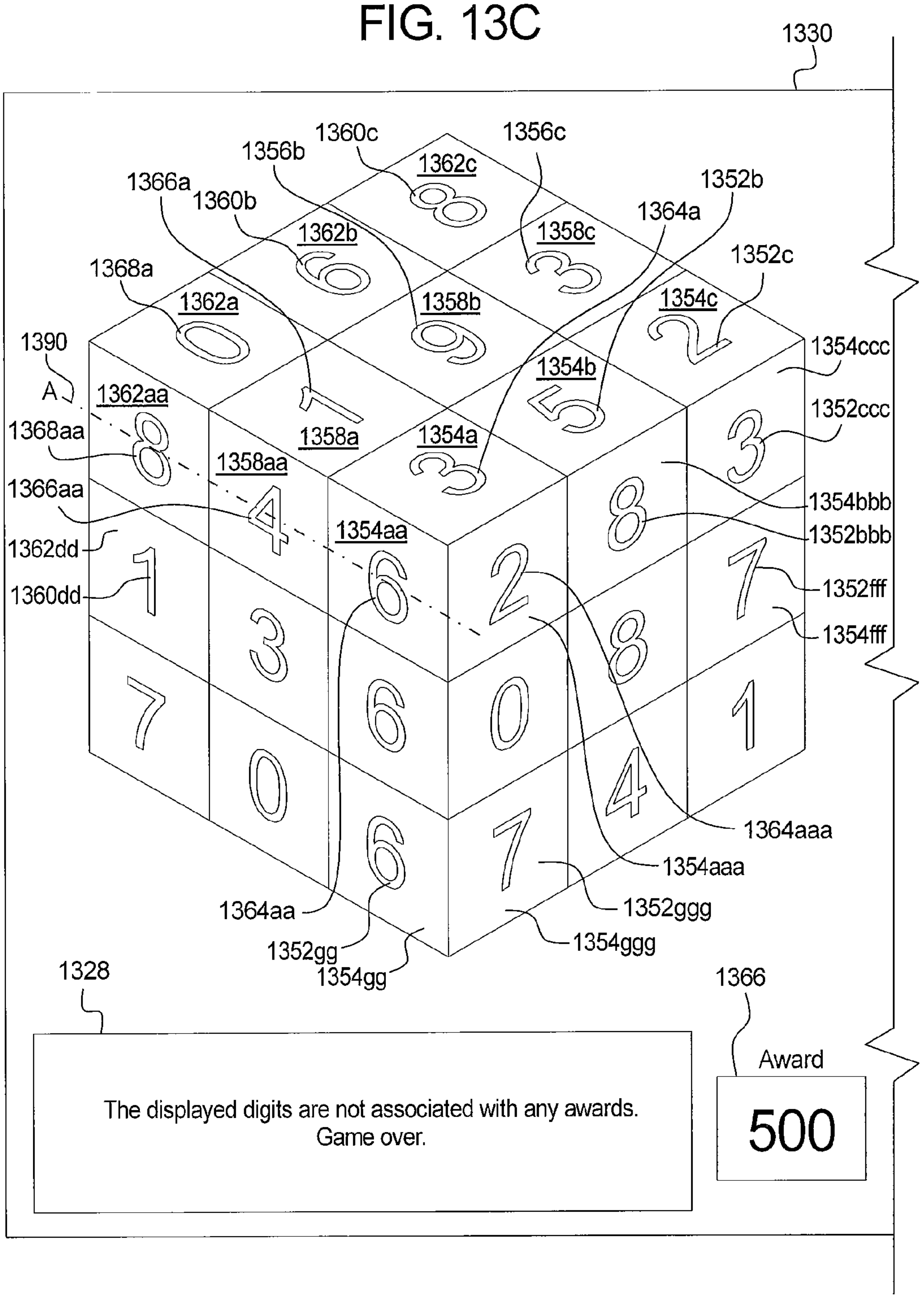

After removing any multiple dimension digits which include any digit sides associated with a determined award, the gaming system determines that no multiple dimension digits are positioned to be shifted to fill the created empty digit display positions. Thus, as seen in FIG. 13C, the gaming system generates a new digit for each empty digit display position. Specifically, the gaming system generates: (A) one multiple dimension digit which includes: (i) digit 3 1364*a* generated at digit display position 1354*a* on the displayed top digit side of this multiple dimension digit, (ii) digit 6 1364*aa* generated at digit display position 1354*aa* on the displayed left digit side of this multiple dimension digit, and (iii) digit 2 364*aaa* generated at digit display position 1354*aaa* on the displayed right digit side on this multiple dimension digit; (B) one multiple dimension digit which includes: (i) digit 1 1366*a* generated at digit display position 1358*a* on the displayed top digit side of this multiple dimension digit, and (ii) digit 4 1366*aa* generated at digit display position 1358*aa* on the displayed left digit side of this multiple dimension digit, and (C) one multiple dimension digit which includes: (i) digit 0 1368*a* generated at digit display position 1362*a* on the displayed top digit side of this multiple dimension digit, and (ii) digit 8 1368*aa* generated at digit display position 1362*aa* on the displayed left digit side of this multiple dimension digit.

After such multiple dimension digit generation, the gaming system again evaluates the symbols displayed on the left multiple dimension digit display position plane. In this example, after determining that no awards are associated with the digit sides displayed on the left multiple dimension digit display position plane, the gaming system proceeds to any remaining unevaluated multiple dimension digit display position planes to determine if any winning symbol combinations are formed.

As seen in FIG. 13C, in this example, after determining that the left multiple dimension digit display position plane is not associated with any awards, the gaming system proceeds to evaluate the right multiple dimension digit display position plane. After determining that the right multiple dimension digit display position plane is not associated with any awards, the gaming system proceeds to evaluate the top multiple dimension digit display position plane. After determining that the top multiple dimension digit display position plane is not associated with any awards, the gaming system determines that no multiple dimension digit display position planes remain unevaluated and ends the play of the game.

In one embodiment, as described above, the gaming system evaluates the symbol sides of a multiple dimension symbol display position plane, removes any multiple dimension symbols with any symbol sides included in a winning symbol combination, shifts and/or generates one or more additional multiple dimension symbols, and reevaluates the symbol sides of this multiple dimension symbol display position plane before proceeding to the next multiple dimension symbol display position plane. In this embodiment, the removal of one or more multiple dimension symbols associated with one multiple dimension symbol display position plane may affect the symbols displayed in another multiple dimension symbol display position plane. In one such embodiment, the removal of one or more multiple dimension symbols associated with one multiple dimension symbol display position plane may cause a non-winning symbol combination to be replaced with a winning symbol combination. In another such embodiment, the removal of one or more multiple dimension symbols associated with one multiple dimension symbol display position plane may cause a winning symbol combination to be replaced with a non-winning symbol combination.

In another embodiment, the gaming system evaluates the symbol sides of the multiple dimension symbols which form a multiple dimension symbol display position plane, and proceeds to the next multiple dimension symbol display position plane before removing any symbols from any winning symbol combination.

In one embodiment wherein the gaming system evaluates the symbol sides of the multiple dimension symbols which form a multiple dimension symbol display position plane, and proceeds to the next multiple dimension symbol display position plane before removing any symbols from any winning symbol combinations, the gaming system provides the player an additional award, such as triggering a bonus game, if one or more multiple dimension symbols each include a plurality of symbol sides included in a plurality of winning symbol combinations. For example, a multiple dimension symbol includes a King on one symbol side which is part of a three King winning symbol combination and also includes a Queen on another symbol side which is part of a three Queen winning symbol combination. In this example, the gaming system provides the player an additional award, such as a multiplier of the awards associated with the three King winning symbol combination and the three Queen winning symbol combination because this multiple dimension symbol is associated with a plurality of winning symbol combinations. In an alternative embodiment, if a multiple dimension symbol is associated with a plurality of winning symbol combinations, the gaming system causes each of the symbol sides of that multiple dimension symbol to become wild symbols.

In another embodiment, rather than generating one or more multiple dimension symbols for any created empty symbol display positions, the gaming system continues removing multiple dimension symbols from any winning symbol combination until one or more holes or craters are created in the set of symbol display position grids. In one such embodiment, the gaming system provides the player an additional award if an entire level of multiple dimension symbols are removed and/or if enough multiple dimension symbols are removed to enable the player to view through each symbol display position grid.

In one another embodiment, one or more designated characters, such as one or more "fairies" are associated with one or more symbol display positions. In this embodiment, if the multiple dimension symbol generated at that associated symbol display position is removed, the designated character associated with that symbol display position is activated to provide one or more additional awards to the player. For example, if a designated character is activated, the gaming system turns certain multiple dimension symbols into wild symbols, modifies the award associated with certain winning symbol combinations, removes one or more multiple dimension symbols (which could activate other designated characters), awards a bonus round, provides one or more bonus symbols needed to trigger a bonus round, and/or provides the player with a cash award. In different embodiments, each designated character is associated with the same additional award or associated with different additional awards. In another embodiment, each successive designated character that is activated during a play of a game is associated with a successively higher valued award (i.e., the first activated character for a play of the a game is associated with a 2× multiplier and the second activated character for the play of the game is associated with a 3× multiplier).

In another embodiment, a plurality, but not all, of the symbol side of each multiple dimension symbol includes a symbol. In this embodiment, the removal of one or more multiple dimension symbols causes the symbols of one or more symbol side of one or more other multiple dimension symbols to be displayed to the player to create one or more additional paylines. That is, one or more paylines are not initially evaluated for a play of a game (because no symbols are displayed along those paylines), but as one or more symbols are removed from one or more symbol display position grids, different symbols are displayed along those paylines and thus evaluated. In another embodiment, each symbol side of a multiple dimension symbol includes the same symbol.

In another embodiment, each symbol of the plurality of symbols (or alternatively, one or more symbol side of each of the plurality of multiple dimension symbols) is associated with a characteristic, such as a color or shape. In this embodiment, the gaming system displays the symbols of the plurality of symbol display position grids to the player such that the characteristic (e.g., the color) associated with one or more symbols (or one or more symbol sides of one or more multiple dimension symbols) are displayed to the player (even if the entire symbol or the symbols on such symbol sides are not displayed to the player). That is, the gaming system displays one or more characteristics of one or more symbols (or one or more symbol sides of one or more multiple dimension symbols) while not displaying the entire symbols (or not displaying the symbols of the symbol sides of those multiple dimension symbols).

In one such embodiment employing characteristics, the gaming system utilizes the characteristics of the symbols to convey information to the player. For example, a designated characteristic, such as the color gold, is associated with wild symbols, wherein the gaming system displays to the player that each of the symbols of a symbol display position grid are gold and therefore, the symbols of this symbol display grid are wild symbols. In this example, the player plays the game in an attempt to clear away enough symbols to reach that symbol display position grid of wild symbols.

In another such embodiment employing characteristics, the gaming system utilizes the characteristics of the symbols to provide to the player one or more awards, such as one or more matching characteristic awards. In this embodiment, different characteristics are associated with different awards, such that the award provided to the player is based on which characteristic is matched. For example, if a plurality of the displayed symbols (or a plurality of displayed symbol sides of a plurality of the multiple dimension symbols) generated at a plurality of the symbol display positions of one or more of the symbol display position grids are each associated with the same characteristic, such as the same color silver, the gaming system provides to the player the matching characteristic award associated with that characteristic.

In another embodiment, the multi-dimensional symbol wagering game with cascading symbols disclosed herein utilizes the fourth dimension of time to determine any awards to be provided to a player. In one such embodiment, the gaming system associates certain symbols with a duration or quantity which those symbols remain in one of the symbol display grids. In this embodiment, if such symbols are generated in the symbol display positions of the symbol display position grids and such symbols form part of a winning symbol combination, then as long as the associated duration or quantity has not expired, such symbols are not removed from the symbol display positions of the symbol display position grids.

Figure 14A:
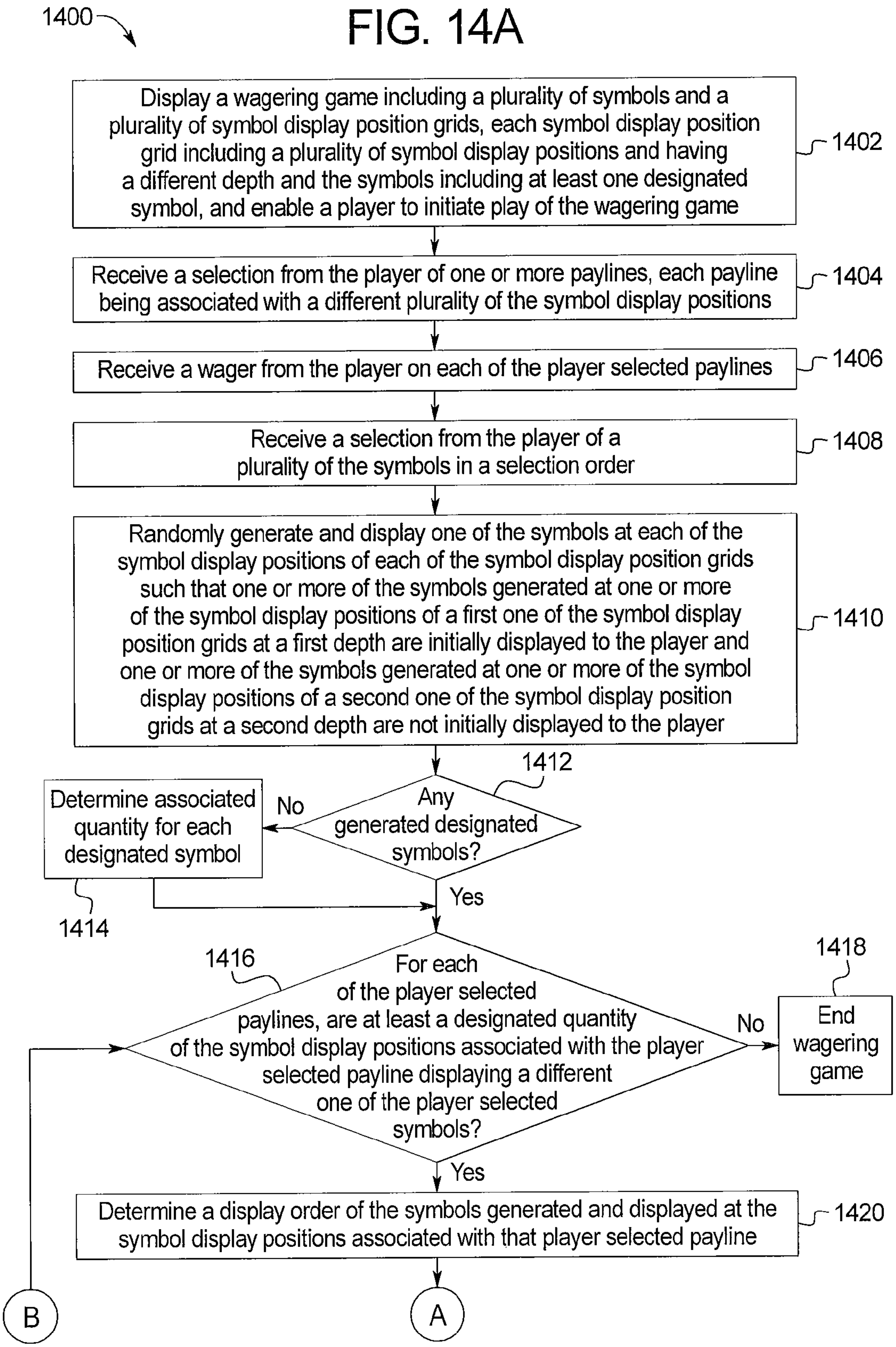
FIGS. 14A and 14B are a flow chart illustrating one embodiment of a method for operating the gaming system providing the multi-dimensional symbol wagering game with cascading symbols including a time element disclosed herein.
Figure 14B:
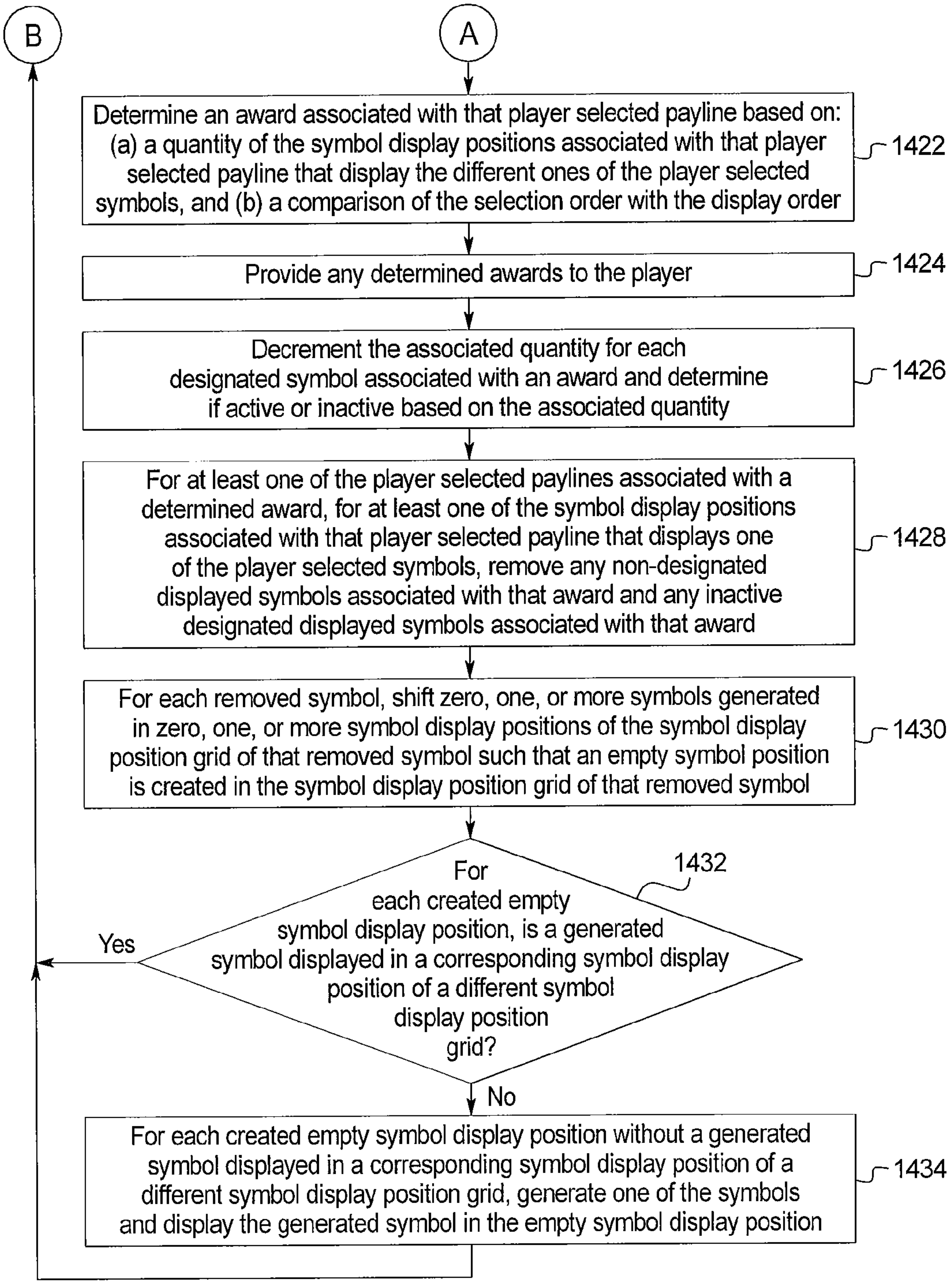

Specifically, FIGS. 14A and 14B illustrate a flowchart of an example embodiment of a process for operating a gaming system or a gaming device utilizing the fourth dimension of time. In one embodiment, this process is embodied in one or more software programs stored in one or more memories and executed by one or more processors or servers. Although this process is described with reference to the flowchart illustrated in FIGS. 14A and 14B, it should be appreciated that many other methods of performing the acts associated with this process may be used. For example, the order of certain steps described may be changed, or certain steps described may be optional.

In operation of one embodiment, the gaming system displays a wagering game including a plurality of symbols and a plurality of symbol display position grids, and enables a player to initiate play of the wagering game, as indicated in block 1402. As described above, each symbol display position grid includes a plurality of symbol display positions having a depth and arranged in a plurality of rows and a plurality of columns.

In one embodiment, one or more paylines of any suitable direction extend through a plurality of the symbol display positions of one of the symbol display position grids at one depth. In another embodiment, one or more paylines of any suitable direction extend through a plurality of the symbol display positions of a plurality of the symbol display position grids at a plurality of different depths. In this embodiment, the gaming system enables the player to wager on one or more of such paylines. In another embodiment, one or more ways to win are associated with a plurality of symbol display positions of a symbol display position grid at one depth. In another embodiment, one or more ways to win are associated with a plurality of symbol display positions of a plurality of symbol display position grids at a plurality of different depths. In these embodiments, the gaming system enables the player to wager on a quantity of active symbol display positions or a quantity of ways to win.

The gaming system receives a selection from the player of one or more paylines, as indicated in block 1404. In this embodiment, each of the paylines is associated with a different plurality of the symbol display positions. The gaming system receives a wager from the player on each of the selected paylines, as indicated in block 1406. The gaming system receives a selection from the player of a plurality the symbols in a selection order, as indicated in block 1408.

The gaming system generates one of a plurality of symbols at each of the symbol display positions of each of the different symbol display position grids as indicated in block 1410. In this embodiment, the plurality of symbols include at least one designated symbol. In one such embodiment, the designated symbol is associated with a duration of time. In another such embodiment, the designated symbol is associated with a quantity of winning symbol combinations. In another such embodiment, the designated symbol is associated with a quantity of symbol shifts. In another such embodiment, the designated symbol is associated with a quantity of games played.

In these embodiments, as described above, the generation of the symbols at the symbol display positions of the symbol display position grids results in one or more symbols generated at one or more of the symbol display positions of a first of the symbol display position grids of a first depth being initially displayed to the player and one or more symbols generated at one or more of the symbol display positions of a second of the symbol display position grids at a second depth are not initially displayed to the player. Put differently, since at least a second one of the symbol display position grids is at least partially positioned behind the first one of the symbol display position grids (relative to the player's line of sight), at least one of the symbols generated at at least one of the symbol display positions of the second one of the symbol display position grids is masked by at least one symbol generated at at least one of the symbol display positions of another symbol display position grid and thus not initially displayed to the player.

In one embodiment, upon generating one of the plurality of symbols at each symbol display position, the gaming system determines whether one or more designated symbols are generated as indicated by diamond 1412. If at least one designated symbol is generated, the gaming system determines an indicated quantity for the at least one generated designated symbol, as indicated by block 1414. In one such embodiment, each generated designated symbol is associated with an indicated quantity, indicated as a numeral in parentheses next to the designated symbol. In another embodiment, the gaming system displays the indicated quantity associated with a designated symbol by color of the designated symbol (i.e., the designated symbol fades from black to white as the indicated quantity decreases). In another embodiment, the gaming system displays an indicated quantity on a separate counter associated with each designated symbol.

The gaming system determines, for each of the player selected paylines, whether at least a designated quantity of the symbol display positions associated with that player selected payline displays a different one of the player selected symbols, as indicated in diamond 1416. If a designated quantity of the symbol display positions associated with at least one of the player selected paylines do not each display different ones of the player selected symbols, the wagering game ends, as indicated by block 1418. If a designated quantity of the symbol display positions associated with at least one of the player selected paylines each display a different one of the player selected symbols, the gaming system determines a display order of the symbols generated and displayed at the symbol display positions associated with that player selected payline, as indicated in block 1240, and determines any awards associated with that player selected payline to be provided to the player based on (a) a quantity of the symbol display positions associated with that player selected payline that display the different ones of the player selected symbols, and (b) a comparison of the selection order with the display order, as indicated in block 1422. The gaming system provides any determined awards to the player, as indicated in block 1424. It should be appreciated that because certain generated symbols are not initially displayed to the player (i.e., certain generated symbols are blocked from being displayed by other symbols generated at different depths), the gaming system disclosed herein only evaluates the symbols currently displayed to the player for award evaluation purposes.

After providing the player any awards, the gaming system decrements the indicated quantity associated with each of any designated symbols associated with a determined award as indicated by block 1426. In one embodiment, for each of any generated and displayed designated symbols, the gaming system determines whether that designated symbol is active or inactive based on the decremented indicated quantity associated with the designated symbol. In one example embodiment, the gaming system determines that a generated designated symbol is inactive if the indicated quantity associated with the designated symbol is equal to or less than a predefined quantity, such as zero.

After decrementing the indicated quantity associated with zero, one, or more generated and displayed designated symbols, for at least one of the player selected paylines associated with a determined award, for at least one of the symbol display positions associated with that player selected payline that displays one of the player selected symbols, the gaming system removes any non-designated displayed symbols and any inactive designated displayed symbols associated with that award, as indicated in block 1428. Removing such symbols results in one or more empty symbol display positions which the gaming system may fill by shifting one or more other displayed symbols. Specifically, as indicated in block 1430, for each removed symbol, the gaming system shifts zero, one, or more symbols generated in zero, one, or more symbol display positions of the symbol display position grid of that removed symbol. Such shifting results in, for each removed symbol, an empty symbol display position being created in the symbol display position grid of that removed symbol.

After exposing zero, one, or more previously hidden symbols, as indicated in diamond 1432, for each created empty symbol display position, the gaming system determines whether a generated symbol is displayed in a corresponding symbol display position of a different symbol display position grid. The gaming system thus determines whether each created empty symbol display position reveals another symbol generated at another depth.

If any least one created empty symbol display position does not reveal another symbol generated at another depth, as indicated in block 1434, the gaming system generates a symbol for each created empty symbol display position without a generated symbol displayed in a corresponding symbol display position of a different symbol display position grid. The gaming system then returns to diamond 1416 and again determines if any of the generated symbols currently displayed to the player form any winning combinations of displayed symbols. On the other hand, if each created empty symbol display position reveals another symbol of another symbol display position of another symbol display position grid of a different depth, the gaming system returns to diamond 1416 and again determines if any of the generated symbols currently displayed to the player form any winning combinations of displayed symbols. Accordingly, this embodiment of the gaming system provides an element of the fourth dimension of time by providing a player with an opportunity to win multiple awards for multiple generations of symbols, wherein one or more generated designated symbols is usable for a plurality of generations and thus potentially usable in a plurality of winning symbol combinations. Moreover, since such designated symbols remain displayed for a number of symbol generations, the designated symbols are more likely to accumulate in the lower symbol display positions of the symbol display position grids resulting in winning symbol combinations being more likely to be generated as the game progresses.

In another embodiment, the gaming system tracks a quantity of times a designated symbol is included in one or more winning symbol combinations. In this embodiment, if the quantity of times the designated symbol is included in one or more winning symbol combinations reaches a designated quantity, an additional award is provided to the player. For example, if a designated symbol was previously included in four separate winning symbol combinations (for a single play of a game) and that designated symbol is included in a fifth winning symbol combination (for the single play of the game), the gaming system triggers a bonus round in association with this designated symbol. In one such example, the gaming system displays this designated symbol as a balloon symbol which inflates more each time the designated symbol is included in a winning symbol combination.

In another embodiment utilizing the fourth dimension of time to determine any awards to be provided to a player, the gaming system records or stores one or more of the symbols generated in one or more of symbol display positions of one or more of the symbol display position grids for one or more plays of the game. In one such embodiment, the gaming system records or stores, for an individual gaming device, the symbols generated in the symbol display positions of the symbol display position grids for each play of the game. In another such embodiment, the gaming system records or stores, for a group of gaming devices, the symbols generated in the symbol display positions of the symbol display position grids for each play of the game. In another such embodiment, the gaming system records or stores, for an individual player, the symbols generated in the symbol display positions of the symbol display position grids for each play of the game. In another such embodiment, the gaming system records or stores, for a group of players, the symbols generated in the symbol display positions of the symbol display position grids for each play of the game.

In one embodiment, when a player initiates a play of this multi-dimensional symbol wagering game with cascading symbols, the gaming system randomly picks a designated quantity of one or more previous plays of the game and uses the previously recorded symbols of those plays of the game to determine any awards for the initiated play of the game. In another embodiment, when a player initiates a play of this multi-dimensional symbol wagering game with cascading symbols, the gaming system picks a designated quantity of one or more previous plays of the game from a designated period of time and uses the previously recorded symbols of those plays of the game to determine any awards for the initiated play of the game.

In this embodiment, for a play of a game, in addition to or as an alternative to evaluating the displayed symbols generated at the symbol display positions of one or more symbol display position grids, the gaming system evaluates the displayed symbols generated at the symbol display positions of one or more symbol display position grids compared to the stored symbols generated in the symbol display positions of the symbol display position grids for one or more previous plays of the game. That is, in this embodiment, a player would be playing against symbols generated for one or more players who previously played the game. In one such embodiment, the gaming system determines an award based on how many displayed symbols generated at the symbol display positions of one or more symbol display position grids were also displayed at the symbol display positions of one or more symbol display position grids for one or more previous plays of the game. In another such embodiment, the gaming system determines an award based on which symbols were generated and displayed in both the current play of the game and one or more previous plays of the game. In another such embodiment, the gaming system determines an award based on which symbols were generated and displayed in which symbol display positions of which symbol display position grids in both the current play of the game and one or more previous plays of the game. In another such embodiment, the gaming system determines an award based on which symbols were generated and displayed in a current play of the game compared to the outcome that another player (or other players) previously generated in one or more previous or concurrent plays of the game.

In one embodiment, the gaming system enables the player to win an additional award depending on how the symbols generated for that player compare to the symbols generated for a subsequent play of the game. For example, the gaming system provides the player an award if the symbols generated for that player compare favorable with the symbols generated for another play of the game. That is, this embodiment of the gaming system provides that the symbols generated for a player are utilized in at least two games, once as an active symbols for the current play of the game and once as an inactive or comparison symbols for one or more subsequent plays of the game In another embodiment, when the gaming system is initially started, the gaming system does not have the available data of stored symbols from previous plays of the game (because no symbols have been generated in any plays of the game yet). In this embodiment, one or more default bots are used to build an applicable database of symbols generated in plays of the game. As the database becomes more extensive with stored symbols from actual plays of the game, the gaming system relies more on the previous plays of the game and less on the default bots.

In another embodiment, the gaming system determines an award based on which symbols were generated and displayed in a current play of the game compared to a target outcome, such as a predefined target image formed by the plurality of symbols. In another embodiment, the gaming system determines an award based on a plurality of players each contributing one or more symbols to match a target outcome. In one such embodiment, each multiple dimension symbol display position plane is associated with a different target characteristic, such as a different color, and a plurality of players each contribute one or more multiple dimension symbols in an attempt to cause each multiple dimension symbol display position plane to have its associated target characteristic. In one such embodiment, if a multiple dimension symbol display position plane achieves its target characteristic, such as each of the symbol sides of each of the multiple dimension symbols which form the multiple dimension symbol display position plane are the same color, the gaming system provides an award to any players that contributed one or more multiple dimension symbols. In another such embodiment, if a multiple dimension symbol display position plane achieves its target characteristic, such as each of the symbol sides of each of the multiple dimension symbols which form the multiple dimension symbol display position plane are the same color, the gaming system enables each of the players that contributed one or more multiple dimension symbols to participate in a bonus game.

In another embodiment, the gaming system utilizes an accumulator cube to provide one or more awards over a period of time. In one such embodiment, if a symbol from a player's play of a game matches a target symbol in an exact position in a target accumulator cube, the gaming system adds that symbol to an accumulator cube. In this embodiment, when the accumulator cube is filled with symbols (either all from an individual player over a plurality of plays of the game or from a group of a plurality of players over a plurality of plays of the game), the gaming system provides an award to one or more players, such as providing each player an award value or enabling each player to participate in a bonus game.

In one embodiment, the symbols available to be generated in association with each of the symbol display position grids are the same. In this embodiment, each of the symbols generated at each of the symbol display positions of each of the symbol display position grids are selected from the same plurality of symbols. For example, for a 3×5 reel game, the gaming system utilizes the same reel strips to create ten or more symbol display position grids. In this example, the gaming system then randomly layers the created symbol display position grids. As winning combinations are removed from one layer (i.e., one symbol display position grid), the symbols from the next layer (i.e., the next symbol display position grid) become displayed to fill the created empty symbol display positions.

In another embodiment, different symbols are available to be generated in association with different symbol display position grids. In this embodiment, a plurality of the symbols available to be generated in a plurality the symbol display positions of at least one of the symbol display position grids are selected from one plurality of symbols and a plurality of the symbols available to be generated in a plurality of the symbol display positions of at least a different one of the symbol display position grids are selected from a different plurality of symbols. For example, the plurality of symbols available to be generated in association with the symbol display positions of one symbol display position grid at one depth includes a higher concentration of wild symbols and/or high valued symbols. In another example, the plurality of symbols available to be generated in association with the symbol display positions of a second symbol display position grid at a second depth includes a higher concentration of symbols associated with the triggering of a bonus game.

In another embodiment, the symbols available to be generated with each symbol display position grid vary between plays of the game. For example, for a first play of the game, the plurality of symbols available to be generated in association with the symbol display positions of a third symbol display position grid at a third depth include a higher concentration of wild symbols, while for a second play of the game, the plurality of symbols available to be generated in association with the symbol display positions of a second symbol display position grid at a second depth include a higher concentration of wild symbols. In another example, for a first play of the game, the plurality of symbols available to be generated in association with the symbol display positions of a third symbol display position grid at a third depth include a higher concentration of bonus triggering symbols, while for a second play of the game, the plurality of symbols available to be generated in association with the symbol display positions of a first symbol display position grid at a first depth include a higher concentration of wild symbols.

In another embodiment of employing different symbols in association with different symbol display position grids, the gaming system layers the symbol display position grids with symbols in order of payback percentage. For example, the top layer (i.e., the first symbol display position grid including generated symbols initially displayed to the player) may be created from reel strips having an 85% average expected payback percentage, the next layer (i.e., the second symbol display position grid including generated symbols not initially displayed to the player) may be created from reel strips having a 110% average expected payback percentage, the next layer (i.e., the third symbol display position grid including generated symbols not initially displayed to the player) may be created from reel strips having a 250% average expected payback percentage, and the next layer (i.e., the fourth symbol display position grid including generated symbols not initially displayed to the player) may be created from reel strips having a 1000% average expected payback percentage. In this example, the more winning combinations a player removes from the top layer, the more likely the player is to experience the higher valued awards associated with the later or deeper layers.

In another embodiment of employing different symbols in association with different symbol display position grids, the gaming system creates ten or more layers (i.e., ten or more symbol display position grids) from reel strips of various average expected payback percentages. For example, the average expected payback percentage of the reel strips is 95%, but one or more average expected payback percentages of one or more reel strips are higher than 100%. In this example, the gaming system randomly arranges the reel strips with the created symbol display position grids such that the player could receive any of the reel strips in association with any of the symbol display position grids. Accordingly, based on which reel strip is randomly associated with which symbol display position grid (and thus based on which symbols are likely to be generated in symbol display positions initially displayed to the player) the play of the game may be associated with a greater than 100% average expected payback percentage or associated with an average expected payback percentage of less than 100%. In different embodiments, the varying average expected payback percentages of various symbol display position grids is accomplished through using one or more wild symbols, one or more multiplier wild symbols, one or more top award symbols, one or more progressive jackpot symbols, one or more bonus symbols, and/or one or more split symbols.

In another embodiment, the gaming system employs one or more symbol stacks, such as stacked wild symbols. In one such embodiment, a generated symbol stack is associated with a plurality of symbol display positions at a plurality of symbol display positions grids of different depths. For example, if a stacked wild symbol is generated at a first symbol display position of a first symbol display position grid of a first depth, if one of the wild symbols of that stack wild symbol is subsequently removed, the gaming system will reveal another one of the wild symbols of that stacked wild symbol at the first symbol display position of a second symbol display position grid of a second depth.

In one such embodiment, the different symbols of a stacked symbol are associated with different awards and/or features. For example, a stacked wild symbol generated at a first symbol display position of a first symbol display position grid of a first depth is associated with a multiplier of 1×, a stacked wild symbol generated at a first symbol display position of a second symbol display position grid of a second depth (which is, relative to the player's line of sight, behind the first symbol display position of the first symbol display position grid) is associated with a multiplier of 2×, and a stacked wild symbol generated at a first symbol display position of a third symbol display position grid of a third depth (which is, relative to the player's line of sight, behind the first symbol display position of the first symbol display position grid and also behind the second symbol display position of the second symbol display position grid) is associated with a multiplier of 3×.

In another embodiment, the gaming system provides the player a bonus award if each of the symbols generated at each of the symbol display positions of a symbol display position grid are removed. In another embodiment, the rows or columns on one or more symbol display position grids at one or more different depths include random or pre-defined sets of symbols. For example, the symbols on the top row of the symbol display position grid at a second depth level all contain the same symbol, and the gaming system provides a bonus award to the player if the entire row of symbol display positions of that symbol display position grid are revealed.

In another embodiment, the gaming system adds additional symbol display position grids of different depths as the game progresses. In this embodiment, if at least one symbol is removed from at least one symbol display position of the last or deepest symbol display position grid (relative to the player's line of sight), the gaming system adds an additional symbol display position grid behind that symbol display position grid (i.e., a new deepest symbol display position grid).

In another embodiment, the size and/or configuration of the symbol display position grids at one or more different depths are different. For example, a first symbol display position grid of a first depth includes three rows and five columns of symbol display positions and a second symbol display position grid of a second depth includes four rows and five columns of symbol display positions. In another embodiment, the number of symbol display positions of a plurality of symbol display position grids of different depths are different. For example, a first symbol display position grid of a first depth includes a first number of one or more symbol display positions and a second symbol display position grid of a second depth includes a second number of one or more symbol display positions. In another example, one symbol display position grid of a first depth includes a plurality of symbol display positions and another symbol display position grid of a second depth includes one symbol display position.

In another embodiment, one or more symbols are not initially generated at one or more symbol display position grids (i.e., one or more symbol display position grids include one or more initially empty symbol display positions). In this embodiment, when a first symbol display position grid including at least one initially empty symbol display position is placed in front of (relative to the player's line of sight) a second symbol display position grid, symbols from the second symbol display position grid automatically fill in or are otherwise displayed through the empty symbol display positions. Accordingly, the gaming system provides a player access to symbols from deeper symbol display position grids due to such initially empty symbol display positions. It should be appreciated that in these embodiments, one or more symbols generated in a plurality of different symbol display position grids at different depths will be initially displayed to the player.

In another embodiment, the gaming system utilizes a plurality of different sets of symbol display position grids of different depths. In one such embodiment, at least a first area, column or row of a first set of symbol display position grids is associated with or linked to at least a first area, column, or row of a second set of symbol display position grids and at least a second area, column, or row of the first set of symbol display position grids is not associated with or linked to any area, column, or row in any second set of symbol display position grids. In a play of the game, as described above, symbols are independently generated for each set of symbol display position grids and the symbols displayed for each set of symbol display position grids of different depths are independently evaluated to provide any awards for any winning symbols or winning symbol combinations. After the evaluation, the gaming system removes zero, one, or more symbols to leave zero, one, or more empty symbol display positions. In one embodiment, if any empty symbol display positions are formed on the first area, column, or row of the first set of symbol display position grids, the gaming system shifts or transfers one or more symbols from the first area, column, or row of the first set of symbol display position grids to the linked first area, column, or row of the second set of symbol display position grids to occupy the one or more empty symbol display positions. In this embodiment, if there are any empty symbol display positions on the second area, column, or row of the first set of symbol display position grids, the gaming system does not shift or transfer any symbols from the second area, column, or row of the first set of symbol display position grids to the second area, column, or row of the second set of symbol display position grids. The gaming system then independently evaluates the symbols displayed for each set of symbol display position grids to provide any awards for any winning symbols or winning symbol combinations.

In one alternative embodiment, rather than shifting one or more symbols from the first set of symbol display position grids to the second set of symbol display position grids, the gaming system transfers any winning symbols which are removed from the first set of symbol display position grids to the second set of symbol display position grids. In this embodiment, the second set of symbol display position grids is filled with symbols over a quantity of plays of the game (by one or more players). In one such embodiment, if any of the symbols transferred to the second set of symbol display position grids form any winning symbol combinations, the gaming system provides any awards associated with such winning symbol combinations to the player or players that contributed such symbols.

In another embodiment, the gaming system employs a symbol accumulation sequence and a symbol evaluation sequence. The symbol accumulation sequence includes an accumulation of a plurality of symbols in association with a persistence game. The symbol accumulation sequence also includes the maintenance of a persistence game arrangement that displays a designated quantity of accumulated symbols. In one such embodiment, the accumulated symbols are the symbols removed from any winning symbol combination as described above. Such maintenance of the persistence game arrangement includes, in certain instances, removing at least one previously accumulated symbol from the persistence game arrangement to enable the gaming system to cause the persistence game arrangement to accumulate and display a newly generated symbol. The symbol evaluation sequence includes an evaluation of at least some of the previously accumulated symbols to determine an award. In one embodiment, the symbol evaluation sequence includes the gaming system determining and providing an award based on the accumulated symbols of the persistence game. In another embodiment, the symbol evaluation sequence includes the gaming system determining and providing an award based on at least one of the accumulated symbols of the persistence game and at least one displayed symbol for a current play of the tumbling reels game disclosed herein.

In another embodiment, after removing one or more symbols from any displayed winning symbol combinations, the gaming system determines if a designated event has occurred. In this embodiment, if the gaming system determines that a designated event has occurred, the gaming system generates at least one predetermined designated symbol in at least one of the empty symbol display positions created by the removal of symbols from the winning symbol combinations. For example, the gaming device generates a predetermined designated wild symbol in one or more of the empty symbol display positions. In one embodiment, any predetermined designated symbols are independent of and in addition to the plurality of symbols. That is, the predetermined designated symbols are separate from and not initially available with the plurality of symbols for the gaming system to generate in the plurality of symbol display positions. In this embodiment, the gaming system evaluates the displayed symbols (including any generated predetermined designated symbols) and provides any awards associated with any winning symbol combinations.

In one alternative embodiment, once a single symbol has been exposed in a symbol display position grid, the gaming system also reveals any symbols at that depth that are not obscured by symbols in front of them. In another embodiment, once an entire symbol display position grid has been removed, the gaming system also revealed the symbols generated in the symbol display positions of the next symbol display position grid of a different shape (than the removed grid).

In another alternative embodiment, rather than shifting any of the symbols into any empty symbol display positions, the gaming system disclosed herein retains one or more symbols in its respective symbol display position. In this embodiment, as described above, any symbols generated at any symbol display positions of any symbol display position grid of a different depth (than the depth of the symbol display position grid with at least one empty symbol display position) are displayed and evaluated with the remaining displayed symbols.

In another embodiment, the gaming system removes any symbols of any displayed winning symbol combinations, evaluates the symbols currently displayed to the player (i.e., evaluates symbols generated in symbol display positions of at least two different symbol display position grids of different depths), removes any symbols of any displayed winning symbol combinations, and repeats this process until no more displayed winning symbol combinations exist. In this embodiment, when no more displayed winning symbol combinations exist, the gaming system shifts zero, one, or more symbols as described above and then repeats removing symbols and evaluating any currently displayed symbols to determine if any winning symbol combinations are displayed.

In another embodiment, the shifting of symbols into empty symbol display positions can occur in any suitable direction (e.g., up, down, left, right, diagonal) in one symbol display position grid and/or in any suitable direction (e.g., backwards, forward) between different symbol display positions of different depths. In one such embodiment, if an empty symbol display position is created in one of the symbol display position grids, one or more symbols generated in one or more symbol display positions of one or more different symbol display position grids (of one or more different depths) are shifted to fill the empty symbol display position.

In another embodiment, if one or more empty symbol display positions are created in one or more symbol display position grids, the gaming system generates and displays a symbol for each created empty symbol display position. In one such embodiment, when certain symbols of certain winning symbol combinations are removed to create one or more empty symbol display positions, the gaming system generates and displays a symbol for each created empty symbol display position. In this embodiment, when certain other symbols of certain other winning symbol combinations are removed to create one or more empty symbol display positions, the gaming system proceeds as described above with revealing one or more symbols generated at one or more symbol display positions of one or more different symbol display position grids of different depths. In another such embodiment, the gaming system enables the player to pick which created empty symbol display positions will be filled by the gaming system generating and displaying a symbol for that created empty symbol display position and which created empty symbol display positions will be filled by the gaming system revealing one or more symbols generated at one or more symbol display positions of one or more different symbol display position grids of different depths.

It should be appreciated that in different embodiments, one or more of:

i. a quantity of symbol display position grids;
ii. a quantity of symbol display positions in each symbol display position grid;
iii. a shape or configuration of each symbol display position grid;
iv. a quantity of rows in each symbol display position grid;
v. a quantity of columns in each symbol display position grid;
vi. which displayed symbols are evaluated to determine any awards;
vii. which displayed sides or faces of which multiple dimension symbols are evaluated to determine any awards;
viii. which symbols are shifted;
ix. which symbol retain their original positioning;
x. which symbols are removed from which symbol display position grids;
xi. a quantity of symbols removed from any symbol display position grids;
xii. the direction of any shifting of any symbols;
xiii. which symbols are available to be generated in each symbol display position grid;
xiv. an order of evaluating the plurality of multiple dimension symbol display position planes;
xv. a duration of time a designated symbol will remain at one of the symbol display positions of one of the symbol display position grids;
xvi. a quantity of winning symbols combinations which a designated symbol will remain at one of the symbol display positions of one of the symbol display position grids;
xvii. a quantity of symbol shifts a designated symbol will remain at one of the symbol display positions of one of the symbol display position grids;
xviii. a quantity of games played a designated symbol will remain at one of the symbol display positions of one of the symbol display position grids;
xix. a quantity of designated symbols generated;
xx. which symbols are associated with which characteristics;
xxi. which sides of which multiple dimension symbols are associated with which characteristics;
xxii. a quantity of stored symbols utilized to compare the generated symbols from a current play of the game to determine any awards for the player;
xxiii. which stored symbols from which previous plays of the game are utilized to compare the generated symbols from the current play of the game to determine any awards for the player;
xxiv. any determination disclosed herein;

is/are predetermined, randomly determined, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Multi-Dimensional Symbol Wagering Game With Rotating Symbols

Figure 15A:
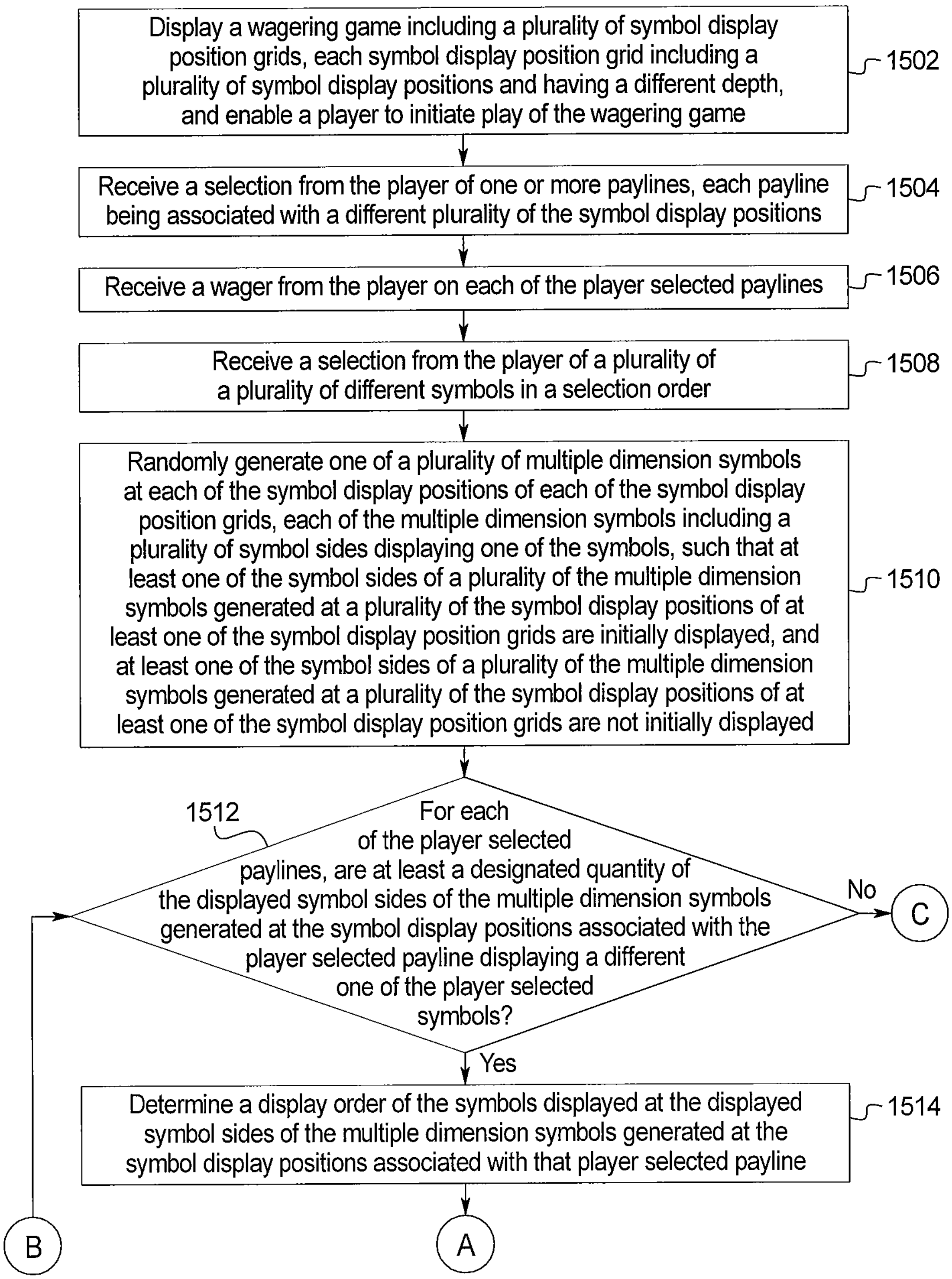
FIGS. 15A and 15B are a flow chart illustrating one embodiment of a method for operating the gaming system providing the multi-dimensional symbol wagering game with rotating symbols disclosed herein.
Figure 15B:
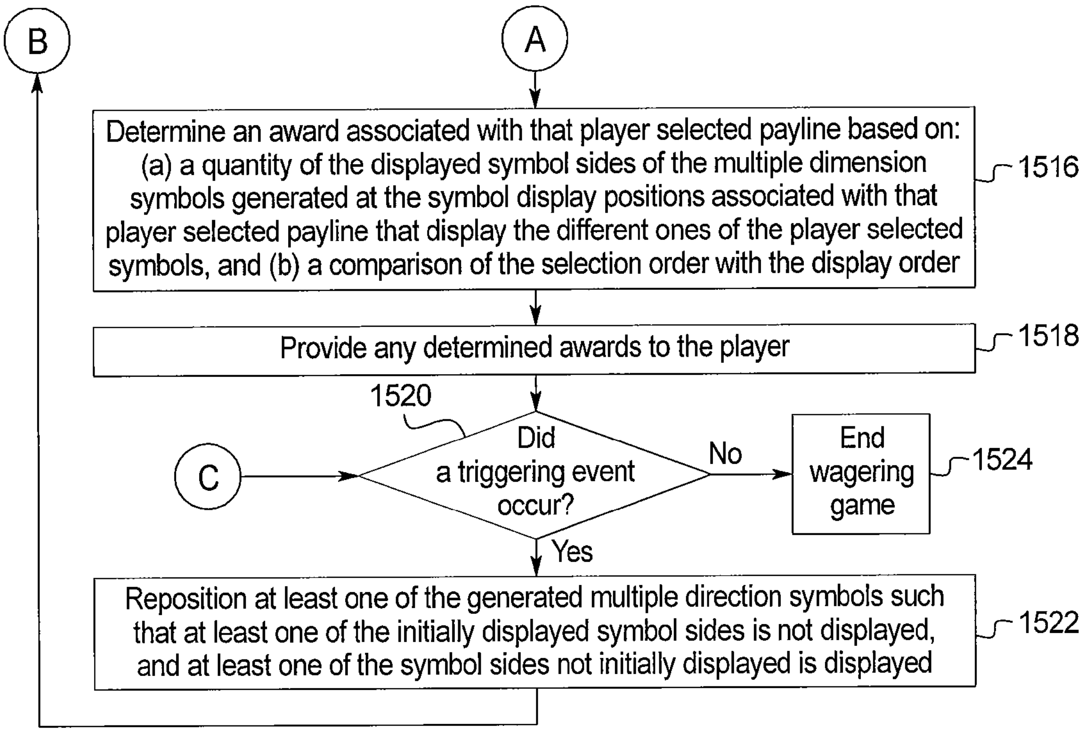

FIGS. 15A and 15B illustrate a flowchart of one example embodiment of a process or method 1500 for operating a gaming system or a gaming device. In one embodiment, this process 1500 is embodied in one or more software programs stored in one or more memories and executed by one or more processors or controllers. Although this process 1500 is described with reference to the flowchart shown in FIGS. 15A and 15B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a multi-dimensional symbol wagering game with rotating symbols including a plurality of matrices or grids of symbol display positions, as indicated in block 1502. Each grid includes a plurality of symbol display positions configured to display one of a plurality of different multiple dimension symbols each including a plurality of symbol sides displaying one of a plurality of different symbols. This means that in this embodiment, each generated multiple dimension symbol includes a length component, a width component, and a depth component (i.e., a three dimensional shape with individual symbols displayed on each side or face of the three dimensional shape). Each symbol display position of each grid is associated with a specific row, a specific column, and a specific depth. Such an arrangement of multiple symbol display position grids at different depths provides that one or more of the symbol sides of the generated multiple dimension symbols of at least a first symbol display position grid at a first depth are initially displayed to a player while one or more of the symbol sides of the generated multiple dimension symbols of at least a second symbol display position grid at a second depth are not initially displayed to the player (i.e., are blocked by one or more of the symbol sides of the generated multiple dimension symbols of the first symbol display position grid at the first depth).

The gaming system receives, from a player, a selection of at least one of a plurality of paylines, each of the paylines being associated with a different plurality of the symbol display positions, as indicated in block 1504. The gaming system receives, from the player, at least one wager associated with the player selected paylines, as indicated in block 1506. The gaming system receives, from the player, a selection of a plurality of the symbols in a selection order, as indicated in block 1508. The gaming system randomly generates one of the multiple dimension symbols at each of the symbol display positions such that at least one of the symbol sides of a plurality of the multiple dimension symbols generated at a plurality of the symbol display positions of at least one of the symbol display position grids are initially displayed, and at least one of the symbol sides of a plurality of the multiple dimension symbols generated at a plurality of the symbol display positions of at least one of the symbol display position grids are not initially displayed, as indicated in block 1510.

After generating a multiple dimension symbol at each symbol display position, the gaming system determines, for each of the player selected paylines, whether each of at least a designated quantity of the symbol sides of the multiple dimension symbols generated at the symbol display positions associated with that player selected payline displays a different one of the player selected symbols, as indicated in diamond 1512. If each of at least a designated quantity of the symbol sides of the multiple dimension symbols generated at the symbol display positions associated with that player selected payline displays a different one of the player selected symbols, the gaming system determines: (a) a display order of the symbols displayed at the displayed symbol sides of the multiple dimension symbols generated at the at the symbol display positions associated with that player selected payline, as indicated in block 1514; and (b) any awards associated with that player selected payline to be provided to the player based on: (i) a quantity of the displayed symbol sides of the multiple dimension symbols generated at the symbol display positions associated with that player selected payline that display the different ones of the player selected symbols, and (ii) a comparison of the selection order with the display order, as indicated in block 1516. The gaming system provides the player any determined awards, as indicated in block 1518.

If each of at least a designated quantity of the symbol sides of the multiple dimension symbols generated at the symbol display positions associated with that player selected payline does not display a different one of the player selected symbols, or after the gaming system has made any award determinations, the gaming system determines whether a triggering event has occurred, as indicated in diamond 1520. If the triggering event has occurred, the gaming system repositions at least one of the generated multiple dimension symbols such that at least one of the initially displayed symbol sides is not displayed and at least one of the symbol sides not initially displayed is displayed, as indicated in block 1522. The gaming system then returns to block 1512 and repeats the described process of making award determinations based on the displayed symbols, determining whether a triggering event has occurred, and, if so, repositioning certain of the generated multiple dimension symbols to reveal hidden symbols displayed on hidden symbol sides of one or more generated multiple dimension symbols. If the triggering event has not occurred, the gaming system ends the play of the multi-dimensional symbol wagering game with rotating symbols.

Thus, in one embodiment, for one play of the multi-dimensional symbol wagering game with rotating symbols, the gaming system evaluates the symbols exposed on a plurality of symbol sides of a plurality of multiple dimension symbols. In this embodiment, when a plurality of multiple dimension symbols are generated in the symbol display positions of each of the plurality of symbol display position grids, zero, one, or more of the multiple dimension symbols from the plurality of symbol display position grids form a plurality of multiple dimension symbol display position planes or surfaces. These multiple dimension symbol display position planes or surfaces each include one or more symbol display positions from one or more of the symbol display position grids at one or more depths. In this embodiment, for each plane or surface of the multiple dimension symbol display position grid displayed to the player, the gaming system evaluates the symbols displayed on the symbol sides of the multiple dimension symbols associated with that plane or surface. If a triggering condition occurs, the gaming system repositions one or more of the multiple dimension symbols to reveal one or more symbol sides of the rotated multiple dimension symbols, other multiple dimension symbols, or both that were previously hidden (i.e., not displayed to the player), and makes another award determination.

Figure 16A:
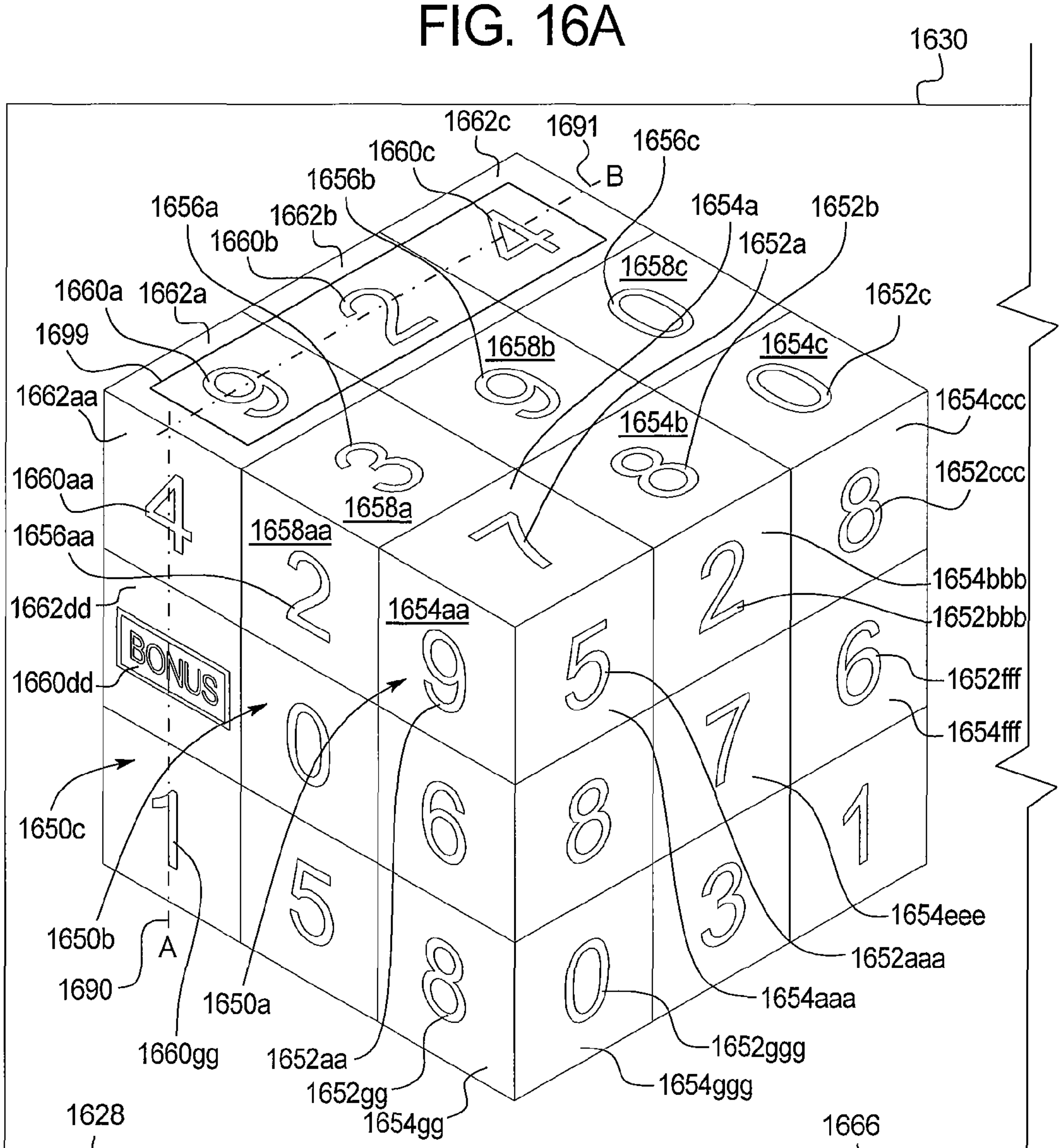
FIGS. 16A, 16B, and 16C are front elevational views of the display of one embodiment of the gaming system disclosed herein illustrating the gaming system operating the multi-dimensional symbol wagering game with rotating symbols utilizing multiple dimension symbols.
Figure 16B:
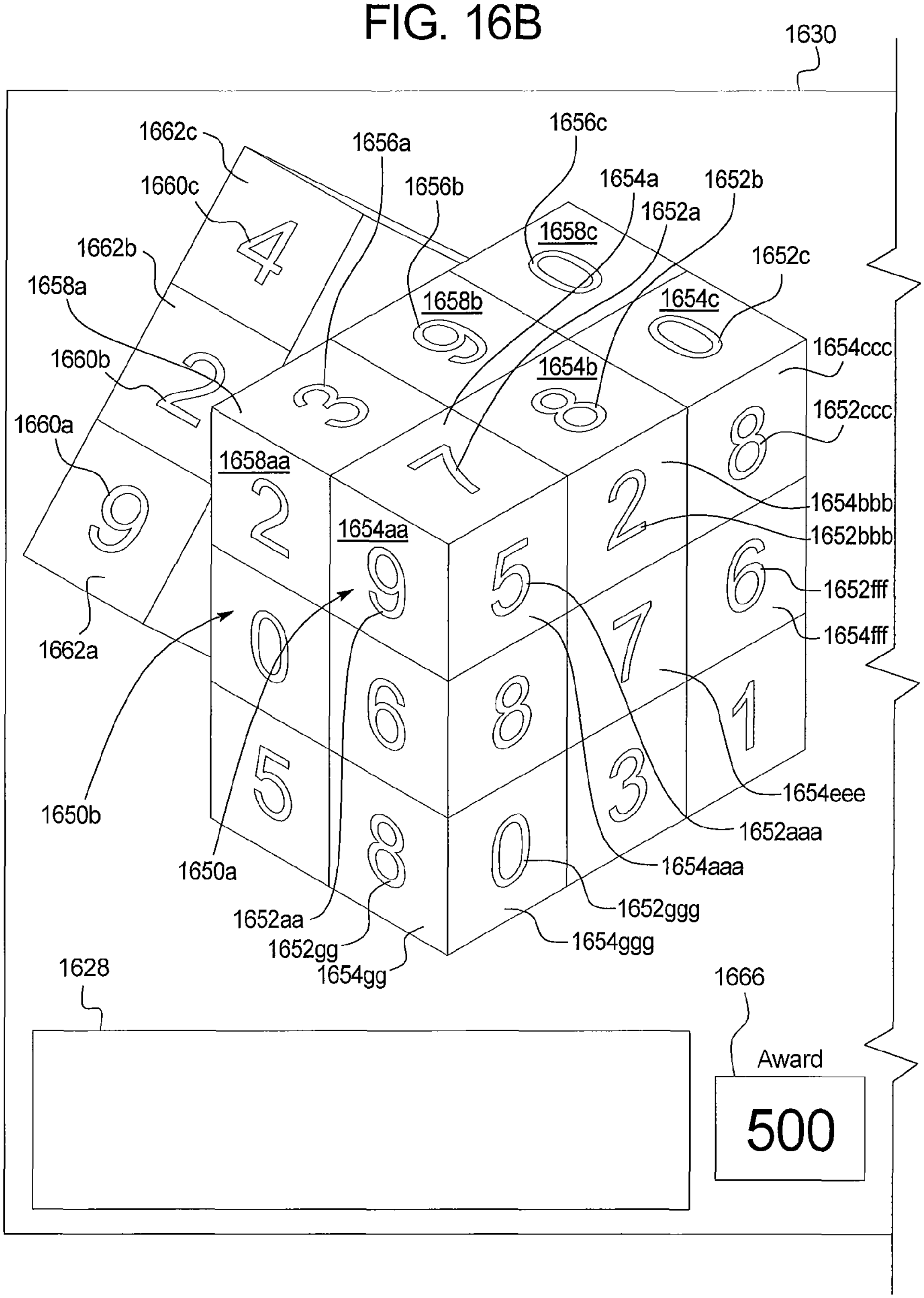
Figure 16C:
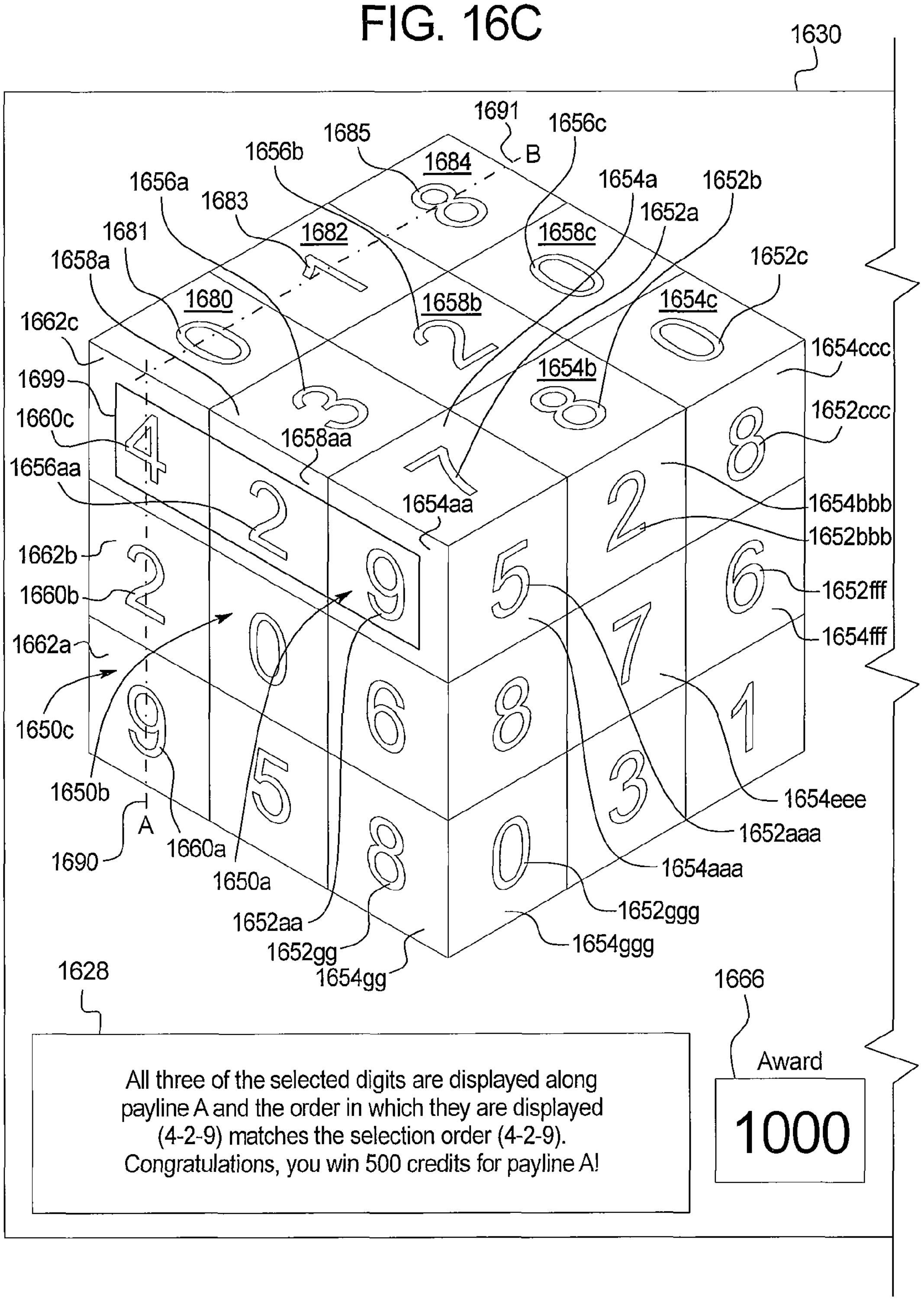

FIGS. 16A, 16B, and 16C illustrate an example embodiment of the multi-dimensional symbol wagering game with rotating symbols. In this embodiment, the multiple dimension symbols are multiple dimension digits, the symbol sides are digit sides, the symbols are the digits 0 to 9, the symbol display positions are digit display positions, and the symbol display position grids are digit display position grids. As seen in FIG. 16A, the gaming system generates a plurality of multiple dimension digits at a plurality of digit display positions of each of a plurality of digit display position grids 1650*a*, 1650*b*, and 1650*c* at different depths. Specifically, the gaming system: (i) generates a plurality of multiple dimension digits 1652 at a plurality of digit display positions 1654 of digit display position grid 16650*a*, (ii) generates a plurality of multiple dimension digits 1656 at a plurality of digit display positions 1658 of digit display position grid 1650*b*, and (iii) generates a plurality of multiple dimension digits 1660 at a plurality of digit display positions 1662 of digit display position grid 1650*c*.

As seen in FIG. 16A, because digit display position grids 1650*b* and 1650*c* are positioned behind digit display position grid 1650*a*, one or more symbol sides of one or more of the multiple dimension digits 1656 and 1660 generated at the plurality of digit display positions 1658 and 1662 of digit display position grids 1650*b* and 1650*c* are not initially displayed to the player. In this illustrated embodiment, the specific static view that this play of the game is displayed to the player causes a plurality of symbol sides of a plurality of the multiple dimension digits 1652, 1656, and 1660 to be initially displayed to the player.

After generating a plurality of multiple dimension digits, for each player-selected payline, the gaming system evaluates the digits displayed on the digit sides currently displayed to the player to determine whether at least a designated quantity of the displayed digit sides of the multiple dimension digits generated at the digit display positions associated with that payline each display a different one of the player-selected digits. This process is described in detail above with respect to the examples illustrated in FIGS. 4, 5, 6, 7, 8, and 9; FIGS. 11A, 11B, 11C, 11D, 11E, 11F, and 11G; and FIGS. 12A, 12B, 12C, 12D, and 12E. In this illustrated embodiment, the player has placed a wager of one credit on payline A 1590 and a wager of 1 credit on payline B 1591. Further, the player has selected digits 4, 2, and 9, in the selection order 4-2-9. The gaming system determines, as explained in detail above with respect to FIGS. 4, 5, 6, 7, 8, and 9; FIGS. 11A, 11B, 11C, 11D, 11E, 11F, and 11G; and FIGS. 12A, 12B, 12C, 12D, and 12E, that payline A 1590 is not associated with any award, and that payline B 1591 is associated with an award of 500 credits because: (a) each digit display position 1562*a*, 1562*b*, and 1562*c* associated with payline B displays a different one of the player-selected digits; and (b) the player-selected digits are displayed in a display order that matches the selection order (4-2-9). Accordingly, the gaming system provides an award of 500 credits to the player.

BONUS symbol 1560*dd* was generated and displayed in digit display position 1562*dd*. In this embodiment, the appearance of the BONUS symbol triggers a repositioning of the each of the multiple dimension digits included in the digit display position grid to which the multiple dimension digit including the digit side displaying the BONUS symbol belongs. Specifically, in this embodiment, each of these multiple dimension digits are rotated, collectively, ninety degrees counter-clockwise relative to the other multiple dimension digits about an axis perpendicular to symbol display position 1554*eee* to reveal previously-hidden digit sides of certain of the generated multiple dimension digits. FIG. 15B illustrates the multiple dimension digits of the display position grid 1550*c* rotating as one. FIG. 15C illustrates the multiple dimension digits after rotation. Specifically, digit 0 1581 displayed in digit display position 1562*a*, digit 1 1583 displayed in digit display position 1562*b*, and digit 8 1585 displayed in digit display position 1562*c*, which were each previously hidden, were revealed and displayed as a result of the rotation. Further, digit 4 1560*aa*, symbol BONUS 1560*dd*, and digit 1 1560*gg*, which were initially displayed, are no longer displayed. The gaming system makes another award determination as described in detail above, and determines an award of 500 credits associated with the digit combination 4-2-9 along payline A 1590. Since no BONUS symbols are displayed, the play of the game ends.

While in this embodiment the appearance of the BONUS symbol triggers repositioning of one of more of the multiple dimension digits, it should be appreciated that any suitable triggering event may be utilized. For example, in one embodiment the generation of a designated combination of symbols triggers repositioning. In another example, the gaming system randomly determines if and when one or more of the multiple dimension digits should be repositioned. In another example, the player selects when one or more of the multiple dimension digits should be repositioned. In another example, one or more of the multiple dimension digits are repositioned based on time (such as the time of day). In another embodiment, the BONUS symbol must be displayed at a symbol display position associated with an active (i.e., wagered-on) payline to trigger rotation While in this embodiment the multiple dimension symbols that are repositioned upon the occurrence of the triggering event are determined based on which multiple dimension symbol includes a symbol side displaying the BONUS symbol, it should be appreciated that in other embodiments the multiple dimension symbols that are repositioned upon the occurrence of the triggering event are determined in any suitable manner. In one embodiment, upon the occurrence of the triggering event the player chooses one or more of the multiple dimension symbols to reposition. In another embodiment, upon the occurrence of the triggering event the gaming system randomly determines which of the multiple dimension symbols to reposition. In another embodiment, upon the occurrence of the triggering event the gaming system determines the which and/or a quantity of multiple dimension symbols to reposition based on a wager placed by the player. In another embodiment, only the multiple dimension symbol including the symbol surface displaying the BONUS symbol is repositioned. In another embodiment, only the multiple dimension symbols adjacent to the multiple dimension symbol including the symbol surface displaying the BONUS symbol are repositioned. In another embodiment, only the multiple dimension symbols in the same row and/or column as the multiple dimension symbol including the symbol surface displaying the BONUS symbol are repositioned. It should be appreciated that any suitable quantity and any suitable combination of multiple dimension symbols may be repositioned upon the occurrence of the triggering event.

While in this embodiment repositioning is accomplished by rotation of at least one of the multiple dimension symbols, it should be appreciated that any suitable manner of repositioning may be implemented. For example, in one embodiment one multiple dimension symbol switches places with another multiple dimension symbol.

It should be appreciated that in embodiments in which one or more of the multiple dimension symbols rotate, the amount of rotation (i.e., how much the multiple dimension symbol rotates) and the manner of rotation (i.e., how the multiple dimension symbol rotates) may be determined and performed in any suitable manner. For example, the gaming system randomly determines an amount of rotation of one or more of the multiple dimension symbols, such as ninety degrees, one hundred eighty degrees, two hundred seventy degrees, or any other suitable amount. In another embodiment, the player selects an amount of rotation of one or more of the multiple dimension symbols. In another embodiment, the amount of rotation of one or more of the multiple dimension symbols is determined based on an outcome of the multi-dimensional symbol wagering game with rotating symbols. In another embodiment, the amount of rotation of one of more of the multiple dimension symbols is predetermined. In another embodiment, the gaming system randomly determines how one or more of the multiple dimension symbols rotates, e.g., clockwise, counter-clockwise, individually, and/or collectively. In another embodiment, the player makes such a selection. In another embodiment, the manner in which one or more of the multiple direction symbols rotates is predetermined. In another embodiment, the manner in which one of the multiple direction symbols rotates is based on an outcome of the multi-dimensional symbol wagering game.

It should be understood that various changes and modifications to the presently preferred embodiments described herein will be apparent to those skilled in the art. Such changes and modifications may be made without departing from the spirit and scope of the present invention and without diminishing its intended advantages. It is therefore intended that such changes and modifications be covered by the appended claims.

The invention claimed is:

1. A gaming system comprising:
at least one display device;
at least one input device;
at least one processor; and
at least one memory device storing a plurality of instructions which, when executed by the at least one processor, cause the at least one processor to operate with the at least one display device and the at least one input device to, for a play of a wagering game:
(a) receive, from a player:
(i) a selection of at least one of a plurality of paylines, each of the paylines being associated with a different plurality of a plurality of symbol display positions;
(ii) at least one wager associated with the player selected paylines; and
(iii) a selection of a designated quantity of a plurality of different symbols in a selection order;
(b) for each of the symbol display positions, randomly generate and display one of the plurality of different symbols at said symbol display position;
(c) for each of the player selected paylines, if each of at least a designated quantity of the symbol display positions associated with said player selected payline displays any one of the player selected symbols, the designated quantity being at least one:
(i) determine a display order of the symbols generated and displayed at the symbol display positions associated with said player selected payline, and
(ii) determine any awards associated with said player selected payline based on:
(A) a quantity of the symbol display positions associated with said player selected payline that display the player selected symbols, and
(B) a comparison of the selection order with the display order, wherein a first award determined when the selection order does not match the display order is different than a second award determined when the selection order matches the display order;
(d) if at least one award is determined:
(i) remove at least one displayed symbol associated with the at least one determined award,
(ii) reposition at least one of the displayed symbols to another one of the symbol display positions to create at least one empty symbol display position,
(iii) generate and display one of the plurality of different symbols at each of the at least one empty symbol display position, and
(iv) repeat (c) to (d); and
(e) provide any determined awards to the player.

2. The gaming system of claim 1, wherein the selection order is predetermined.

3. The gaming system of claim 1, wherein, for each of the player selected paylines, the designated quantity of the symbol display positions is at least two.

4. The gaming system of claim 1, wherein the designated quantity of the symbols is equal to a maximum quantity of the symbol display positions associated with any one of the paylines.

5. The gaming system of claim 1, wherein the symbol display positions are adjacently displayed, and each of the paylines has a horizontal, vertical, or diagonal orientation.

6. The gaming system of claim 5, wherein, for each of the player selected paylines, the display order is determined:
(a) from left to right or right to left for a horizontal payline,
(b) from top to bottom or bottom to top for a vertical payline,
(c) from left to right, right to left, top to bottom, or bottom to top for a diagonal payline,
(d) randomly, or
(e) based on an input by the player.

7. The gaming system of claim 1, wherein, for each of the player selected paylines, a third award is determined when a first quantity of the symbol display positions associated with said player selected payline each display one of the player selected symbols and a fourth award is determined when a second, greater quantity of the symbol display positions associated with said player selected payline each display one of the player selected symbols, wherein the fourth award is greater than the third award.

8. The gaming system of claim 1, wherein the first award is less than the second award.

9. A gaming system comprising:
at least one display device;
at least one input device;
at least one processor; and
at least one memory device storing a plurality of instructions which, when executed by the at least one processor, cause the at least one processor to operate with the at least one display device and the at least one input device to, for a play of a wagering game:
(a) receive, from a player:
(i) a selection of at least one of a plurality of paylines, each of the paylines being associated with a different plurality of a plurality of digit display positions;
(ii) at least one wager associated with the player selected paylines; and
(iii) a selection of a designated quantity of a plurality of different digits in a selection order;
(b) for each of the digit display positions, randomly generate and display one of the plurality of different digits at said digit display position;
(c) for each of the player selected paylines, if each of at least a designated quantity of the digit display positions associated with said player selected payline displays any one of the player selected digits, the designated quantity being at least one:
(i) determine a display order of the digits generated and displayed at the digit display positions associated with said player selected payline, and
(ii) determine any awards associated with said player selected payline based on:
(A) a quantity of the digit display positions associated with said player selected payline that display the player selected digits, and
(B) a comparison of the selection order with the display order, wherein a first award determined when the selection order does not match the display order is different than a second award determined when the selection order matches the display order;
(d) if at least one award is determined:
(i) remove at least one displayed digit associated with the at least one determined award,
(ii) reposition at least one of the displayed digits to another one of the digit display positions to create at least one empty digit display position,
(iii) generate and display one of the plurality of different digits at each of the at least one empty digit display position, and (iv) repeat (c) to (d); and (e) provide any determined awards to the player.

10. The gaming system of claim 9, wherein the selection order is predetermined.

11. The gaming system of claim 9, wherein, for each of the player selected paylines, the designated quantity of the digit display positions is at least two.

12. The gaming system of claim 9, wherein the designated quantity of the digits is equal to a maximum quantity of the digit display positions associated with any one of the paylines.

13. The gaming system of claim 9, wherein the digit display positions are adjacently displayed, and each of the paylines has a horizontal, vertical, or diagonal orientation.

14. The gaming system of claim 13, wherein, for each of the player selected paylines, the display order is determined:

(a) from left to right or right to left for a horizontal payline, (b) from top to bottom or bottom to top for a vertical payline, (c) from left to right, right to left, top to bottom, or bottom to top for a diagonal payline, (d) randomly, or (e) based on an input by the player.

15. The gaming system of claim 9, wherein, for each of the player selected paylines, a third award is determined when a first quantity of the digit display positions associated with said player selected payline each display one of the player selected digits and a fourth award is determined when a second, greater quantity of the digit display positions associated with said player selected payline each display one of the player selected digits, wherein the fourth award is greater than the third award.

16. The gaming system of claim 9, wherein the first award is less than the second award.

17. A method of operating a gaming system, said method comprising:

(a) causing at least one processor to execute a plurality of instructions stored in at least one memory device to operate with at least one input device to receive, from a player:

(i) a selection of at least one of a plurality of paylines, each of the paylines being associated with a different plurality of a plurality of symbol display positions;

(ii) at least one wager associated with the player selected paylines; and (iii) a selection of a designated quantity of a plurality of different symbols in a selection order;

(b) causing the at least one processor to execute the plurality of instructions to operate with at least one display device to, for each of the symbol display positions, randomly generate and display one of the plurality of different symbols at said symbol display position;

(c) causing the at least one processor to execute the plurality of instructions to, for each of the player selected paylines, if each of at least a designated quantity of the symbol display positions associated with said player selected payline displays any one of the player selected symbols, the designated quantity being at least one:

(i) determine a display order of the symbols generated and displayed at the symbol display positions associated with said player selected payline, and (ii) determine any awards associated with said player selected payline based on:

(A) a quantity of the symbol display positions associated with said player selected payline that display the player selected symbols, and (B) a comparison of the selection order with the display order, wherein a first award determined when the selection order does not match the display order is different than a second award determined when the selection order matches the display order;

(d) if at least one award is determined:

(i) causing the at least one processor to execute the plurality of instructions to operate with the at least one display device to remove at least one displayed symbol associated with the at least one determined award, (ii) causing the at least one processor to execute the plurality of instructions to operate with the at least one display device to reposition at least one of the displayed symbols to another one of the symbol display positions to create at least one empty symbol display position, (iii) causing the at least one processor to execute the plurality of instructions to operate with the at least one display device to generate and display one of the plurality of different symbols at each of the at least one empty symbol display position, and (iv) repeating (c) to (d); and (e) causing the at least one processor to execute the plurality of instructions to cause any determined awards be provided to the player.

18. The method of claim 17, which includes causing the at least one processor to execute the plurality of instructions to predetermine the selection order.

19. The method of claim 17, which includes causing the at least one processor to execute the plurality of instructions to operate with the at least one display device to adjacently display the symbol display positions, and to display each of the paylines in a horizontal, vertical, or diagonal orientation.

20. The method of claim 19, which includes, for each of the player selected paylines, causing the at least one processor to execute the plurality of instructions to determine the display order:

(a) from left to right or right to left for a horizontal payline, (b) from top to bottom or bottom to top for a vertical payline, (c) from left to right, right to left, top to bottom, or bottom to top for a diagonal payline, (d) randomly, or (e) based on an input by the player.

21. The method of claim 17, which includes, for each of the player selected paylines, causing the at least one processor to execute the plurality of instructions to:

(a) determine a third award when a first quantity of the symbol display positions associated with said player selected payline each display one of the player selected symbols, and (b) determine a fourth, greater award when a second, greater quantity of the symbol display positions associated with said player selected payline each display one of the player selected symbols.

22. The method of claim 17, wherein the first award is less than the second award.

23. The method of claim 17, which is provided through a data network.

24. The method of claim 23, wherein the data network is the internet.

25. A method of operating a gaming system, said method comprising:

(a) causing the at least one processor to execute a plurality of instructions stored in at least one memory device to operate with at least one input device to receive, from a player:

(i) a selection of at least one of a plurality of paylines, each of the paylines being associated with a different plurality of a plurality of digit display positions;

(ii) at least one wager associated with the player selected paylines; and (iii) a selection of a designated quantity of a plurality of different digits in a selection order;

(b) causing the at least one processor to execute the plurality of instructions to operate with at least one display device to, for each of the digit display positions, randomly generate and display one of the plurality of different digits at said digit display position;

(c) causing the at least one processor to execute the plurality of instructions to, for each of the player selected paylines, if each of at least a designated quantity of the digit display positions associated with said player selected payline displays any one of the player selected digits, the designated quantity being at least one:

(i) determine a display order of the digits generated and displayed at the digit display positions associated with said player selected payline, and (ii) determine any awards associated with said player selected payline based on:

(A) a quantity of the digit display positions associated with said player selected payline that display the player selected digits, and (B) a comparison of the selection order with the display order wherein a first award determined when the selection order does not match the display order is different than a second award determined when the selection order matches the display order;

(d) if at least one award is determined:

(i) causing the at least one processor to execute the plurality of instructions to operate with the at least one display device to remove at least one displayed digit associated with the at least one determined award, (ii) causing the at least one processor to execute the plurality of instructions to operate with the at least one display device to reposition at least one of the displayed digits to another one of the digit display positions to create at least one empty digit display position, (iii) causing the at least one processor to execute the plurality of instructions to operate with the at least one display device to generate and display one of the plurality of different digits at each of the at least one empty digit display position, and (iv) repeating (c) to (d); and (e) causing the at least one processor to execute the plurality of instructions to cause any determined awards be provided to the player.

26. The method of claim 25, which includes causing the at least one processor to execute the plurality of instructions to predetermine the selection order.

27. The method of claim 25, which includes causing the at least one processor to execute the plurality of instructions to operate with the at least one display device to adjacently display the digit display positions, and to display each of the paylines in a horizontal, vertical, or diagonal orientation.

28. The method of claim 25, which includes, for each of the player selected paylines, causing the at least one processor to execute the plurality of instructions to determine the display order:

(a) from left to right or right to left for a horizontal payline, (b) from top to bottom or bottom to top for a vertical payline, (c) from left to right, right to left, top to bottom, or bottom to top for a diagonal payline, (d) randomly, or (e) based on an input by the player.

29. The method of claim 25, which includes, for each of the player selected paylines, causing the at least one processor to execute the plurality of instructions to:

(a) determine a third award when a first quantity of the digit display positions associated with said player selected payline each display one of the player selected digits, and (b) determine a fourth, greater award when a second, greater quantity of the digit display positions associated with said player selected payline each display one of the player selected digits.

30. The method of claim 25, wherein the first award is less than the second award.

31. The method of claim 25, which is provided through a data network.

32. The method of claim 31, wherein the data network is the internet.

* * * * *

UNITED STATES PATENT AND TRADEMARK OFFICE

CERTIFICATE OF CORRECTION

PATENT NO. : 8,430,737 B2
APPLICATION NO. : 13/187653
DATED : April 30, 2013
INVENTOR(S) : Brian F. Saunders It is certified that error appears in the above-identified patent and that said Letters Patent is hereby corrected as shown below:

IN THE CLAIMS

In Claim 24, Column 64, Line 61, replace “the” with --an--.
In Claim 25, Column 65, Line 28, between “order” and “wherein” insert --,--.
In Claim 32, Column 66, Line 43, replace “the” with --an--.

Signed and Sealed this
Thirteenth Day of May, 2014

Michelle K. Lee

Michelle K. Lee
*Deputy Director of the United States Patent and Trademark Office*